United States Patent
Suzuki et al.

(10) Patent No.: US 12,013,230 B2
(45) Date of Patent: Jun. 18, 2024

(54) THREE-DIMENSIONAL SHAPE MEASURING APPARATUS

(71) Applicant: Keyence Corporation, Osaka (JP)

(72) Inventors: Takashi Suzuki, Osaka (JP); Shinya Takahashi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 297 days.

(21) Appl. No.: 17/674,953

(22) Filed: Feb. 18, 2022

(65) Prior Publication Data

US 2022/0316867 A1 Oct. 6, 2022

(30) Foreign Application Priority Data

Apr. 2, 2021 (JP) ................. 2021-063482

(51) Int. Cl.
  G01B 11/25 (2006.01)
  G06T 7/521 (2017.01)
  G06T 7/55 (2017.01)

(52) U.S. Cl.
  CPC ........ *G01B 11/254* (2013.01); *G01B 11/2522* (2013.01); *G06T 7/521* (2017.01); *G06T 7/55* (2017.01)

(58) Field of Classification Search
  CPC .............. G01B 11/254; G01B 11/2522; G01B 2210/52; G01B 5/0004; G01B 11/2527; G01B 11/24; G01B 11/25; G06T 7/521; G06T 7/55; G06T 2207/10016; G06T 2207/30164
  USPC ...................................................... 356/610
  See application file for complete search history.

(56) References Cited

FOREIGN PATENT DOCUMENTS

| JP | 5014174 B2 * | 8/2012 | |
|---|---|---|---|
| JP | 201455814 A | 3/2014 | |
| JP | 7137346 B2 * | 9/2022 | ......... G01B 11/2513 |
| JP | 7280774 B2 * | 5/2023 | ......... G01B 11/2522 |

* cited by examiner

*Primary Examiner* — Md M Rahman
(74) *Attorney, Agent, or Firm* — Kilyk & Bowersox, P.L.L.C.

(57) ABSTRACT

A shape measuring apparatus includes a stage, a light projecting portion, a light receiving portion, and a rotation unit. The rotation unit is attached to an end of the stage. The rotation unit rotates the measurement subject about a rotation axis that vertically intersects while holding the measurement subject. In a state where the measurement subject is at a predetermined rotation angular position, the pattern light is emitted from the light projecting portion to the measurement subject a plurality of times while being phase-shifted. At this time, the light receiving portion captures an image of the measurement subject. Three-dimensional shape data is generated on the basis of a plurality of pieces of image data obtained by imaging.

15 Claims, 41 Drawing Sheets

FIG. 25A  0°
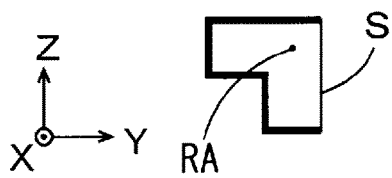
FIG. 25F
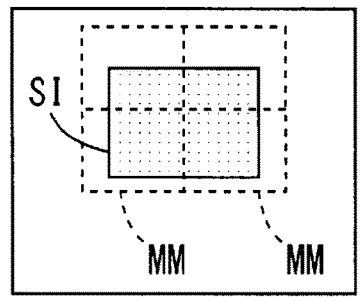
FIG. 25B  45°
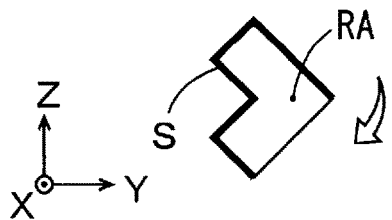
FIG. 25G
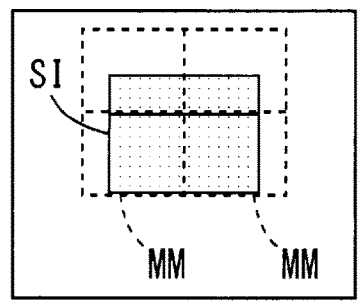
FIG. 25C  90°
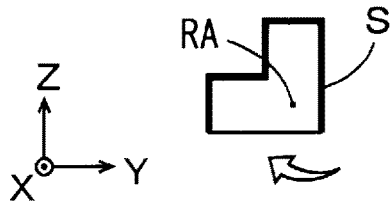
FIG. 25H
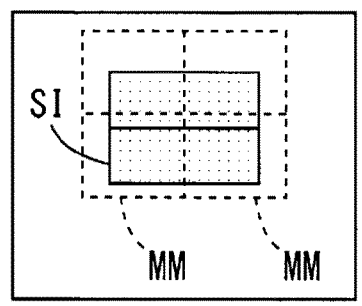
FIG. 25D  135°
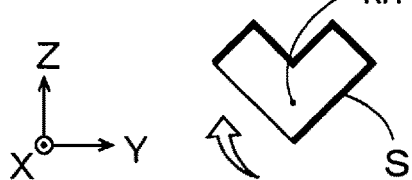
FIG. 25I
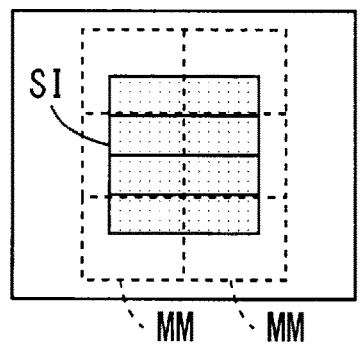
FIG. 25E  180°
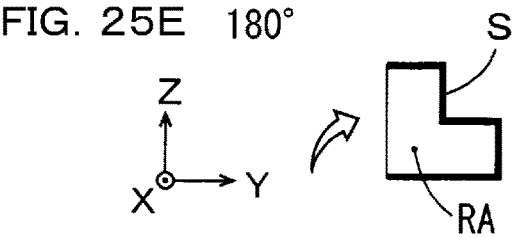
FIG. 25J
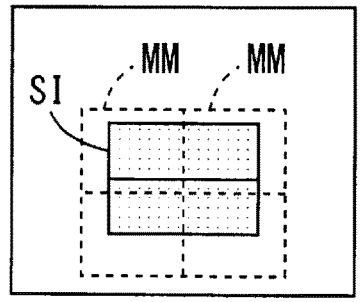

THREE-DIMENSIONAL SHAPE MEASURING APPARATUS

CROSS-REFERENCE TO RELATED APPLICATIONS

The present application claims foreign priority based on Japanese Patent Application No. 2021-063482, filed Apr. 2, 2021, the contents of which are incorporated herein by reference.

BACKGROUND OF THE INVENTION

1. Field of the Invention

The present invention relates to a three-dimensional shape measuring apparatus that optically measures a three-dimensional shape of a measurement subject.

2. Description of Related Art

A three-dimensional shape measuring apparatus is used to measure a three-dimensional shape of a measurement subject. As an example of the three-dimensional shape measuring apparatus, in the shape measuring apparatus disclosed in JP 2014 055814 A, a plurality of pieces of measurement light having a plurality of patterns are sequentially emitted from a light projecting portion to a measurement subject placed in a stage from a position obliquely above the measurement subject. At the time of irradiation with each measurement light, an image of the measurement subject is captured by a light receiving portion disposed above the stage. As a result, a plurality of images on which the pattern of the measurement light is projected is acquired. Data indicating the three-dimensional shape of the measurement subject is generated by a triangulation method based on the plurality of acquired images.

The stage is configured such that a placement surface on which the measurement subject is placed is movable in the X direction and the Y direction parallel to the placement surface and is rotatable about an axis orthogonal to the placement surface.

Accordingly, the user can measure the shape of a desired portion of the measurement subject by moving or rotating the placement surface while the measurement subject is placed in the stage.

In the shape measurement method by the triangulation method, it is not possible to measure the shape of a blind spot portion of the surface of the measurement subject, that is, a portion that cannot be irradiated with measurement light in the surface of the measurement subject and a portion whose image cannot be captured in the surface of the measurement subject.

In the shape measuring apparatus, the measurement subject on the stage is located below the light projecting portion and the light receiving portion. Therefore, a portion of the measurement subject facing downward is a blind spot. Therefore, even if the measurement subject on the stage is moved or rotated, a specific portion of the surface of the measurement subject cannot be removed from the blind spot. In this case, a portion where the shape of the measurement subject can be measured is limited.

SUMMARY OF THE INVENTION

An object of the present invention is to provide a three-dimensional shape measuring apparatus capable of measuring a shape over a wide range on a surface of a measurement subject.

(1) A three-dimensional shape measuring apparatus according to the present invention includes: a stage having an upper surface on which a measurement subject can be placed; a projector configured to irradiate the measurement subject with pattern light having a periodic pattern a plurality of times from a position obliquely above while shifting a phase of the pattern light; a camera that has an optical axis orthogonal to the upper surface of the stage, receives, through a telecentric optical system, pattern light reflected from the measurement subject when the measurement subject is irradiated with the pattern light a plurality of times from the projector, and captures an image of the measurement subject a plurality of times to generate a plurality of pieces of image data; a rotation unit configured to include a holding portion that holds the measurement subject and a rotation drive portion that rotates the holding portion about a rotation axis intersecting the optical axis of the camera, the rotation unit being attached to an end portion of the stage; an input portion configured to receive selection by a user from a first control mode in which measurement of the measurement subject is performed in a state where the measurement subject is placed in the upper surface of the stage and a second control mode in which measurement of the measurement subject is performed in a state where the measurement subject is held by the rotation unit; and a processor that, when the first control mode is selected, controls the projector and the camera to generate a plurality of pieces of image data in a state where the measurement subject is placed on the upper surface of the stage, and generates three-dimensional shape data based on the plurality of pieces of image data generated by the camera, and when the second control mode is selected, controls the projector, the camera, and the rotation unit to rotate the measurement subject about the rotation axis and generate a plurality of pieces of image data in a state where the measurement subject is held by the rotation unit, and generates three-dimensional shape data based on the plurality of pieces of image data generated by the camera.

In the three-dimensional shape measuring apparatus, an image of the measurement subject is captured in a state where the measurement subject is placed on the upper surface of the stage. Alternatively, in a state where the measurement subject is held by the rotation unit, an image of the measurement subject that rotates about the rotation axis intersecting the optical axis of the camera is captured. Three-dimensional shape data of the measurement subject is generated based on a plurality of pieces of image data obtained by imaging.

In this case, the user can place the measurement subject on the upper surface of the stage or rotate the measurement subject by the rotation unit such that the pattern light is incident on the shape of a desired portion in the measurement subject. As a result, the shape can be measured over a wide range on the surface of the measurement subject.

(2) The three-dimensional shape measuring apparatus further includes: a first drive portion configured to move the stage relative to the camera in a plane direction orthogonal to the optical axis of the camera. The processor may be configured to be able to execute: first synthesis processing of controlling the first drive portion such that the measurement subject and the camera are disposed at a plurality of positions different from each other in the plane direction in a state where the measurement subject is placed on the stage or in a state where the measurement subject is held by the rotation unit, controlling the projector and the camera so as to generate a plurality of pieces of first three-dimensional shape data respectively corresponding to the plurality of positions, and synthesizing a plurality of pieces of generated first three-dimensional shape data; second synthesis processing of controlling the rotation unit such that the measurement subject rotates about the rotation axis in a state where the measurement subject is held by the rotation unit, controlling the projector and the camera such that a plurality of pieces of second three-dimensional shape data respectively corresponding to a plurality of rotation angles different from each other about the rotation axis are generated, and synthesizing a plurality of pieces of generated second three-dimensional shape data; and third synthesis processing of controlling the first drive portion, the rotation unit, the projector, and the camera so as to generate the plurality of pieces of first three-dimensional shape data and the plurality of pieces of second three-dimensional shape data, and synthesizing the plurality of pieces of generated first three-dimensional shape data and the plurality of pieces of generated second three-dimensional shape data. This makes it possible to measure the shape of the measurement subject over a wide range beyond the imaging region of the camera.

(3) The three-dimensional shape measuring apparatus further includes: a second drive portion configured to move the stage relative to the camera in a direction of the optical axis of the camera. The rotation axis may be located above the upper surface of the stage. The rotation axis and the optical axis of the camera may be orthogonal to each other. The second drive portion may be configured to be able to move a focal point of the camera within a first movable range from the upper surface of the stage to the rotation axis in the direction of the optical axis of the camera. In this case, the shape of the measurement subject can be measured within the first movable range in the direction of the optical axis of the imaging unit.

(4) The rotation axis may be parallel to the upper surface of the stage. When a distance from the upper surface of the stage to the rotation axis in the direction of the optical axis of the camera is defined as a reference distance, the second drive portion may be configured to be able to move a focal point of the camera within a second movable range up to a position separated upward from the upper surface of the stage by a distance twice the reference distance in the direction of the optical axis of the camera. In this case, the shape of the measurement subject can be measured within the second movable range in the direction of the optical axis of the camera.

(5) The three-dimensional shape measuring apparatus further includes: a second drive portion configured to move the stage relative to the camera in a direction of the optical axis of the camera. The processor may be configured to be able to execute: fourth synthesis processing of controlling the second drive portion such that the measurement subject and a focal point of the camera are disposed at a plurality of positions different from each other in a direction of the optical axis of the camera in a state where the measurement subject is placed on the stage or in a state where the measurement subject is held by the rotation unit, controlling the projector and the camera to generate a plurality of pieces of third three-dimensional shape data corresponding to the plurality of positions, and synthesizing the plurality of pieces of generated third three-dimensional shape data. In this case, it is possible to measure the shape of the measurement subject over a wide range exceeding the depth of field of the camera in the direction of the optical axis of the camera.

(6) The processor may determine the plurality of positions in the direction of the optical axis such that the focal point of the camera is matched with a plurality of portions whose image is captured by the camera in the measurement subject for each rotation angle in a case where the measurement subject is sequentially rotated at the plurality of different rotation angles in a state where the measurement subject is held by the rotation unit.

In this case, when the measurement subject is sequentially rotated at a plurality of different rotation angles, a plurality of positions to which the camera should be focused is determined for each part of the measurement subject disposed in the imaging region of the camera. Therefore, a region where the shape of the measurement subject in the surface can be measured is expanded.

(7) The input portion is further capable of accepting, as the second control mode, selection by a user from a rotation synthesis mode and a single angle measurement mode. The processor may be configured to: generate a plurality of pieces of second three-dimensional shape data respectively corresponding to the plurality of different rotation angles when the rotation synthesis mode is selected, and synthesize the plurality of pieces of second three-dimensional shape data by the second synthesis processing; and control the projector, the camera, and the rotation unit to generate three-dimensional shape data corresponding to one rotation angle when the single angle measurement mode is selected. In this case, the user can acquire three-dimensional shape data of the shape of the measurement subject in a desired manner.

(8) The input portion is further capable of accepting, as the second control mode, selection by a user from a full circumference synthesis mode and a partial synthesis mode, and accepts designation of an angular range in which the measurement subject is rotated about the rotation axis when the partial synthesis mode is selected. The processor may be configured to: control the projector, the camera, and the rotation unit to generate the plurality of pieces of second three-dimensional shape data over an entire circumference about the rotation axis when the full circumference synthesis mode is selected, and synthesize a plurality of pieces of second three-dimensional shape data generated over the entire circumference about the rotation axis by the second synthesis processing; and control the projector, the camera, and the rotation unit to generate the plurality of pieces of second three-dimensional shape data over the angular range about the rotation axis when the partial synthesis mode is selected, and synthesize the plurality of pieces of second three-dimensional shape data generated over the angular range about the rotation axis by the second synthesis processing. In this case, the user can acquire three-dimensional shape data of the shape of the measurement subject in a desired manner.

(9) The projector may include first and second light projecting apparatuses arranged in a direction of an X axis and disposed symmetrically with respect to a Z axis orthogonal to the X axis. Each of the first and second light projecting apparatuses may have an optical axis orthogonal to a Y axis orthogonal to the X axis and inclined at a predetermined angle with respect to the X axis and the Z axis, and emit pattern light along the optical axis of the light projecting apparatus toward the optical axis of the camera. The rotation unit may be attached to the stage so as to be disposed at a position deviated from a space in which an irradiation region of pattern light by the first light projecting apparatus, an irradiation region of pattern light by the second light projecting apparatus, and an imaging region of the camera overlap when the stage is at a predetermined reference position with respect to the camera.

In this case, since the rotation unit is not located in a space in which the irradiation region of the pattern light by the first light projecting apparatus, the irradiation region of the pattern light by the second light projecting apparatus, and the imaging region of the camera overlap, the measurable range of the measurement subject is prevented from being limited by the rotation unit. According to the above configuration, the pattern light can be emitted to the measurement subject along two directions different from each other. As a result, the range irradiated with the pattern light in the surface of the measurement subject can be expanded. Therefore, it is possible to generate three-dimensional shape data with high accuracy over a wide range of the surface of the measurement subject disposed in the measurement space.

(10) The rotation unit may be configured to be attachable to and detachable from the stage. As a result, the region on which the measurement subject is placed can be enlarged or reduced as necessary, so that the convenience of the three-dimensional shape measurement is improved.

(11) The stage may include a power source portion capable of supplying power to the rotation unit. The rotation unit may further include: a power source portion configured to operate the rotation drive portion; and a cable provided to extend from the power source portion and having a connector connectable to the power source portion. The rotation drive portion may operate based on power supplied from the power supply portion to the power source portion in a case where the connector is connected to the power source portion.

In this case, when the rotation unit is attached to the stage, a cable extending from the rotation unit is connected to the power supply portion of the stage. Therefore, it is not necessary to route the cable for operating the rotation unit to a position separated from the three-dimensional shape measuring apparatus. When the rotation unit is attached to the stage, the rotation unit is used integrally with the stage. As a result, operability of the three-dimensional shape measuring apparatus during use of the rotation unit is improved.

(12) The holding portion may be configured to be able to hold the measurement subject in a cantilever manner. In this case, since the measurement subject is held in a cantilever manner, a portion of the measurement subject held by the holding portion can be reduced. As a result, an unmeasurable portion in the surface of the measurement subject can be reduced.

(13) The holding portion may include: a rotation pedestal configured to be rotated by the rotation drive portion; and first and second rod-shaped members configured to extend from the rotation pedestal in a direction of the rotation axis. In this case, by holding the measurement subject by the first and second rod-shaped members, the measurement subject can be rotated about the rotation axis.

(14) The processor may be configured to be able to execute: attachment/detachment determination processing of determining whether the rotation unit is attached to the stage; and attachment/detachment state presentation processing of presenting a determination result by the attachment/detachment determination processing. In this case, the user can easily grasp whether the rotation unit is attached to the stage.

(15) The rotation unit may be configured to be attachable to the stage and detachable from the stage. The three-dimensional shape measuring apparatus further includes: a drive portion configured to move the stage relative to the camera in a direction orthogonal to the optical axis of the camera. The processor may cause a display apparatus to display a first user interface for setting an operation condition regarding a relative movement operation by the drive portion and a rotation operation of the measurement subject by the rotation unit in a case where the rotation unit is attached to the stage, and cause the display apparatus to display a second user interface for setting an operation condition regarding only the relative movement operation out of the relative movement operation and the rotation operation in a case where the rotation unit is not attached to the stage.

In this case, the display apparatus displays the first and second user interfaces depending on whether the rotation unit is attached to the stage. Therefore, the user can easily grasp whether the rotation unit is attached to the stage. In addition, it is possible to easily grasp the setting contents of the operation condition according to whether the rotation unit is attached to the stage.

According to the present invention, it is possible to measure a shape over a wider range on a surface of a measurement subject.

BRIEF DESCRIPTION OF THE DRAWINGS

FIGS. 25A to 25J are diagrams for explaining the operation of the shape measuring apparatus executed in response to the operation of the partial box button of FIG. 24;

DETAILED DESCRIPTION OF PREFERRED EMBODIMENTS

Hereinafter, a three-dimensional shape measuring apparatus according to an embodiment of the present invention will be described with reference to the drawings. In the following description, the three-dimensional shape measuring apparatus is abbreviated as a shape measuring apparatus.

[1] Configuration of Shape Measuring Apparatus

Figure 1:
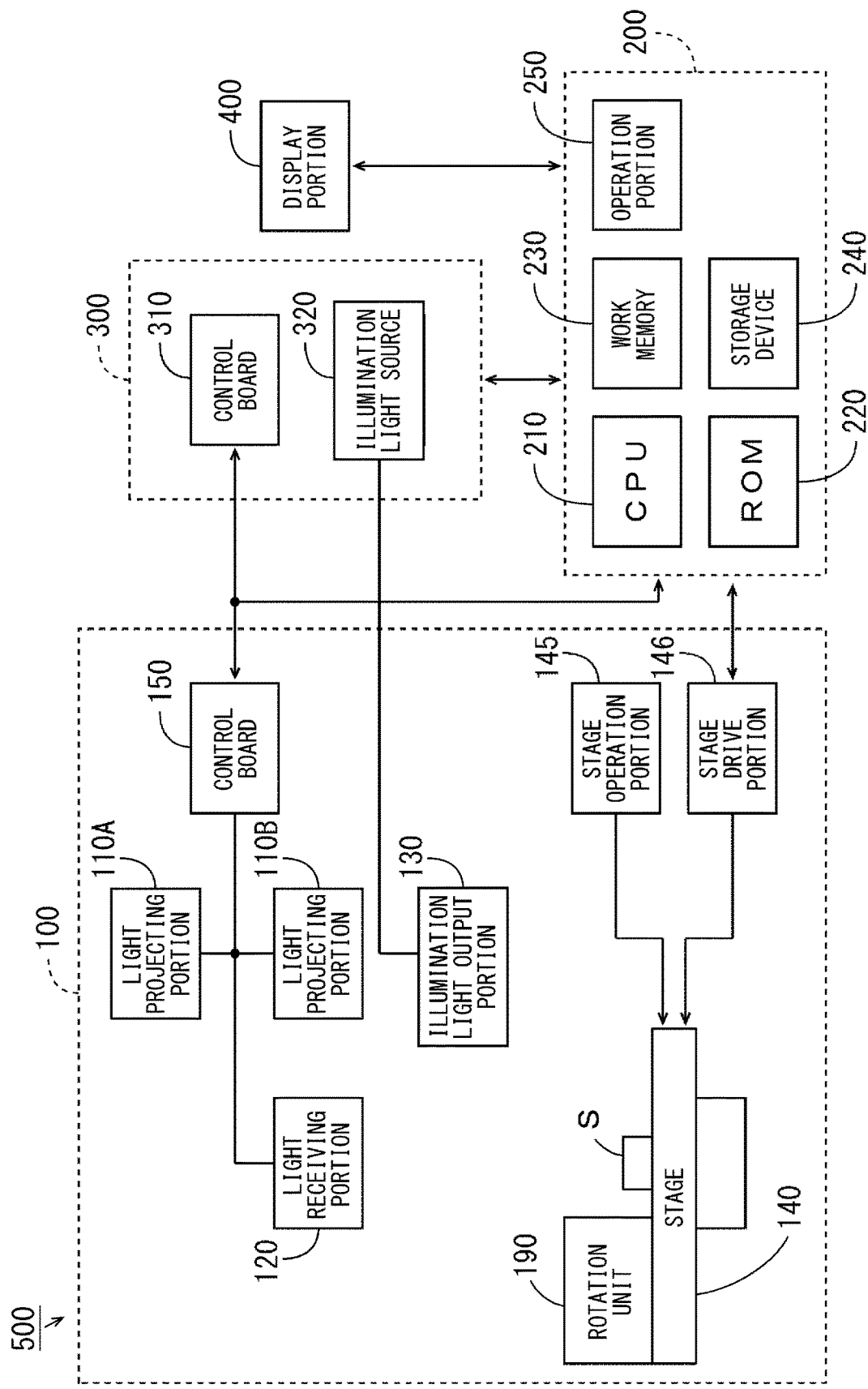
FIG. 1 is a block diagram illustrating a configuration of a shape measuring apparatus according to an embodiment of the present invention.
Figure 2:
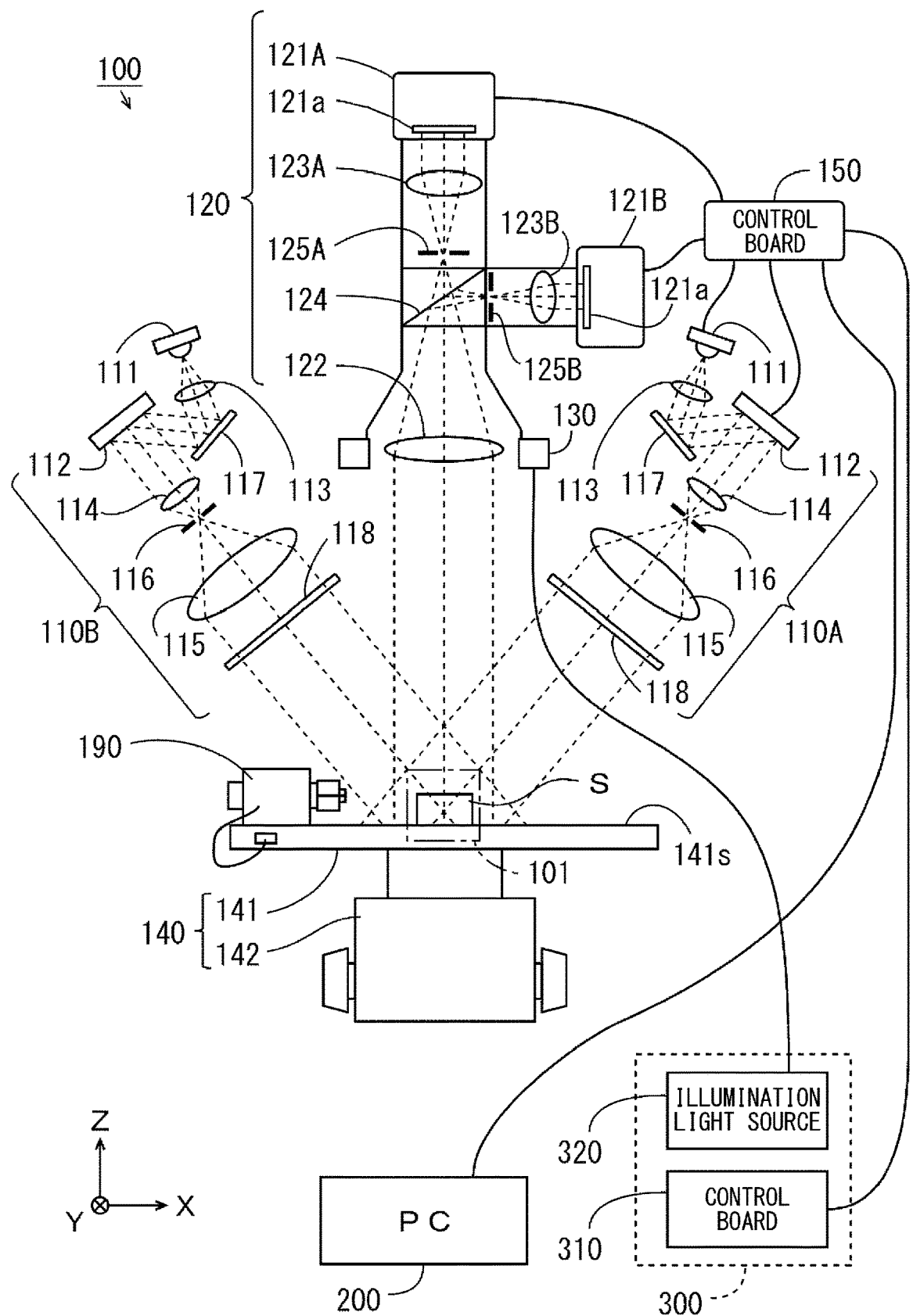
FIG. 2 is a schematic view illustrating a configuration of a measurement portion of the shape measuring apparatus of FIG. 1.
Figure 3:
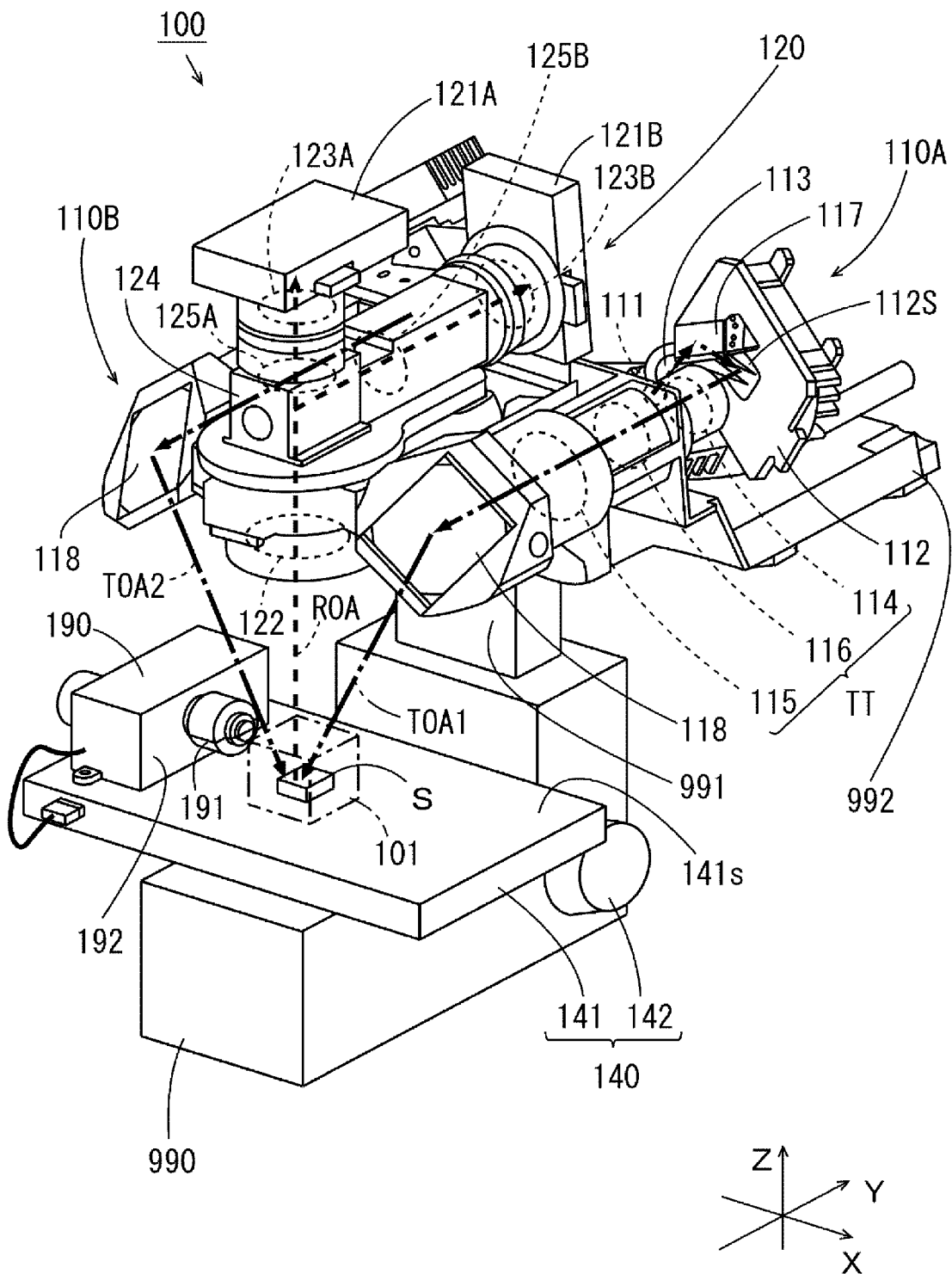
FIG. 3 is an external perspective view of the measurement portion of the shape measuring apparatus of FIG. 1.

FIG. 1 is a block diagram illustrating a configuration of a shape measuring apparatus according to an embodiment of the present invention. FIG. 2 is a schematic view illustrating a configuration of a measurement portion of a shape measuring apparatus 500 of FIG. 1. FIG. 3 is an external perspective view of a measurement portion of the shape measuring apparatus 500 of FIG. 1.

As illustrated in FIG. 1, the shape measuring apparatus 500 includes a measurement portion 100, a personal computer (PC) 200, a control portion 300, and a display portion 400. The measurement portion 100 is, for example, a microscope, and includes a plurality of light projecting portions 110A and 110B, a light receiving portion 120, an illumination light output portion 130, a stage 140, a control board 150, and a rotation unit 190. As illustrated in FIG. 2, each of the light projecting portions 110A and 110B includes a measurement light source 111, a pattern generation portion 112, a plurality of lenses 113, 114, and 115, a diaphragm 116, and a plurality of bending mirrors 117 and 118. The light receiving portion 120 includes a plurality of cameras 121A and 121B, a plurality of lenses 122, 123A, and 123B, a half mirror 124, and diaphragms 125A and 125B.

In the measurement portion 100, a measurement space 101 in which the shape of a measurement subject S can be measured is determined based on the positional relationship between the light projecting portions 110A and 110B and the light receiving portion 120. In FIGS. 2 and 3, the measurement space 101 is indicated by a one-dotted chain line. Apart of an upper surface 141$s$ of the stage 140 is located in the measurement space 101. The measurement subject S is placed on the upper surface 141$s$ of the stage 140, or the measurement subject S is held by the rotation unit 190 described later, whereby the measurement subject S is disposed in the measurement space 101.

Here, in the measurement portion 100 of FIGS. 2 and 3, two directions orthogonal to each other in the upper surface 141s of the stage 140 are defined as an X direction and a Y direction, and are indicated by arrows X and Y, respectively. Note that the X direction is a direction parallel to the front-back direction of the measurement portion 100, and the Y direction is a direction parallel to the left-right direction of the measurement portion 100. A direction orthogonal to the upper surface 141s of the stage 140 is defined as a Z direction, and is indicated by an arrow Z.

As illustrated in FIG. 3, the stage 140 is provided on a pedestal 990. A strut 991 is provided so as to extend upward from the pedestal 990. An optical system support 992 is attached to an upper end portion of the strut 991. The optical system support 992 supports the light receiving portion 120 so as to be located above the stage 140. In addition, the optical system support 992 supports the two light projecting portions 110A and 110B so as to be located obliquely above the stage 140. The two light projecting portions 110A and 110B are disposed side by side in the X direction. More specifically, the two light projecting portions 110A and 110B are disposed symmetrically with respect to a plane including an optical axis ROA of the light receiving portion 120 and orthogonal to the X direction. The two light projecting portions 110A and 110B and the light receiving portion 120 are accommodated in a head casing 160 (FIGS. 8 to 10) to be described later in a state of being supported by the optical system support 992.

The measurement light source 111 of each of the light projecting portions 110A and 110B is, for example, a halogen lamp that emits white light. The measurement light source 111 may be another light source such as a white LED (light emitting diode) that emits white light.

As illustrated in FIGS. 2 and 3, the light emitted from the measurement light source 111 is appropriately condensed by the lens 113, then reflected by the bending mirror 117, and incident on the pattern generation portion 112. The pattern generation portion 112 is, for example, a digital micromirror device (DMD). The pattern generation portion 112 may be a transmissive liquid crystal display (LCD), a reflective LCD, a liquid crystal on silicon (LCOS), or a mask. The pattern generation portion 112 generates a light flux (hereinafter, referred to as pattern light) having a pattern for shape measurement set in advance and intensity (brightness) set in advance from the incident light, and emits the generated pattern light from a pattern emission surface 112S (FIG. 3).

The pattern light emitted by the pattern generation portion 112 is expanded by the plurality of lenses 114 and 115 and the diaphragm 116, then reflected by the bending mirror 118, and applied to the measurement subject S on the stage 140. In this embodiment, a double-side telecentric optical system TT (FIG. 3) is configured by the plurality of lenses 114 and 115 and the diaphragm 116.

In the light receiving portion 120, the pattern light reflected above the stage 140 by the measurement subject S is incident on the lens 122 of the light receiving portion 120. Apart of the pattern light incident on the lens 122 is transmitted through the half mirror 124, condensed and imaged by the lens 123A and the diaphragm 125A, and received by the camera 121A. The rest of the pattern light incident on the lens 122 is reflected by the half mirror 124, condensed and imaged by the plurality of lenses 123B and the diaphragm 125B of the light receiving portion 120, and received by the camera 121B.

In the light receiving portion 120 according to this embodiment, the lenses 122 and 123A and the diaphragm 125A constitute one double-side telecentric optical system corresponding to the camera 121A. In addition, the lenses 122 and 123B and the diaphragm 125B constitute another double-side telecentric optical system corresponding to the camera 121B.

Each of the cameras 121A and 121B is, for example, a charge coupled apparatus (CCD) camera including an imaging element 121a and a lens. The imaging element 121a is, for example, a monochrome CCD (charge coupled apparatus). The imaging element 121a may be another imaging element such as a complementary metal oxide semiconductor (CMOS) image sensor. An analog electric signal (hereinafter, referred to as a light reception signal) corresponding to the amount of received light is output from each pixel of the imaging element 121a to the control board 150 (FIG. 1).

In this example, the illumination light output portion 130 emits light having a red wavelength, light having a green wavelength, and light having a blue wavelength to the measurement subject S in a time division manner. According to this configuration, the light receiving portion 120 using the monochrome CCD can capture a color image of the measurement subject S.

Note that the magnification of the lens 123A is lower than the magnification of the lens 123B. Alternatively, the magnification of the lens of the camera 121A is lower than the magnification of the lens of the camera 121B. Therefore, the camera 121A is used as a low magnification camera, and the camera 121B is used as a high magnification camera. For example, the user can select one of the low magnification camera and the high magnification camera as the camera used for the observation and the shape measurement of the measurement subject S by operating an operation portion 250 to be described later.

An A/D converter (analog/digital converter) and a first in first out (FIFO) memory, which are not illustrated, are mounted on the control board 150. The light reception signals output from the cameras 121A and 121B are sampled at a constant sampling period and converted into digital signals by the A/D converter of the control board 150 under the control of the control portion 300. The digital signals output from the A/D converter are sequentially accumulated in the FIFO memory. The digital signals accumulated in the FIFO memory are sequentially transferred to the PC 200 as pixel data.

As illustrated in FIG. 1, the PC 200 includes a central processing unit (CPU) 210, a read only memory (ROM) 220, a work memory 230, a storage device 240, and the operation portion 250. In addition, the operation portion 250 includes a keyboard and a pointing device. As the pointing device, a mouse, a joystick, or the like is used.

The ROM 220 stores a system program. The work memory 230 includes a random access memory (RAM) and is used for processing various types of data. The storage device 240 includes a hard disk or the like. The storage device 240 stores a shape measurement program for measuring the shape of the measurement subject S. The storage device 240 is used to store various types of data related to the shape measurement of the measurement subject S.

The CPU 210 executes the shape measurement program stored in the storage device 240. Accordingly, the CPU 210 generates image data based on the pixel data provided from the control board 150. Further, the CPU 210 performs various processes on the generated image data using the work memory 230, and displays an image based on the image data on the display portion 400. Further, the CPU 210 gives drive pulses to a stage drive portion 146 described later and a rotation drive portion 192 described later. A specific function exhibited by the CPU 210 executing the shape measurement program will be described later. The display portion 400 includes, for example, an LCD panel or an organic electroluminescence (EL) panel.

The stage 140 includes an XY stage 141 and a Z stage 142. The XY stage 141 has the upper surface 141s and has an X-direction moving mechanism and a Y-direction moving mechanism. The X-direction moving mechanism is a mechanism for moving the upper surface 141s in the X direction. The Y-direction moving mechanism is a mechanism for moving the upper surface 141s in the Y direction. The Z stage 142 includes a Z-direction moving mechanism for moving the upper surface 141s in the Z direction. The stage 140 may include a θ stage or a tilt stage. The θ stage is, for example, a stage having a mechanism rotatable about an axis orthogonal to the upper surface 141s. The tilt stage is a stage having a mechanism that can be inclined with respect to an axis parallel to the upper surface 141s.

Here, a plane located at the focal point of the light receiving portion 120 and perpendicular to the optical axis ROA of the light receiving portion 120 is referred to as a focal plane of the light receiving portion 120. As illustrated in FIGS. 2 and 3, the relative positional relationship among the light projecting portions 110A and 110B, the light receiving portion 120, and the stage 140 is set such that an optical axis TOA1 of the light projecting portion 110A extending from the light projecting portion 110A toward the upper surface 141s of the stage 140, an optical axis TOA2 of the light projecting portion 110B extending from the light projecting portion 110B toward the upper surface 141s of the stage 140, and the optical axis ROA of the light receiving portion 120 extending from the upper surface 141s of the stage 140 toward the light receiving portion 120 intersect each other at the focal plane of the light receiving portion 120.

In addition, a plane including the focal point of the light projecting portion 110A and parallel to the X, Y directions is referred to as a focal plane of the light projecting portion 110A, and a plane including the focal point of the light projecting portion 110B and parallel to the X, Y directions is referred to as a focal plane of the light projecting portion 110B. In this case, each of the light projecting portions 110A and 110B is configured such that the focal plane of the light projecting portion 110A and the focal plane of the light projecting portion 110B intersect at a position including the focal point of the light receiving portion 120.

With the above configuration, in the measurement portion 100, a space in which the irradiation region of the measurement light by the light projecting portion 110A, the irradiation region of the measurement light by the light projecting portion 110B, and the imaging region (imaging visual field) of the light receiving portion 120 overlap is formed. The overlapping space of these three regions is the measurement space 101. The size of the measurement space 101 varies depending on the magnification (high magnification or low magnification) of the camera selected by the user. The size of the measurement space 101 when the low magnification is selected is larger than the size of the measurement space 101 when the high magnification is selected.

A stepping motor is used for each of the X-direction moving mechanism, the Y-direction moving mechanism, and the Z-direction moving mechanism of the stage 140. As illustrated in FIG. 1, the measurement portion 100 includes a stage operation portion 145 and the stage drive portion 146 as components associated with the stage 140. The X-direction moving mechanism, the Y-direction moving mechanism, and the Z-direction moving mechanism of the stage 140 are driven by the stage operation portion 145 or the stage drive portion 146 of FIG. 1.

By manually operating the stage operation portion 145, the user can move the upper surface 141s of the stage 140 in the X direction, the Y direction, or the Z direction relative to the light receiving portion 120. The stage drive portion 146 supplies a current to each stepping motor of the stage 140 based on a drive pulse given from the PC 200, thereby moving the upper surface 141s of the stage 140 in the X direction, the Y direction, or the Z direction relative to the light receiving portion 120.

An encoder is attached to a stepping motor used for each of the X-direction moving mechanism, the Y-direction moving mechanism, and the Z-direction moving mechanism of the stage 140. The output signal of each encoder is provided to, for example, the CPU 210. The CPU 210 can calculate a change amount of the position (X position) in the X direction, the position (Y position) in the Y direction, or the position (Z position) in the Z direction of the upper surface 141s of the stage 140 on the basis of the signal given from each encoder of the stage 140.

In the stage 140, a reference position in the X, Y directions is determined in advance for the XY stage 141. The reference position is, for example, the position of the XY stage 141 when the center of the upper surface 141s is located on the optical axis ROA of the light receiving portion 120. The reference position may be determined such that the entire measurement space 101 overlaps the upper surface 141s of the stage 140 in a plan view. Therefore, if the measurement space 101 is located on the upper surface 141s of the stage 140, the reference position may be the position of the XY stage 141 when the portion excluding the center of the upper surface 141s is located on the optical axis ROA of the light receiving portion 120.

As illustrated in FIGS. 2 and 3, the XY stage 141 according to this embodiment has a rectangular plate shape extending in the X direction. The rotation unit 190 is provided at an end of the XY stage 141 in the X direction. The rotation unit 190 is configured to be attachable to and detachable from the stage 140.

Figure 4A:
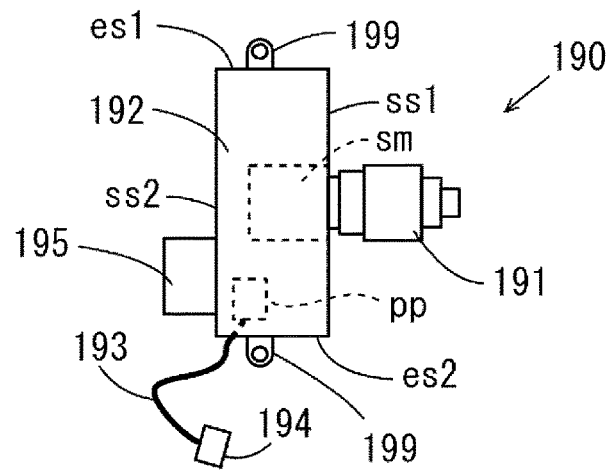
FIGS. 4A to 4C are diagrams for explaining a configuration of a rotation unit and attachment and detachment of the rotation unit to and from a stage.
Figure 4B:
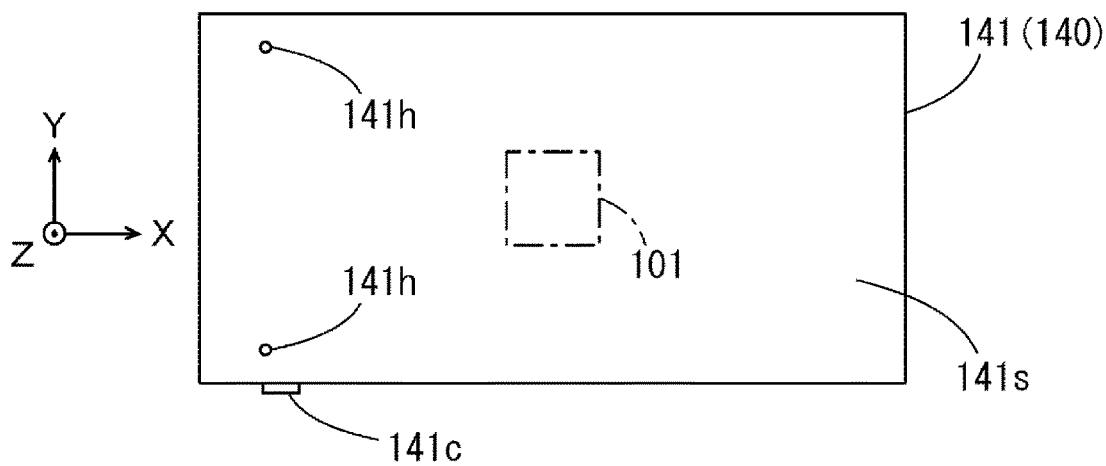
Figure 4C:
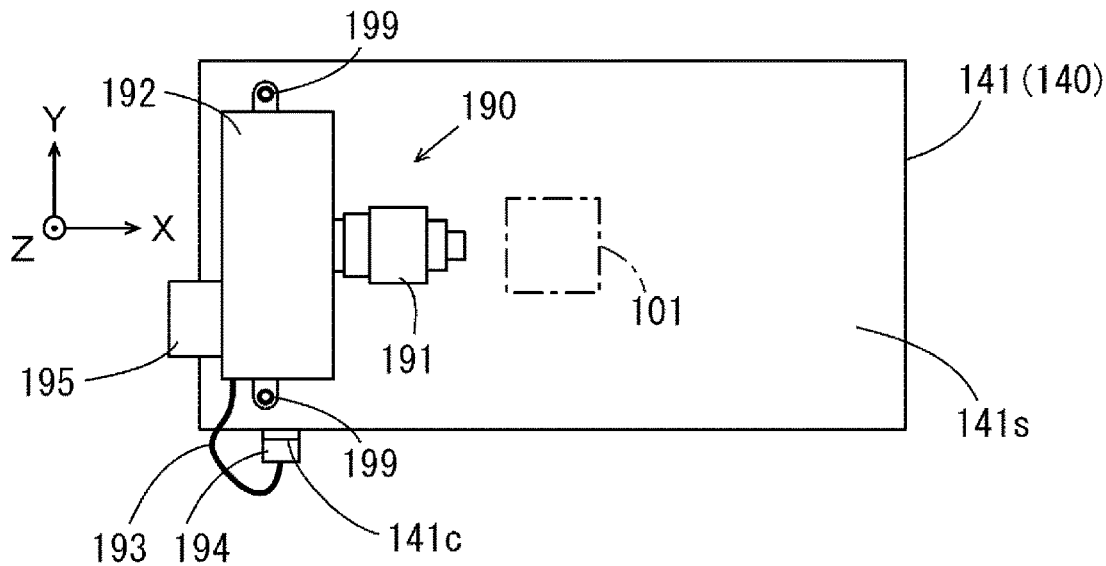

FIGS. 4A to 4C are diagrams for explaining a configuration of the rotation unit 190 and attachment and detachment of the rotation unit 190 to and from the stage 140. FIG. 4A illustrates a plan view of the rotation unit 190. FIG. 4B illustrates a plan view of the XY stage 141. FIG. 4C illustrates a plan view of the XY stage 141 to which the rotation unit 190 is attached.

As illustrated in FIG. 4A, the rotation unit 190 includes a holding portion 191 and the rotation drive portion 192. The rotation drive portion 192 has a configuration in which a stepping motor sm and a power source portion pp are housed in a casing having a substantially rectangular parallelepiped shape. The stepping motor sm is used to rotate the holding portion 191. The power source portion pp supplies power to the stepping motor sm. The casing of the rotation drive portion 192 has two end surfaces es1 and es2 facing each other in the longitudinal direction and two side surfaces ss1 and ss2 facing each other in the lateral direction.

The holding portion 191 is a chuck configured to be able to hold the measurement subject S by sandwiching the measurement subject S between a pair of holding pieces 92 and 93 (FIGS. 5 to 7) to be described later, and is provided so as to protrude from the side surface ss1 by a predetermined distance. In addition, the holding portion 191 is supported by the stepping motor sm of the rotation drive portion 192 so as to be rotatable about a rotation axis orthogonal to the side surface ss1. Details of the holding portion 191 will be described later. On the other side surface ss2 of the rotation drive portion 192, a holding dial 195 for adjusting a distance between the pair of holding pieces 92 and 93 (FIGS. 5 to 7) to be described later is provided.

Attachment portions 199 for attaching the rotation unit 190 on the XY stage 141 are provided at the lower ends of both the end surfaces es1 and es2 of the rotation drive portion 192. A through hole into which a screw can be inserted is formed in the attachment portion 199. In addition, a cable 193 is provided in the rotation drive portion 192 so as to extend outward from the power source portion pp in the casing through the one end surface es2. A connector 194 is provided at a distal end of the cable 193. The cable 193 and the connector 194 are used to supply power from a rotation unit board (described later) provided inside the XY stage 141 to the power source portion pp and exchange signals between a rotation unit board and the power source portion pp.

As illustrated in FIG. 4B, the upper surface 141s of the XY stage 141 has a rectangular shape extending in the X direction. At one end portion of the upper surface 141s in the X direction, two screw holes 141h respectively corresponding to the two attachment portions 199 of the rotation unit 190 are formed. In this example, it is assumed that the XY stage 141 is at the reference position. In this case, the outer edge of the measurement space 101 surrounds the center of the upper surface 141s of the XY stage 141 in a plan view.

In the XY stage 141, a control board (hereinafter, referred to as a rotation unit board) for supplying power to the power source portion pp of the rotation unit 190 and controlling the operation of the rotation drive portion 192 is provided. A connector 141c for electrically connecting the rotation unit board and the rotation unit 190 is provided on one side portion of the XY stage 141 facing the front of the measurement portion 100.

As illustrated in FIG. 4C, the rotation unit 190 is mounted on the XY stage 141. At the time of attachment, the two attachment portions 199 of the rotation unit 190 are positioned on the two screw holes 141h of the XY stage 141. Screws are attached to the screw holes 141h through the through holes of the attachment portions 199. As a result, the rotation unit 190 is fixed to a predetermined position on the upper surface 141s of the XY stage 141. In a state where the XY stage 141 is at the reference position, the rotation unit 190 is located in a space deviated from the measurement space 101. In this case, since the rotation unit 190 is not located in the measurement space 101, the measurable range of the measurement subject S is prevented from being limited by the rotation unit 190.

Further, when the rotation unit 190 is attached to the XY stage 141, the connector 194 provided in the cable 193 is connected to the connector 141c of the XY stage 141. As a result, power can be supplied from the XY stage 141 to the rotation unit 190. In addition, the rotation drive portion 192 of the rotation unit 190 is controlled by the CPU 210 via the rotation unit board of the XY stage 141.

An encoder is attached to the stepping motor sm of the rotation drive portion 192. The output signal of the encoder is provided to the CPU 210 by electrically connecting the rotation unit 190 and the XY stage 141. The CPU 210 can calculate an angular position (rotation angle) in the rotation direction of the holding portion 191 on the basis of a signal given from the encoder of the rotation unit 190.

Figure 5:
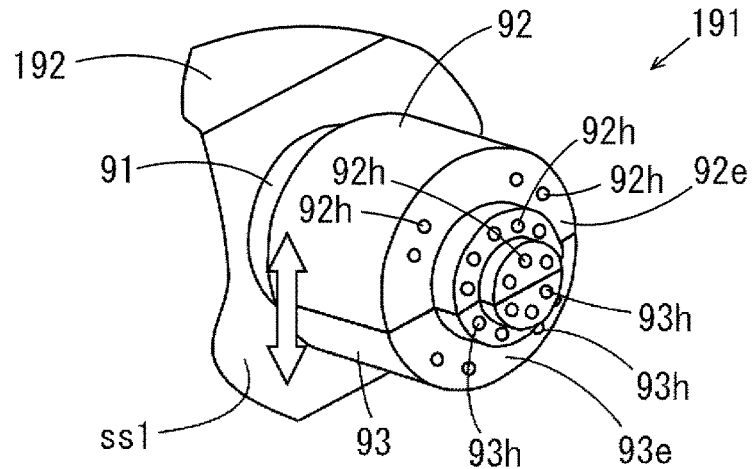
FIG. 5 is an external perspective view for explaining details of a configuration of a holding portion.
Figure 6:
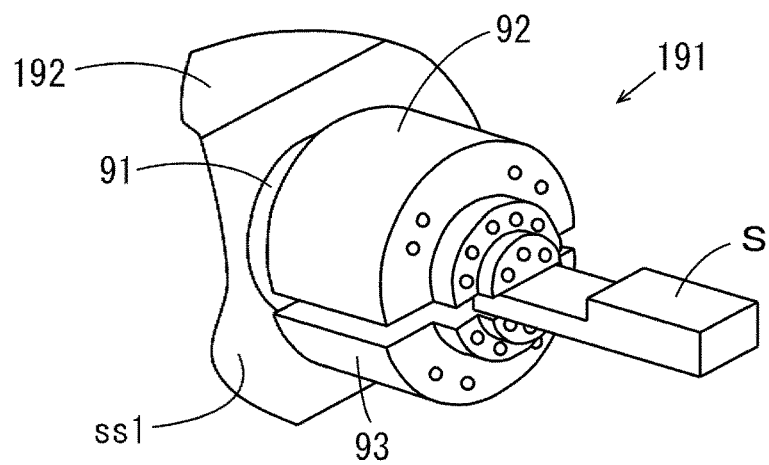
FIG. 6 is an external perspective view for explaining the details of the configuration of the holding portion.
Figure 7:
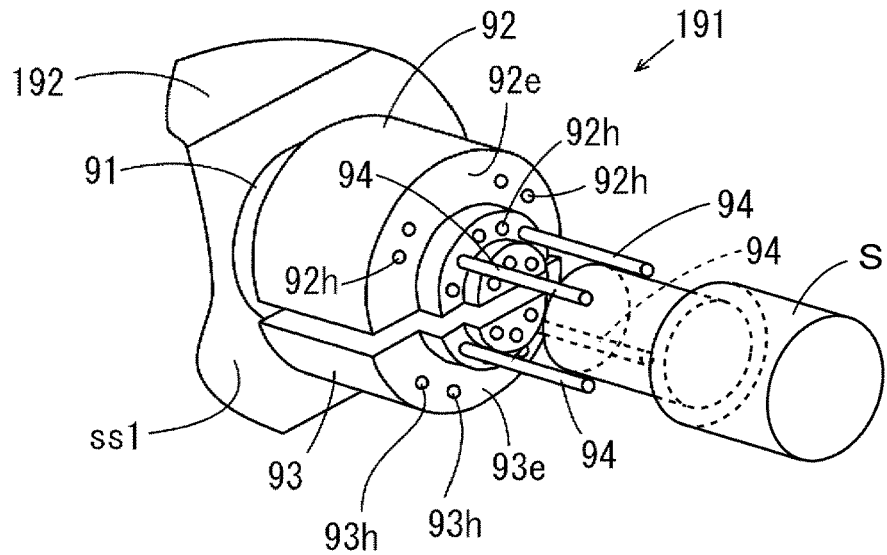
FIG. 7 is an external perspective view for explaining the details of the configuration of the holding portion.

Here, details of the holding portion 191 will be described. FIGS. 5 to 7 are external perspective views for explaining details of the configuration of the holding portion 191. As illustrated in FIG. 5, the holding portion 191 includes a rotation support shaft 91, the pair of holding pieces 92 and 93, and an opening and closing mechanism (not illustrated).

The rotation support shaft 91 is connected to the stepping motor sm of the rotation drive portion 192, and is rotatably supported about the central axis of the rotation support shaft 91. Each of the pair of holding pieces 92 and 93 has a semicircular columnar shape, and is provided so as to sandwich the distal end portion of the rotation support shaft 91 and form a single column by the pair of holding pieces 92 and 93. The opening and closing mechanism (not illustrated) changes the distance between the pair of holding pieces 92 and 93 according to the operation of the holding dial 195 (FIG. 4A) by the user as indicated by a white arrow in FIG. 5. As a result, as illustrated in FIG. 6, the holding portion 191 is configured to hold (grip) the measurement subject S by the pair of holding pieces 92 and 93 sandwiching a part of the measurement subject S.

A plurality of holes 92h and 93h are formed in end surfaces 92e and 93e located at the distal ends of the holding pieces 92 and 93, respectively. Rod-shaped members 94 can be inserted into the plurality of holes 92h and 93h. By selectively inserting a predetermined number of rod-shaped members 94 into the plurality of holes 92h and 93h of the holding pieces 92 and 93, it is also possible to hold the measurement subject S using the plurality of rod-shaped members 94 as illustrated in FIG. 7.

By disposing the measurement subject S held by the holding portion 191 in the measurement space 101, it is possible to measure the three-dimensional shape of a portion facing upward of the measurement subject S located in the measurement space 101.

According to the configuration of the holding portion 191, since the measurement subject S is held in a cantilever manner, the portion of the measurement subject S held by the holding portion 191 is reduced. Therefore, the three-dimensional shape can be measured in a wider range of the surface of the measurement subject S by rotating the measurement subject S in the measurement space 101.

Figure 8:
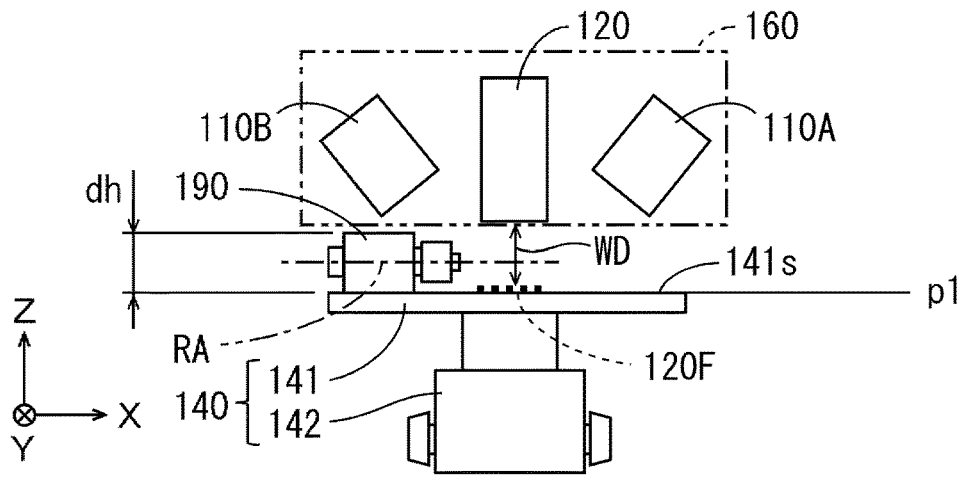
FIG. 8 is a diagram for explaining a preferable movable stroke range in a Z direction of the stage of FIG. 1.
Figure 9:
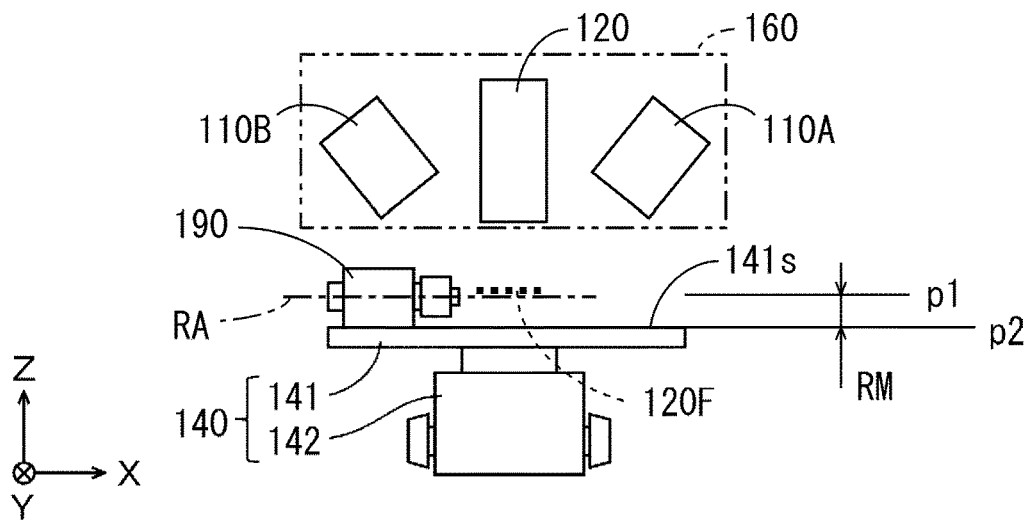
FIG. 9 is a diagram for explaining a preferable movable stroke range in the Z direction of the stage of FIG. 1.
Figure 10:
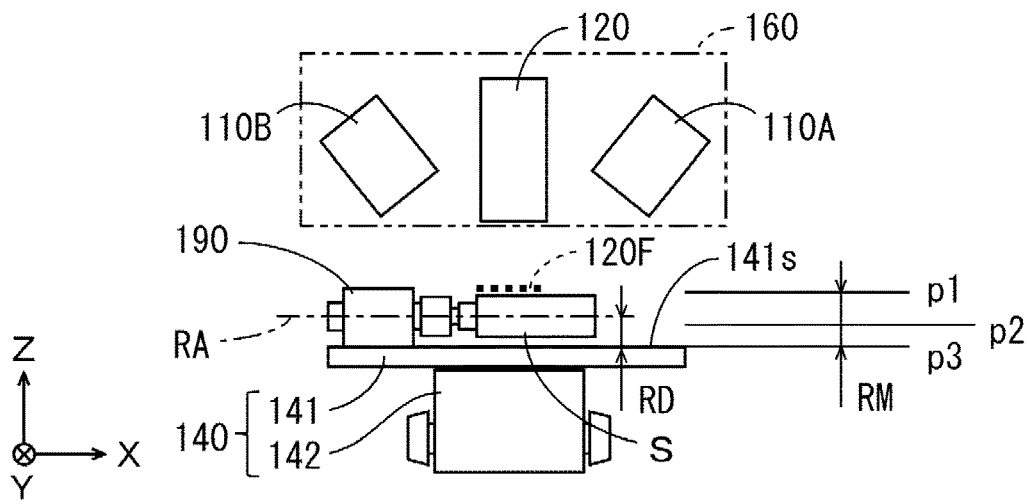
FIG. 10 is a diagram for explaining a preferable movable stroke range in the Z direction of the stage of FIG. 1.

The range (hereinafter, referred to as a movable stroke range) of the stage 140 that can be moved up and down by the Z-direction moving mechanism is preferably determined based on, for example, the positional relationship between the stage 140 and the light receiving portion 120. FIGS. 8 to 10 are diagrams for explaining a preferable movable stroke range in the Z direction of the stage 140 of FIG. 1.

FIGS. 8 to 10 are schematic front views of the measurement portion 100. In FIGS. 8 to 10, the head casing 160 accommodating the light projecting portions 110A and 110B and the light receiving portion 120 is indicated by a two-dot chain line, and a focal plane 120F of the light receiving portion 120 is indicated by a thick dotted line. Further, a rotation axis RA passing through the center of the rotation support shaft 91 (FIGS. 5 to 7) in the rotation unit 190 is indicated by a one-dot chain line. In this example, the lens 122 (FIG. 2) of the light receiving portion 120 is located at the lower end portion of the head casing 160. In this example, the rotation axis RA extends in parallel with the X direction in a state where the rotation unit 190 is attached to the stage 140.

As illustrated in FIG. 8, the stage 140 is preferably configured such that at least the upper surface 141s can be disposed at a height position p1 located in the focal plane 120F of the light receiving portion 120. In this case, the rotation unit 190 is preferably designed such that the dimension (height) dh in the Z direction is smaller than a working distance WD from the lens 122 of the light receiving portion 120 to the focal plane 120F.

Next, as illustrated in FIG. 9, the stage 140 is preferably configured such that at least the rotation axis RA of the rotation unit 190 can be disposed at a height position p2 located in the focal plane 120F of the light receiving portion 120 in a state where the rotation unit 190 is attached. In order to realize the arrangement illustrated in the examples of FIGS. 8 and 9, a movable stroke range RM of the stage 140 in the Z direction of FIG. 1 needs to be determined such that the position of the focal plane 120F of the light receiving portion 120 can be adjusted between the upper surface 141s and the rotation axis RA in the Z direction.

Here, a distance from the upper surface 141s to the rotation axis RA in the Z direction is defined as a reference distance RD. In this case, as illustrated in FIG. 10, it is more preferable that the stage 140 is configured to be arrangeable at a height position p3 when the focal plane 120F is disposed at a height position separated upward from the upper surface 141s by a distance twice the reference distance RD in a state where the rotation unit 190 is attached.

According to such a configuration, the shape measurement can be performed over a wide range for the measurement subject S that does not interfere with the upper surface 141s during the rotation with the rotation axis RA as a reference. Therefore, the movable stroke range RM of the stage 140 in the Z direction of FIG. 1 is preferably set such that the position of the focal plane 120F of the light receiving portion 120 can be adjusted between the upper surface 141s and a height position separated above the upper surface 141s by a distance twice the reference distance RD.

As illustrated in FIG. 1, the control portion 300 includes a control board 310 and an illumination light source 320. A CPU (not illustrated) is mounted on the control board 310. The CPU of the control board 310 controls the light projecting portions 110A and 110B, the light receiving portion 120, and the control board 150 based on a command from the CPU 210 of the PC 200.

The illumination light source 320 includes, for example, three LEDs that emit red light, green light, and blue light. By controlling the luminance of the light emitted from each LED, light of an arbitrary color can be generated from the illumination light source 320. The light (hereinafter, referred to as illumination light) generated from the illumination light source 320 is output from the illumination light output portion 130 of the measurement portion 100 through a light guide member (light guide). Note that the illumination light source 320 may not be provided in the control portion 300, and the illumination light source 320 may be provided in the measurement portion 100. In this case, the measurement portion 100 is not provided with the illumination light output portion 130.

The illumination light output portion 130 of FIG. 2 has an annular shape, and is disposed above the stage 140 so as to surround the light receiving portion 120. As a result, the illumination light is emitted from the illumination light output portion 130 to the measurement subject S so as not to generate a shadow.

Figure 11:
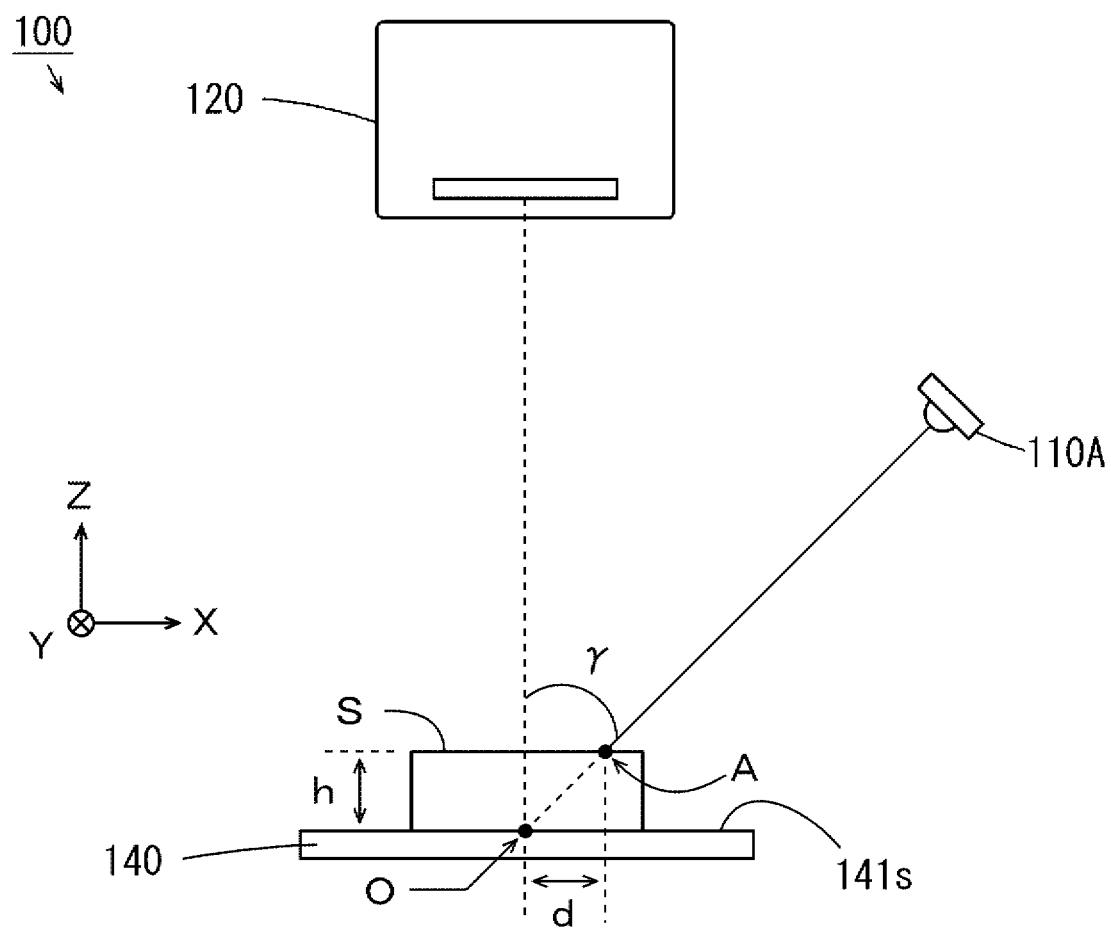
FIG. 11 is a diagram for explaining the principle of a triangulation method.

[2] Three-Dimensional Shape Data Indicating Three-Dimensional Shape of Measurement Subject (1) Shape Measurement of Measurement Subject by Triangulation Method In the measurement portion 100, the shape of the measurement subject S is measured by a triangulation method. FIG. 11 is a diagram for explaining the principle of the triangulation method. As illustrated in FIG. 11, for example, an angle γ between the optical axis of the light beam emitted from the light projecting portion 110A and the optical axis of the reflected light incident on the light receiving portion 120 (the optical axis of the light receiving portion 120) is set in advance. The angle γ is larger than 0 degrees and smaller than 90 degrees.

When the measurement subject S is not disposed on the stage 140, the light beam emitted from the light projecting portion 110A is reflected by a point O on the upper surface 141s of the stage 140, and is incident on the light receiving portion 120. On the other hand, when the measurement subject S is disposed on the stage 140, the light beam emitted from the light projecting portion 110A is reflected by a point A on the surface of the measurement subject S, and is incident on the light receiving portion 120.

Assuming that d is a distance between the point O and the point A in the X direction, the height h of the point A of the measurement subject S with respect to the upper surface 141s of the stage 140 is given by h=d÷tan(γ). The CPU 210 of the PC 200 of FIG. 1 measures the distance d between the point O and the point A in the X direction based on the pixel data of the measurement subject S given by the control board 150. The CPU 210 calculates the height h of the point A on the surface of the measurement subject S based on the measured distance d. The three-dimensional shape of the measurement subject S is measured by calculating the heights of all the points on the surface of the measurement subject S.

At the time of shape measurement of the triangulation method, pattern light having various patterns is sequentially emitted from the light projecting portions 110A and 110B of FIG. 1 toward the stage 140 in order to irradiate all points on the surface of the measurement subject S with light. For example, the striped pattern light having a linear cross section parallel to the Y direction and aligned in the X direction is emitted from each of the light projecting portions 110A and 110B a plurality of times while the spatial phase thereof is changed. In addition, the code-like pattern light having a linear cross section parallel to the Y direction and in which a bright portion and a dark portion are arranged in the X direction is emitted from each of the light projecting portions 110A and 110B a plurality of times while the bright portion and the dark portion are changed into a gray code shape.

In the CPU 210 (FIG. 1), three-dimensional shape data representing the three-dimensional shape of the measurement subject S is generated based on the image data of the measurement subject S on which a predetermined pattern light is projected. The three-dimensional shape data includes position data on the surface of the measurement subject S. In the measurement portion 100, a three-dimensional coordinate system (hereinafter, referred to as an apparatus coordinate system) having a unique positional relationship with respect to the light receiving portion 120 is defined. The apparatus coordinate system of this example includes an X axis, a Y axis, and a Z axis parallel to the X direction, the Y direction, and the Z direction. The position data represents, for example, coordinates in the apparatus coordinate system. In the following description, the image of the measurement subject S displayed based on the three-dimensional shape data is referred to as a three-dimensional shape image.

(2) Synthesis of Plurality of Three-Dimensional Shape Data in X, Y Directions

In a state where the measurement subject S is placed on the upper surface 141s of the stage 140, when the measurement subject S does not fall within the measurement space 101 in the X, Y directions, only a part of the upper surface of the measurement subject S is irradiated with the pattern light. Therefore, the three-dimensional shape data over a wide range of the surface of the measurement subject S cannot be obtained.

Therefore, when the upper surface of the measurement subject S does not fall within the measurement space 101 in the X, Y directions, images of a plurality of portions of the measurement subject S may be captured by moving the upper surface 141s of the stage 140 in the X, Y directions relative to the light receiving portion 120. In this case, a plurality of pieces of three-dimensional shape data respectively corresponding to the plurality of portions of the measurement subject S can be acquired, and the plurality of pieces of acquired three-dimensional shape data can be synthesized.

Figure 12A:
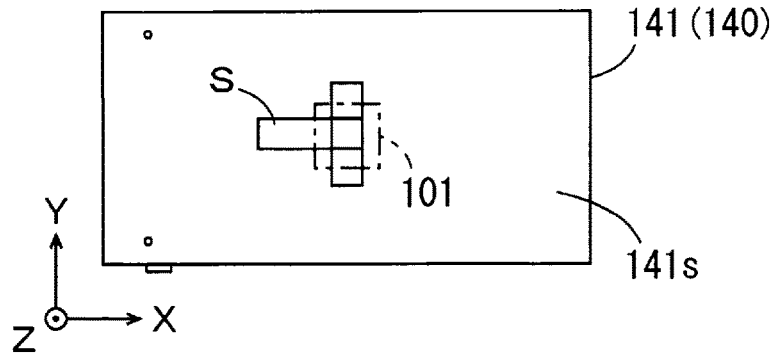
FIGS. 12A to 12H are diagrams for explaining an example of generating a plurality of pieces of three-dimensional shape data by moving an upper surface of the stage in X, Y directions.
Figure 12E:
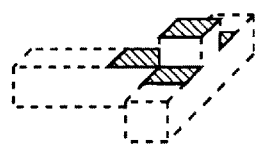
Figure 12B:
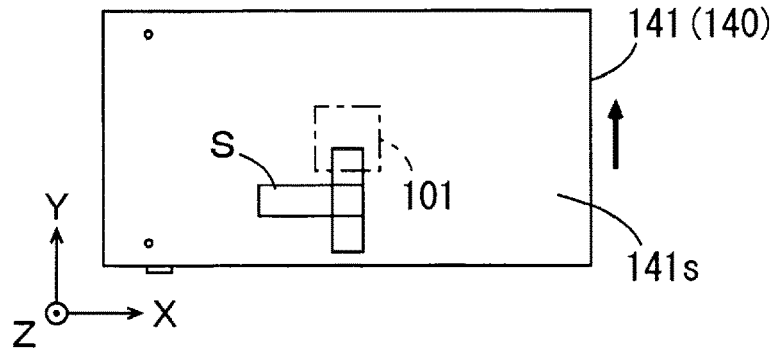
Figure 12F:
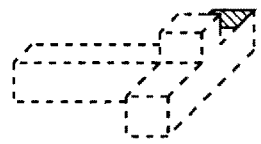
Figure 12C:
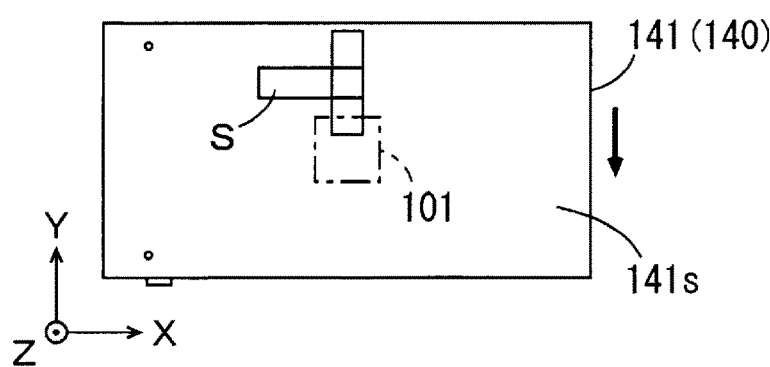
Figure 12G:
Figure 12D:
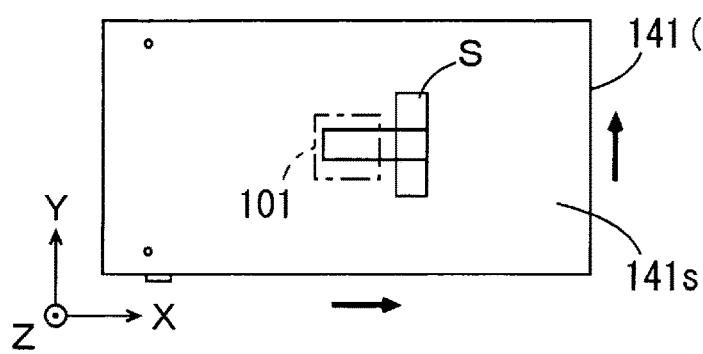
Figure 12H:
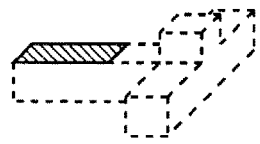
Figure 13A:
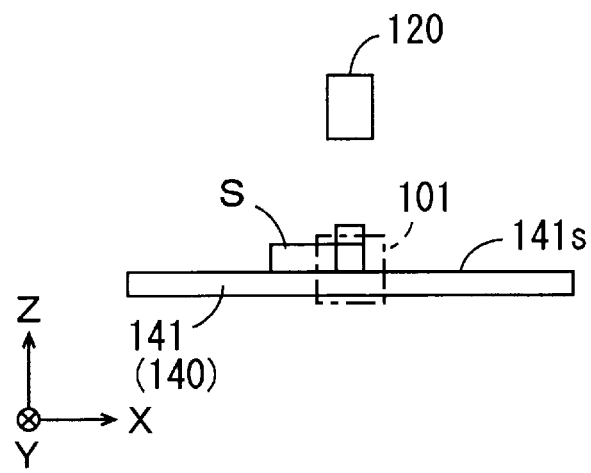
FIGS. 13A to 13D are diagrams for explaining an example of generating a plurality of pieces of three-dimensional shape data by moving the upper surface of the stage in the Z direction.
Figure 13C:
Figure 13B:
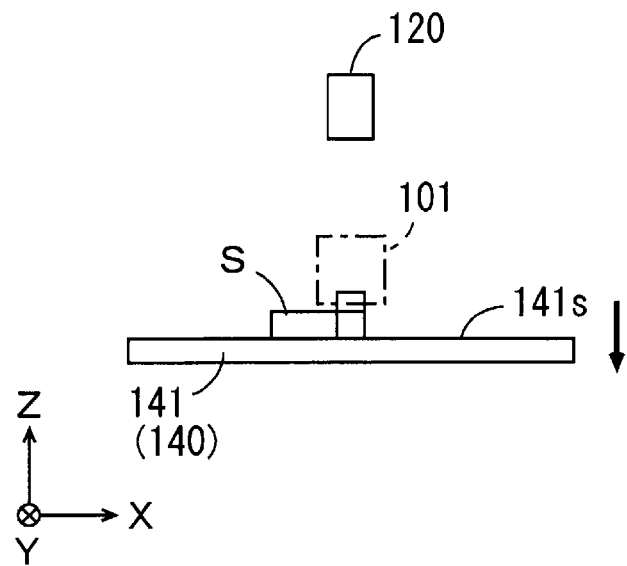
Figure 13D:

FIGS. 12A to 12H are diagrams for explaining an example of generating a plurality of pieces of three-dimensional shape data by moving the upper surface 141s of the stage 140 in the X, Y directions. For example, as illustrated in FIG. 12A, the measurement subject S is placed on the stage 140 by the user. After the position and posture of the measurement subject S are adjusted on the stage 140, imaging using pattern light is performed to generate first three-dimensional shape data. FIG. 12E illustrates an example of the three-dimensional shape image acquired as a result. In the three-dimensional shape images illustrated in FIGS. 12E to 12H and FIGS. 13C and 13D and FIGS. 14D to 14F to be described later, the dotted line virtually represents the entire outer shape of the measurement subject S.

As illustrated in FIG. 12(*a*), in this example, when the first three-dimensional shape data is generated, only a part of the measurement subject S in the X, Y directions is disposed in the measurement space 101. Therefore, in the three-dimensional shape image illustrated in FIG. 12(*e*), a plurality of portions in the X, Y directions on the upper surface of the measurement subject S are missing.

Therefore, as illustrated in FIGS. 12(*b*) to 12(*d*), the upper surface 141s of the stage 140 is moved in the X, Y directions such that a plurality of portions of the measurement subject S not represented by the first three-dimensional shape data are sequentially disposed in the measurement space 101. In addition, every time each portion of the measurement space 101 is disposed in the measurement space 101, imaging using pattern light is performed, and second to fourth three-dimensional shape data are generated. FIGS. 12F to 12H illustrate three-dimensional shape images respectively corresponding to the second to fourth three-dimensional shape data. In this manner, the movement of the stage 140 in the X, Y directions and the imaging of the measurement subject S are repeated, so that a plurality of pieces of three-dimensional shape data respectively corresponding to a plurality of portions on the upper surface of the measurement subject S are generated. By synthesizing the plurality of pieces of generated three-dimensional shape data, three-dimensional shape data over a wide range of the surface of the measurement subject S is generated. In the following description, synthesis for expanding the target range for shape measurement of the measurement subject S in the X, Y directions is referred to as planar direction synthesis.

(3) Synthesis of Plurality of Pieces of Three-Dimensional Shape Data in Z Direction When the upper surface of the measurement subject S does not fall within the measurement space 101 (within the range of the depth of field of the light receiving portion 120) in the Z direction in a state where the measurement subject S is placed on the upper surface 141s of the stage 140, the light receiving portion 120 focuses only on a part of the upper surface of the measurement subject S. Therefore, the three-dimensional shape data over a wide range of the surface of the measurement subject S cannot be obtained.

Therefore, when the upper surface of the measurement subject S does not fall within the measurement space 101 in the Z direction, images of a plurality of portions of the measurement subject S may be captured by moving the upper surface 141s of the stage 140 in the Z direction relative to the light receiving portion 120. In this case, a plurality of pieces of three-dimensional shape data respectively corresponding to the plurality of portions of the measurement subject S can be acquired, and the plurality of pieces of acquired three-dimensional shape data can be synthesized.

FIG. 13 is a diagram for explaining an example of generating a plurality of pieces of three-dimensional shape data by moving the upper surface 141s of the stage 140 in the Z direction. For example, as illustrated in FIG. 13(*a*), the user places the measurement subject S on the stage 140, and performs imaging using pattern light, thereby generating the first three-dimensional shape data. FIG. 13(*c*) illustrates an example of the three-dimensional shape image acquired as a result.

As illustrated in FIG. 13(*a*), in this example, when the first three-dimensional shape data is generated, only a part of the upper surface of the measurement subject S in the Z direction is disposed in the measurement space 101. Therefore, in the three-dimensional shape image illustrated in FIG. 13(*c*), the uppermost end portion of the measurement subject S in the Z direction is missing.

Therefore, as illustrated in FIG. 13(*b*), the upper surface 141s of the stage 140 is moved in the Z direction such that a portion of the measurement subject S not represented by the first three-dimensional shape data is disposed in the measurement space 101. In addition, imaging using pattern light is performed, and the second three-dimensional shape data is generated. FIG. 13(*d*) illustrates a three-dimensional shape image corresponding to the second three-dimensional shape data.

In this manner, the movement of the stage 140 in the Z direction and the imaging of the measurement subject S are repeated, so that a plurality of pieces of three-dimensional shape data respectively corresponding to a plurality of portions of the measurement subject S are generated. By synthesizing the plurality of pieces of generated three-dimensional shape data, three-dimensional shape data over a wide range of the surface of the measurement subject S is generated. In the following description, synthesis for expanding the target range for shape measurement of the measurement subject S in the Z direction is referred to as height direction synthesis.

(4) Synthesis of Plurality of Pieces of Three-Dimensional Shape Data in Rotation Direction Even when the measurement subject S held by the rotation unit 190 is disposed in the measurement space 101, the pattern light reflected by the portion of the measurement subject S that is not directed toward the light receiving portion 120 is not incident on the light receiving portion 120. Therefore, at the time of shape measurement of the measurement subject S held by the rotation unit 190, images of a plurality of portions of the measurement subject S may be captured by rotating the measurement subject S about the rotation axis RA. In this case, a plurality of pieces of three-dimensional shape data respectively corresponding to the plurality of portions of the measurement subject S can be acquired, and the plurality of pieces of acquired three-dimensional shape data can be synthesized.

Figure 14A:
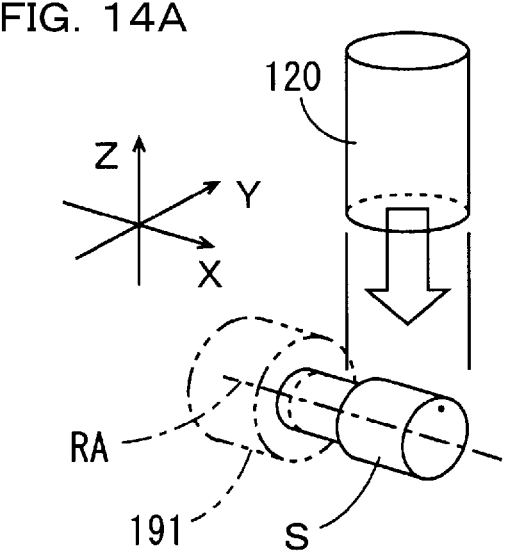
FIGS. 14A to 14F are diagrams for explaining an example of generating a plurality of pieces of three-dimensional shape data by rotating a measurement subject about a rotation axis using the rotation unit.
Figure 14D:
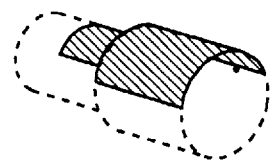
Figure 14B:
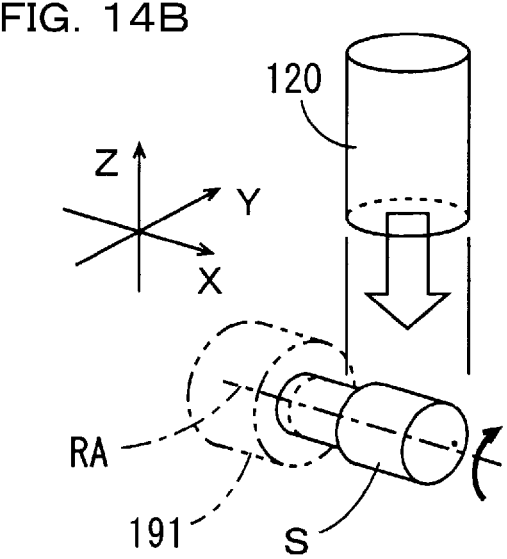
Figure 14E:
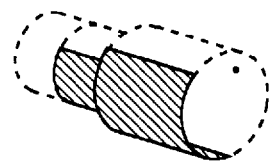
Figure 14C:
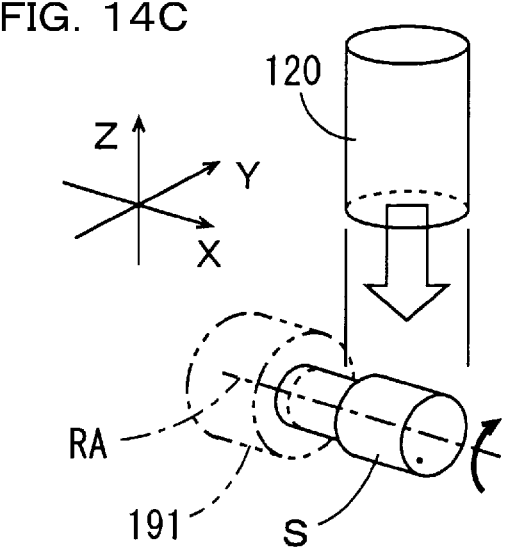

FIGS. 14A to 14F are diagrams for explaining an example of generating a plurality of pieces of three-dimensional shape data by rotating the measurement subject S about the rotation axis RA using the rotation unit 190. For example, as illustrated in FIG. 14A, the user attaches the measurement subject S to the holding portion 191 of the rotation unit 190. In FIGS. 14A to 14C, the holding portion 191 that holds the measurement subject S is schematically illustrated by a two-dot chain line.

The alignment is performed such that the measurement subject S is located in the measurement space 101 in a state where the measurement subject S is held by the rotation unit 190. Further, the first three-dimensional shape data is generated by performing imaging using pattern light. FIG. 14D illustrates an example of the three-dimensional shape image acquired as a result.

The measurement subject S used in this example has a substantially columnar shape extending in one direction, and one end of the measurement subject S is held by the holding portion 191 such that the axial center of the measurement subject S coincides with the rotation axis RA. In addition, a black dot is attached to the end portion of the measurement subject S of this example such that the rotation state of the measurement subject S can be easily understood.

As illustrated in FIG. 14A, when the first three-dimensional shape data is generated, an image of only a part of the outer peripheral surface of the measurement subject S facing the light receiving portion 120 is captured by the light receiving portion 120. Therefore, in the three-dimensional shape image illustrated in FIG. 14D, a relatively wide portion on the outer peripheral surface of the measurement subject S is missing.

Figure 14F:
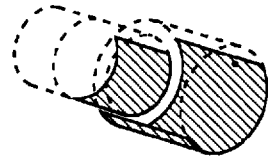

Therefore, as illustrated in FIGS. 14B and 14C, the rotation unit 190 rotates the measurement subject S at an angular interval (predetermined angular pitch) of an integral multiple of a predetermined angle such that a plurality of portions of the outer peripheral surface of the measurement subject S not represented by the first three-dimensional shape data sequentially face the light receiving portion 120. In addition, every time the measurement subject S rotates by a predetermined angle, imaging using pattern light is performed, and the second and third three-dimensional shape data are generated. FIGS. 14E and 14F illustrate three-dimensional shape images respectively corresponding to the second and third three-dimensional shape data.

By repeating the rotation of the measurement subject S by the predetermined angle and the imaging of the measurement subject S in this manner, a plurality of pieces of three-dimensional shape data respectively corresponding to a plurality of portions of the outer peripheral surface of the measurement subject S are generated. By synthesizing the plurality of pieces of generated three-dimensional shape data, three-dimensional shape data over a wide range (in this example, the entire outer peripheral surface) of the surface of the measurement subject S is generated. In the following description, synthesis for expanding the target range for shape measurement of the measurement subject S in the rotation direction with reference to the rotation axis RA is referred to as rotation direction synthesis.

[3] Calibration Function when Performing Rotation Direction Synthesis (1) Outline of Calibration Function As described above, when the rotation direction synthesis is performed, the measurement subject S rotates from a predetermined angular position (hereinafter, referred to as a reference angular position) at a predetermined angular pitch with respect to the rotation axis RA. Further, the three-dimensional shape data of the measurement subject S is generated in the state of being at the reference angular position, and the three-dimensional shape data of the measurement subject S is generated every time the measurement subject S is rotated at a predetermined angular pitch.

Here, if the rotation axis RA of the rotation unit 190 deviates from the design position defined in the apparatus coordinate system due to a change in the temperature environment or the use of the measurement portion 100 over time, accurate three-dimensional shape data cannot be obtained. Therefore, the shape measuring apparatus 500 according to this embodiment has first, second, and third calibration functions for offsetting the deviation (deviation amount and deviation direction) of the generated three-dimensional shape data with respect to the apparatus coordinate system at the time of shape measurement of the measurement subject S using the rotation direction synthesis. The first, second, and third calibration functions will be described in order.

(2) First Calibration Function

Figure 15A:
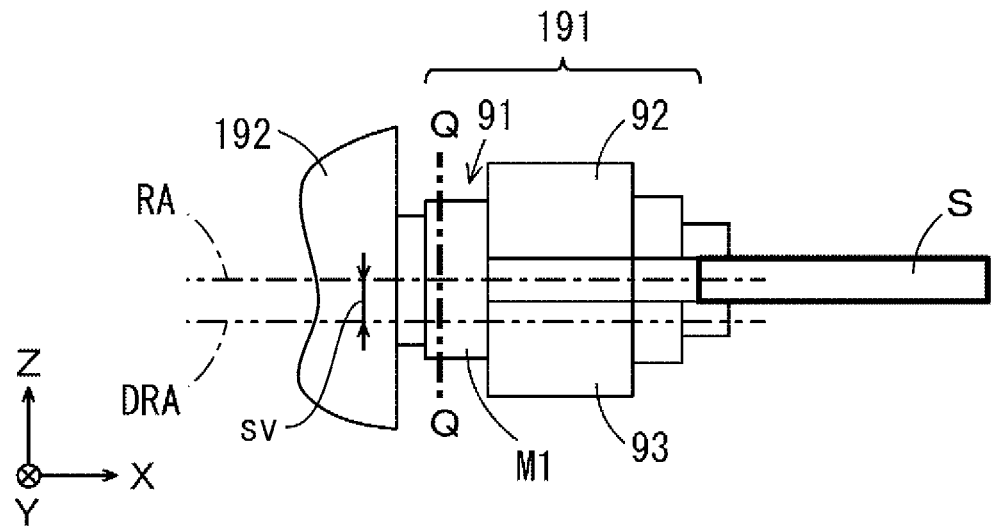
FIGS. 15A to 15C are diagrams for explaining a first calibration function.
Figure 15B:
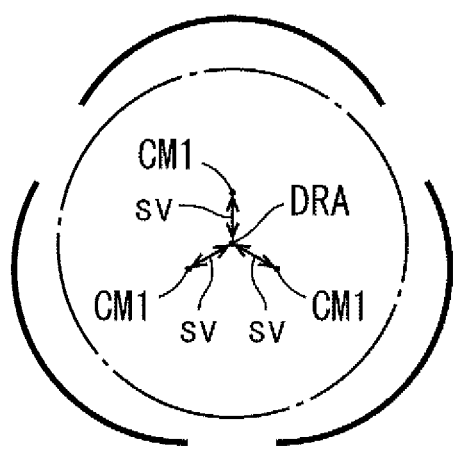
Figure 15C:
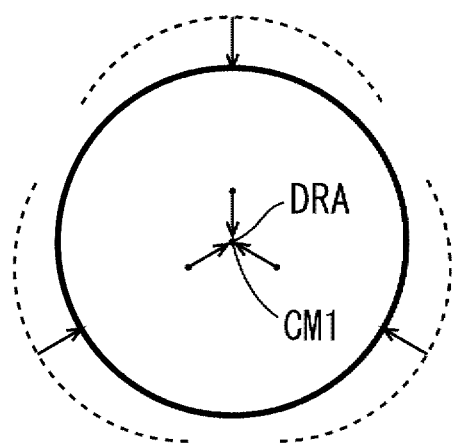

FIGS. 15A to 15C are diagrams for explaining the first calibration function. FIG. 15A is a side view of the holding portion 191 of the rotation unit 190 as viewed in the Y direction. As illustrated in FIG. 15A, in the holding portion 191, a part of the rotation support shaft 91 located between the rotation drive portion 192 and the holding pieces 92 and 93 is used as a first marker M1 for the first calibration function. The first marker M1 has a cylindrical outer peripheral surface, and is provided such that the center thereof is located on the rotation axis RA of the rotation unit 190. The dimension of the outer peripheral surface of the first marker M1 is known and stored in, for example, the storage device 240 of FIG. 1.

In FIG. 15A, it is assumed that the rotation axis RA of the rotation unit 190 is deviated in parallel from an ideal rotation axis (hereinafter, referred to as a design rotation axis) DRA that should exist in design in the apparatus coordinate system. In this case, in order to obtain accurate three-dimensional shape data of the measurement subject S, it is necessary to calculate a deviation sv between the design rotation axis DRA and the rotation axis RA.

Therefore, in the first calibration function, the shape of the outer peripheral surface of the first marker M1 is measured together with the measurement subject S at the time of shape measurement of the rotating measurement subject S. For example, when the measurement subject S rotates at a pitch of 120° about the rotation axis RA from the reference angular position, three-dimensional shape data indicating the outer peripheral surface of the first marker M1 is generated together with the measurement subject S at each angular position of 0°, 120°, and 240° is generated.

The three-dimensional shape data of the first marker M1 corresponding to each of the above three angles has, for example, an arc shape in a cross section taken along line Q-Q (YZ plane orthogonal to the X direction) passing through the first marker M1 in FIG. 15A. As described above, the dimension of the outer peripheral surface of the first marker M1 is known. Therefore, as indicated by a bold solid line in FIG. 15B, a center CM1 of the first marker M1 in the YZ plane can be calculated according to the arc-shaped three-dimensional shape data indicating a part of the outer peripheral surface of the first marker M1. A circle indicated by a one-dotted chain line in FIG. 15B represents the three-dimensional shape data of the first marker M1 to be originally generated with reference to the design rotation axis DRA.

The center of the first marker M1 is located on the rotation axis RA. Therefore, in the first calibration function, the calculation of the center of the first marker M1 in the specific YZ plane is equivalent to the calculation of the position of the rotation axis RA in the specific YZ plane.

The center CM1 of the first marker M1 on the three-dimensional shape data needs to naturally overlap the design rotation axis DRA in the YZ plane. However, when the actual rotation axis RA deviates from the design rotation axis DRA as described above, the center CM1 of the first marker M1 on the three-dimensional shape data does not overlap the design rotation axis DRA. Therefore, the deviation sv between the center CM1 of the first marker M1 on the three-dimensional shape data and the design rotation axis DRA is calculated.

In this case, as illustrated in FIG. 15C, the three-dimensional shape data of the first marker M1 corresponding to each of the plurality of angular positions is corrected such that the deviation sv calculated at the angular position is offset, whereby accurate three-dimensional shape data can be obtained. In other words, the three-dimensional shape data of the first marker M1 generated at each angular position can be accurate three-dimensional shape data by performing correction such that the center CM1 of the first marker M1 on the three-dimensional shape data coincides with the design rotation axis DRA.

Therefore, the three-dimensional shape data of the measurement subject S generated together with the three-dimensional shape data of the first marker M1 is corrected such that the deviation sv calculated at each angular position is offset. As a result, accurate three-dimensional shape data can be obtained for the measurement subject S. As a result, when the three-dimensional shape data generated at the plurality of angular positions is synthesized, it is possible to perform accurate shape measurement of the measurement subject S over a wide range.

(3) Second Calibration Function

Figure 16A:
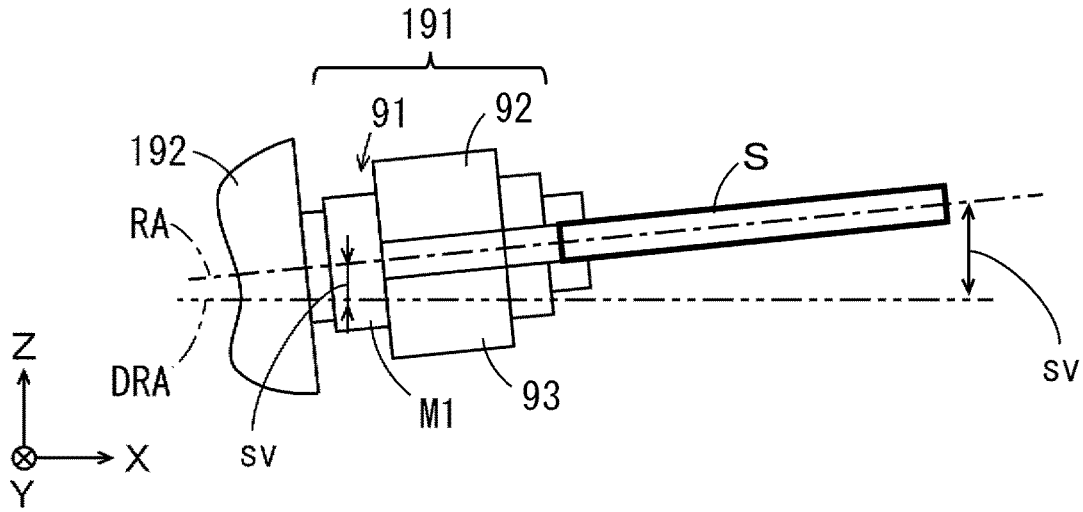
FIGS. 16A to 16C are diagrams for explaining a second calibration function.
Figure 16B:
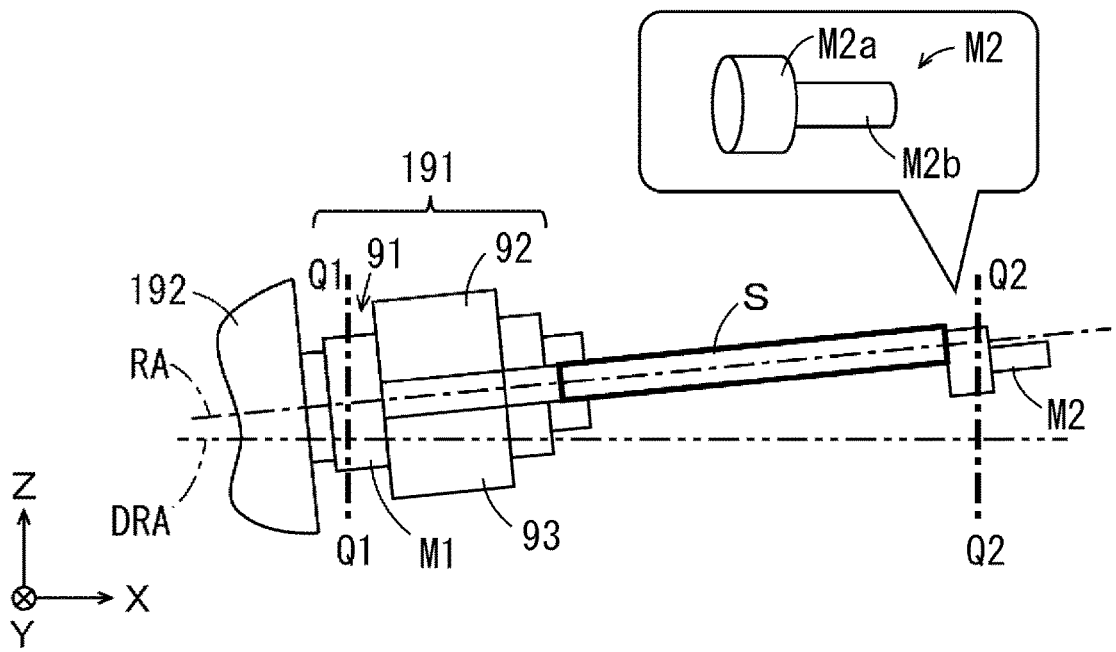
Figure 16C:
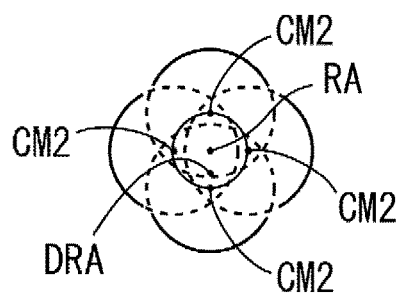

FIGS. 16A to 16C are diagrams for explaining the second calibration function. FIG. 16A is a side view of the holding portion 191 of the rotation unit 190 as viewed in the Y direction. In the example of FIG. 16A, the rotation axis RA of the rotation unit 190 is inclined and deviated from the design rotation axis DRA. In this case, the deviation sv between the design rotation axis DRA and the rotation axis RA varies depending on the position in the X direction. Therefore, even if the three-dimensional shape data of the first marker M1 and the measurement subject S is corrected by the first calibration function, accurate three-dimensional shape data cannot be obtained depending on the portion of the measurement subject S.

Therefore, in the second calibration function, a second marker M2 is used such that accurate three-dimensional shape data can be obtained even when the actual rotation axis RA is inclined with respect to the design rotation axis DRA. As illustrated in the balloon of FIG. 16B, the second marker M2 includes a large diameter portion M2a and a small diameter portion M2b. The large diameter portion M2a and the small diameter portion M2b each have a columnar shape, and are integrally molded so as to be arranged along the axial center.

A magnet is built in the large diameter portion M2a. Further, adhesiveness is imparted to the end surface of the large diameter portion M2a by providing an adhesive or an adhesive sheet. With such a configuration, the second marker M2 can be attached to and detached from a desired position of the measurement subject S made of a ferromagnetic material by magnetic force, and can be attached to and detached from a desired position of the measurement subject S made of a non-magnetic material by adhesive force.

In the second calibration function, for example, the second marker M2 is attached to a portion farthest from the first marker M1 in the measurement subject S. The dimensions of the outer peripheral surfaces of the large diameter portion M2a and the small diameter portion M2b of the second marker M2 are known, and are stored in, for example, the storage device 240 of FIG. 1.

In this state, at the time of shape measurement of the rotated measurement subject S, the measurement subject S is rotated to a plurality of predetermined angular positions. At each of the plurality of angular positions, the shapes of the outer peripheral surfaces of the first marker M1 and the second marker M2 are measured together with the measurement subject S. At this time, by the method described in the first calibration function, for example, the deviation sv between the design rotation axis DRA and the rotation axis RA is obtained in the cross section taken along line Q1-Q1 passing through the first marker M1 in FIG. 16B.

For example, the second marker M2 is used to obtain the deviation sv between the design rotation axis DRA and the rotation axis RA in a cross section taken along line Q2-Q2 passing through the second marker M2 in FIG. 16B. Specifically, for the second marker M2, three-dimensional shape data of a plurality of arc shapes corresponding to a plurality of predetermined angular positions is generated such that the entire circumference of the large diameter portion M2a (or the small diameter portion M2b) is covered in the cross section taken along line Q2-Q2. Thereafter, at each of the plurality of angular positions, the three-dimensional shape data of the plurality of arc shapes are synthesized so as to match the known dimension of the large diameter portion M2a (or the small diameter portion M2b).

In this case, as illustrated in FIG. 16C, a center CM2 of the second marker M2 when the second marker M2 is located at each of a plurality of angular positions in the cross section taken along line Q2-Q2 can be calculated. As a result, the rotation center of the second marker M2, that is, the position of the rotation axis RA in the cross section taken along line Q2-Q2 can be calculated. Therefore, the deviation sv between the calculated rotation axis RA and the design rotation axis DRA is calculated.

In this manner, the deviation sv at the position of the cross section taken along line Q1-Q1 and the deviation sv at the position of the cross section taken along line Q2-Q2 separated from each other in the X direction are calculated. This makes it possible to appropriately calculate the correction amount of the measurement subject S located between the first marker M1 and the second marker M2 based on the calculated two deviations sv. Therefore, more accurate three-dimensional shape data can be obtained for the measurement subject S. As a result, when the three-dimensional shape data generated at the plurality of angular positions is synthesized, it is possible to perform more accurate shape measurement of the measurement subject S over a wide range.

As described above, according to the second calibration function, the deviation sv of the rotation axis at the position of the second marker M2 in the X direction is calculated. Therefore, depending on the shape of the measurement subject S, the three-dimensional shape data may be corrected using only the deviation sv of the rotation axis at the position of the second marker M2. In this embodiment, the function of the configuration for correcting the three-dimensional shape data using only the deviation sv of the rotation axis at the position of the second marker M2 is included in the second calibration function.

When the three-dimensional shape data is corrected using only the deviation sv of the rotation axis at the position of the second marker M2, the second marker M2 may be disposed so as to be located between the measurement subject S and the holding portion 191 in the X direction.

Figure 17:
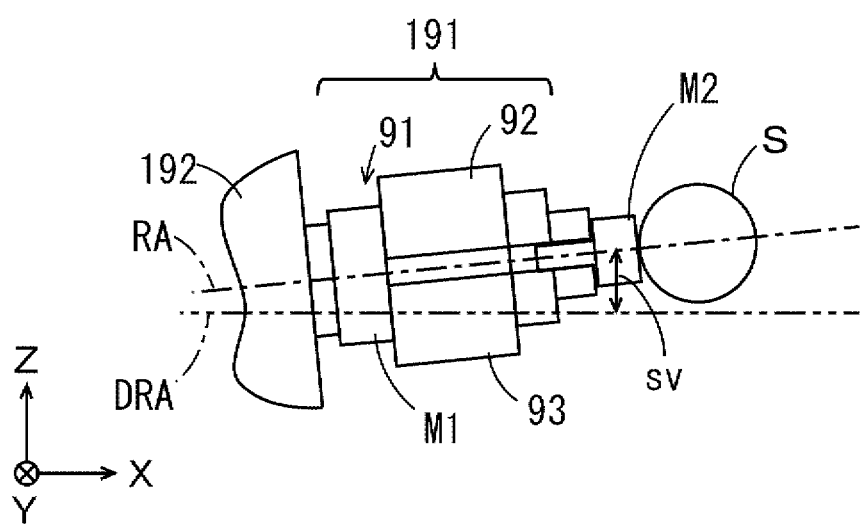
FIG. 17 is a diagram for explaining an example of a case where three-dimensional shape data is corrected using only the deviation of the rotation axis at the position of a second marker.

FIG. 17 is a diagram for explaining an example of a case where three-dimensional shape data is corrected using only the deviation sv of the rotation axis at the position of the second marker M2. As illustrated in FIG. 17, in this example, the small diameter portion M2b of the second marker M2 is held by the holding portion 191. In addition, for example, a disk-shaped measurement subject S is attached to the end surface of the large diameter portion M2a of the second marker M2. The measurement subject S of FIG. 17 does not have a longitudinal shape extending in one direction. Therefore, even when the three-dimensional shape data is corrected based only on the deviation sv calculated at the position of the second marker M2 adjacent to the measurement subject S in the X direction, the three-dimensional shape data with relatively high accuracy can be obtained.

(4) Third Calibration Function

In the third calibration function, calibration tools corresponding to the first marker M1 and the second marker M2 are not used. In the third calibration function, at the time of shape measurement of the rotated measurement subject S, the deviation sv between the rotation axis RA and the design rotation axis DRA is calculated based on a plurality of pieces of three-dimensional shape data generated for the measurement subject S at a plurality of predetermined angular positions.

Figure 18A:
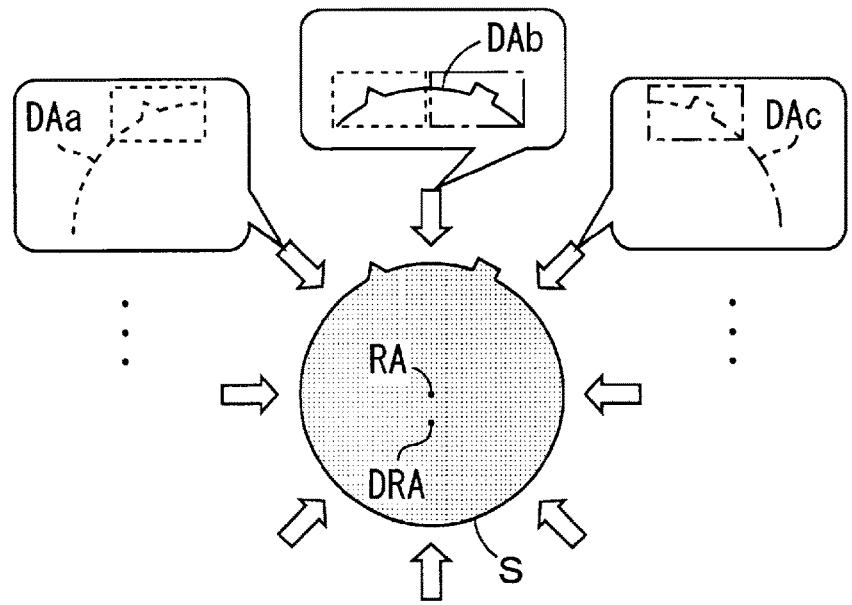
FIGS. 18A to 18C are diagrams for explaining a third calibration function.
Figure 18B:
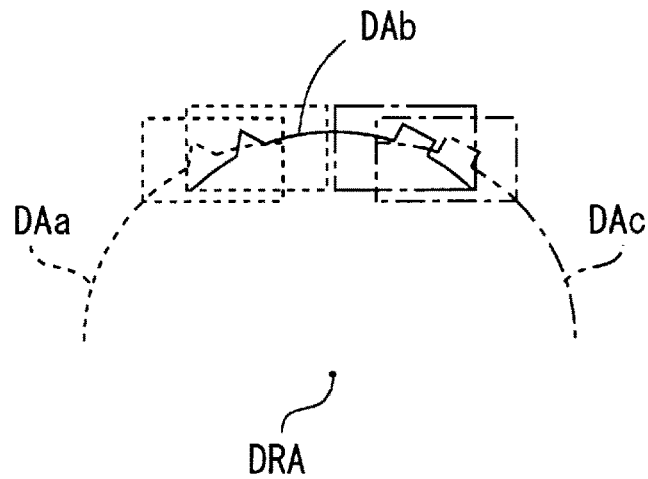
Figure 18C:
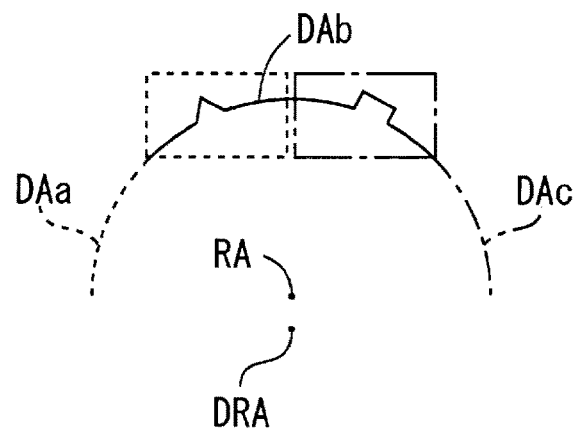

FIGS. 18A to 18C are diagrams for explaining the third calibration function. FIG. 18A illustrates a cross section orthogonal to the X direction of the measurement subject S held by the rotation unit 190. In the third calibration function, a plurality of angular positions are set such that three-dimensional shape data of portions overlapping each other in the rotation direction of the measurement subject S is generated. Then, as indicated by white arrows in FIG. 18A, an image of the surface of the measurement subject S is captured at a plurality of angular positions, and a plurality of pieces of three-dimensional shape data respectively corresponding to the plurality of angular positions are generated. In FIG. 18A, some (three) of the plurality of pieces of three-dimensional shape data respectively corresponding to the plurality of angular positions are illustrated in the balloon as data DAa, DAb, and DAc. The data DAa, DAb, and DAc are indicated by a dotted line, a solid line, and a one-dotted chain line, respectively. Between the data DAa and DAb, a portion in a dotted frame is an overlapping portion indicating a common portion in the measurement subject S. Between the data DAb and DAc, a portion within a frame of a one-dot chain line is an overlapping portion. These overlapping portions can be identified by detecting a specific shape (surface or unevenness) or the like from the generated three-dimensional shape data.

Next, assuming that the rotation center of the measurement subject S is, for example, on the design rotation axis DRA, a plurality of pieces of three-dimensional shape data respectively corresponding to a plurality of angular positions are disposed on a virtual plane orthogonal to the X direction. In this case, when the deviation sv between the rotation axis RA and the design rotation axis DRA is large, as illustrated in FIG. 18B, a large deviation occurs between the overlapping portion of one data and the overlapping portion of the other data of two adjacent data.

Therefore, convergence calculation for obtaining the true rotation axis RA of the measurement subject S is performed based on the plurality of pieces of three-dimensional shape data respectively corresponding to the plurality of angular positions such that the deviation between the overlapping portions of the two adjacent data is minimized. The plurality of pieces of three-dimensional shape data are corrected based on the deviation between the calculated rotation axis RA and the design rotation axis DRA. As a result, as illustrated in FIG. 18C, accurate three-dimensional shape data can be obtained for the measurement subject S. As a result, when the three-dimensional shape data generated at the plurality of angular positions is synthesized, it is possible to perform shape measurement of the measurement subject S over a wide range while reducing a decrease in measurement accuracy. Note that, in FIGS. 18B and 18C, only the data DAa, DAb, and DAc among the plurality of pieces of three-dimensional shape data corresponding to the plurality of angular positions of FIG. 18A are illustrated.

[4] Shape Measuring Procedure of Measurement Subject S Using Shape Measuring Apparatus 500

Figure 19:
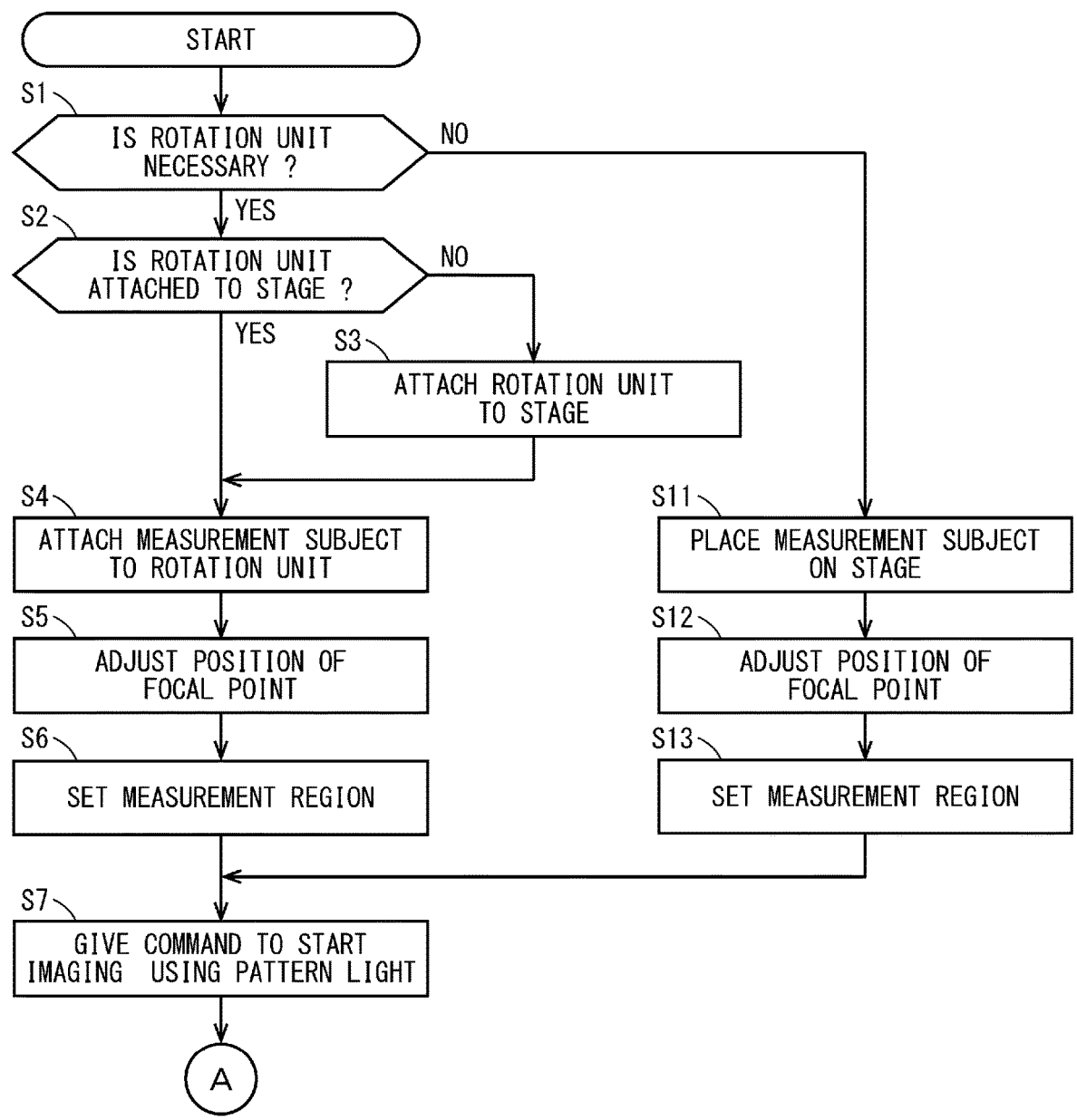
FIG. 19 is a flowchart illustrating a shape measuring procedure of a measurement subject using the shape measuring apparatus of FIG. 1.
Figure 20:
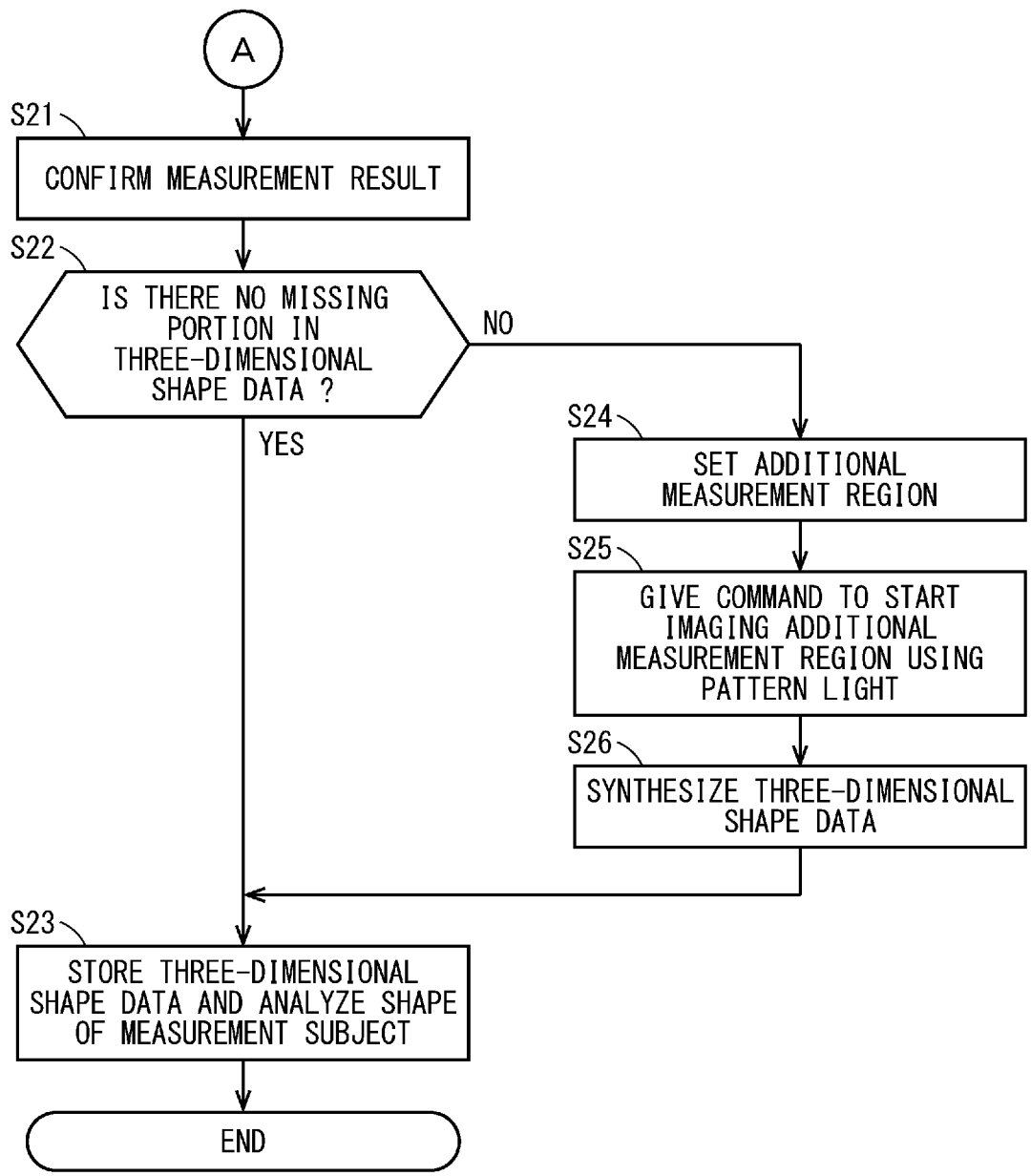
FIG. 20 is a flowchart illustrating the shape measuring procedure of a measurement subject using the shape measuring apparatus of FIG. 1.

FIGS. 19 and 20 are flowcharts illustrating a shape measuring procedure of the measurement subject S using the shape measuring apparatus 500 of FIG. 1. In the initial state, the power source of the shape measuring apparatus 500 is turned on. In addition, in the shape measuring apparatus 500, the illumination light is emitted from the illumination light output portion 130 toward the upper surface 141s of the stage 140 except for a case where imaging for shape measurement using pattern light is performed. At this time, an image (hereinafter, referred to as a live image) based on the image data acquired in real time by the light receiving portion 120 is displayed in the display portion 400 of FIG. 1.

First, the user determines whether the rotation unit 190 is necessary to measure the shape measurement of a desired portion of the measurement subject S (Step S1). Therefore, when the rotation unit 190 is necessary, the user determines whether the rotation unit 190 is attached to the stage 140 (Step S2). When the rotation unit 190 is not attached to the stage 140, the user attaches the rotation unit 190 to the stage 140 (Step S3).

In a state where the rotation unit 190 is attached to the stage 140 in Step S2 or Step S3, the user attaches the measurement subject S to the holding portion 191 of the rotation unit 190 such that at least a part of the measurement subject S is located in the measurement space 101 (Step S4). Accordingly, the measurement subject S is rotatably held about the rotation axis RA. Next, the user adjusts the position of the focal plane 120F of the light receiving portion 120 with respect to the measurement subject S (Step S5). Specifically, the user operates the stage operation portion 145 or the operation portion 250 of FIG. 1 while visually recognizing a live image, thereby adjusting the height of the upper surface 141s of the stage 140 such that the focal plane 120F of the light receiving portion 120 is aligned with the measurement subject S.

Next, the user sets a region (hereinafter, referred to as a measurement region) whose image should be captured by the light receiving portion 120 in a plane (for example, a horizontal plane) on the stage 140 orthogonal to the Z direction (Step S6). As a result, even when the entire upper surface of the measurement subject S does not fall within the measurement space 101, a plurality of measurement regions are set, and three-dimensional shape data of the measurement regions is generated, so that the planar direction synthesis can be performed.

The measurement region is set by the user operating a region setting screen to be described later displayed in the display portion 400. Note that, at the time of setting the measurement region, an imaging range in the Z direction for performing the above-described height direction synthesis in the Z direction may be determined. Details of setting of the measurement region will be described later.

When the rotation unit 190 is unnecessary in Step S1, the user places the measurement subject S on the stage 140 such that at least a part of the measurement subject S is located in the measurement space 101 (Step S11). Next, as in Steps S5 and S6, the user adjusts the position of the focal plane 120F of the light receiving portion 120 with respect to the measurement subject S (Step S12), and sets the measurement region (Step S13).

Thereafter, the user operates the operation portion 250 to give a command to start imaging using pattern light for the set measurement region (Step S7). As a result, the set measurement region is irradiated with pattern light, and imaging is performed. In addition, three-dimensional shape data for the measurement region is generated.

Next, the user checks the three-dimensional shape data generated in the operation of Step S7 as the shape measurement result of the measurement subject S (Step S21), and determines whether there is a missing part in the three-dimensional shape data (Step S22). When there is no missing part in the three-dimensional shape data, the user stores the three-dimensional shape data in the work memory 230 or the storage device 240 of FIG. 1, and analyzes the shape of the measurement subject S based on the three-dimensional shape data (Step S23). As a result, a series of operations is completed.

In Step S22 described above, when there is a missing part in the three-dimensional shape data, the user additionally sets the measurement region such that an image of the portion of the measurement subject S corresponding to the missing part in the three-dimensional shape data is captured (Step S24). Next, the user operates the operation portion 250 to give a command to start imaging using pattern light for the additionally set measurement region (Step S25). As a result, three-dimensional shape data indicating the shape of the additionally set measurement region is generated. The user operates the operation portion 250 to synthesize the three-dimensional shape data generated by the operation in Step S7 with the three-dimensional shape data generated by the operation in Step S25 (Step S26). The operation in Step S26 may be omitted in a case where the operation is automatically performed by the CPU 210. Thereafter, the user proceeds with the operation in Step S23.

In the shape measuring apparatus 500 according to this embodiment, the CPU 210 of FIG. 1 is configured to be able to set the measurement region in one of three types of modes at the time of shape measurement of the measurement subject S accompanied by rotation by the rotation unit 190. These three types of modes are referred to as a first box-shaped region setting mode, a second box-shaped region setting mode, and a shaft-shaped region setting mode.

The first box-shaped region setting mode is a mode suitable for measurement region setting in a case where shape measurement is performed while the measurement subject S having a box shape is rotated by 360° about the rotation axis RA. The second box-shaped region setting mode is a mode suitable for measurement region setting in a case where shape measurement is performed while the measurement subject S having a box shape is rotated within a predetermined angular range (for example, 180°) about the rotation axis RA. The shaft-shaped region setting mode is a mode suitable for measurement region setting in a case where the measurement subject S having a shaft shape is disposed to extend along the rotation axis RA and shape measurement is performed while the measurement subject S is rotated by 360° about the rotation axis RA.

Figure 21:
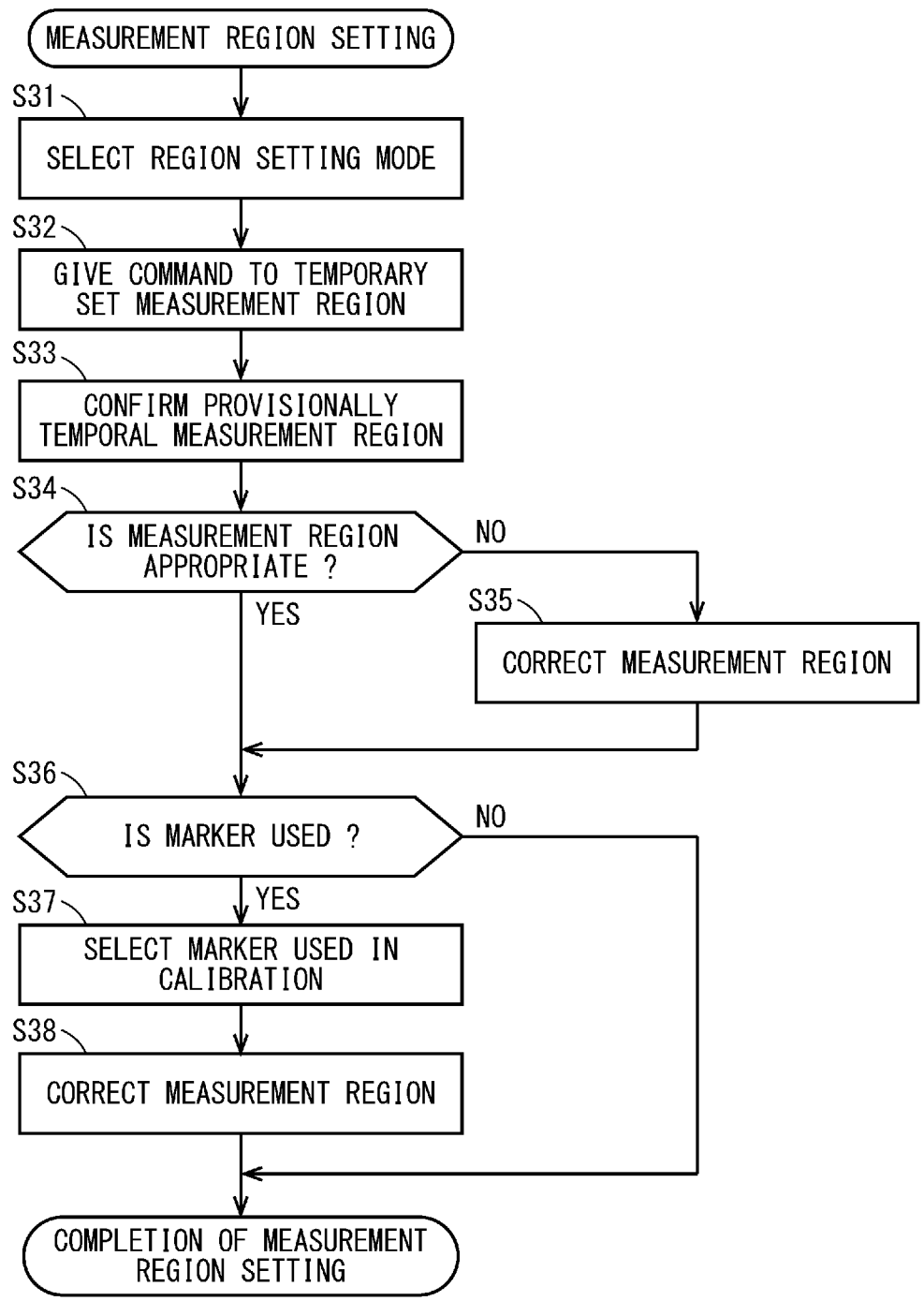
FIG. 21 is a flowchart illustrating a setting procedure of a measurement region for performing shape measurement of a measurement subject accompanied by rotation.

Here, the procedure of the measurement region setting in Step S6 will be described in detail. FIG. 21 is a flowchart illustrating a setting procedure of a measurement region for performing shape measurement of the measurement subject S accompanied by rotation. The user performs the following setting operation by operating a region setting screen to be described later using the operation portion 250.

The user selects any one of the first box-shaped region setting mode, the second box-shaped region setting mode, and the shaft-shaped region setting mode as the mode of the CPU 210 for setting the measurement region (Step S31).

This selection is specifically performed as follows. First, the user subjectively determines whether the shape of the measurement subject S belongs to the box shape or the shaft shape. When determining that the shape of the measurement subject S belongs to the shaft shape, the user selects the shaft-shaped region setting mode.

On the other hand, when the user determines that the shape of the measurement subject S belongs to the box shape, the user further determines a portion of the measurement subject S to be measured. Then, when the user desires to measure the shape of the measurement subject S over the entire circumference (360°) about the rotation axis RA, the user selects the first box-shaped region setting mode. On the other hand, when the user desires to measure the shape of the measurement subject S over a partial range (for example, 180°) about the rotation axis RA, the user selects the second box-shaped region setting mode.

Next, the user issues a command to start temporary setting of the measurement region (Step S32). In this case, the CPU 210 sets a provisional temporary measurement region for the current measurement subject S in response to the temporary setting command of the measurement region. As a result, an image (hereinafter, referred to as a region setting map image) illustrating the positional relationship between the measurement subject S and the measurement region in a plan view is displayed in the display portion 400.

Therefore, the user confirms the provisionally set temporary measurement region while visually recognizing the region setting map image displayed in the display portion 400 (Step S33). In addition, the user determines whether the measurement region indicated in the region setting map image is appropriate (Step S34). When the measurement region is not appropriate, the user corrects the measurement region (Step S35).

When the measurement region is appropriate in Step S34 or when the measurement region is corrected in Step S35, the user determines whether to use the calibration function using a marker (the first or second calibration function) (Step S36). When the calibration function using a marker is not used, the measurement region set at the time of Step S36 is set as a normal setting region. Accordingly, the setting of the measurement region is completed.

On the other hand, when the calibration function using a marker is used in Step S36, the user selects at least one of the first marker M1 and the second marker M2 as the marker for the calibration function (Step S37). When the second marker M2 is selected, the user attaches the second marker M2 to the measurement subject S. Thereafter, the user corrects the measurement region such that an image of the marker selected in Step S37 is captured by the light receiving portion 120 (Step S38). Accordingly, the setting of the measurement region is completed.

Note that the procedure of the measurement region setting in Step S13 described above, that is, the procedure of the measurement region setting at the time of shape measurement of the measurement subject S without rotation is the same as the setting procedure in Steps S31 to S35 of FIG. 21 except that the procedures in Steps S32, and S36 to S38 are omitted.

[5] Various Screens Displayed in Display Portion 400

(1) Measurement Basic Screen Displayed in Initial State

Figure 22:
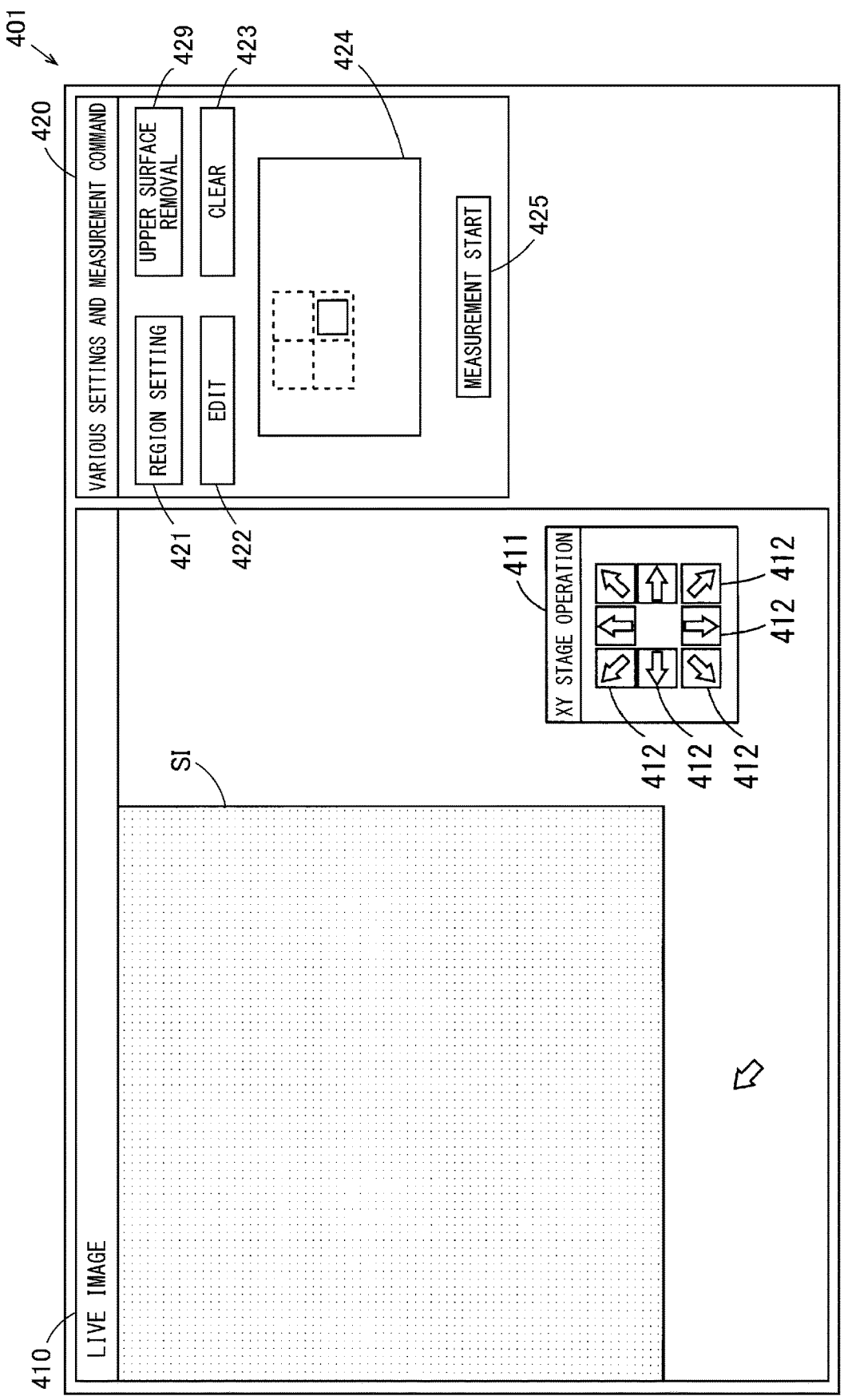
FIG. 22 is a diagram illustrating an example of a measurement basic screen displayed in a display portion when a power source of the shape measuring apparatus is turned on in a state where the rotation unit is not attached to the stage.

FIG. 22 is a diagram illustrating an example of a measurement basic screen displayed in the display portion 400 when the power source of the shape measuring apparatus 500 is turned on in a state where the rotation unit 190 is not attached to the stage 140. As illustrated in FIG. 22, a measurement basic screen 401 includes a main display region 410 and a sub display region 420 arranged side by side. In the measurement basic screen 401, a live image is displayed in the main display region 410. Thus, for example, when the measurement subject S is placed on the stage 140 so as to be located in the measurement space 101, a subject image SI indicating the surface state of the measurement subject S is displayed in the main display region 410.

In addition, in the main display region 410 of FIG. 22, a horizontal movement operation window 411 for moving the upper surface 141s of the stage 140 in the X, Y directions is superimposed and displayed on the live image. In the horizontal movement operation window 411, a plurality of (eight in this example) movement buttons 412 for moving the upper surface 141s of the stage 140 in a plurality of different directions are displayed. As a result, the user operates a pointer on the measurement basic screen 401 using the operation portion 250 of FIG. 1, and clicks any of the plurality of movement buttons 412, for example. As a result, the upper surface 141s of the stage 140 can be moved relative to the measurement space 101 in the X, Y directions, and the imaging region of the light receiving portion 120 can be moved.

In the measurement basic screen 401 of FIG. 22, a plurality of buttons and images related to the shape measurement of the measurement subject S are displayed in the sub display region 420. Specifically, a region setting button 421, an edit button 422, a region clear button 423, a visual field check image 424, a measurement start button 425, and an upper surface removal button 429 are displayed in the sub display region 420 of the measurement basic screen 401.

The region setting button 421 is a button for the user to give a command to set the measurement region. For example, the user operates the region setting button 421 at the time of setting a measurement region in Step S13. As a result, a region setting screen 402 of FIG. 23 to be described later is displayed in the display portion 400 instead of the measurement basic screen 401 of FIG. 22.

The edit button 422 is a button for the user to correct the setting of the measurement region. For example, the user can correct and add the setting content of the measurement region by operating the edit button 422 during the setting of the measurement region in Step S13. Even when the edit button 422 is operated by the user, the region setting screen 402 of FIG. 23 described later is displayed in the display portion 400 instead of the measurement basic screen 401 of FIG. 22. The region clear button 423 is a button for the user to reset the setting of the measurement region.

The visual field check image 424 is an image indicating where the imaging region (imaging visual field) of the light receiving portion 120 is on the upper surface 141s of the stage 140, for example. In the visual field check image 424, a rectangular index indicating the current imaging region of the light receiving portion 120 is superimposed and displayed on a plan view of the upper surface 141s of the stage 140. In addition, after the setting of the measurement region, the index indicating the set measurement region is displayed in the visual field check image 424 so as to be distinguishable from the index of the imaging region together with the index indicating the imaging region of the light receiving portion 120. In the visual field check image 424 of FIG. 22, an index indicating the current imaging region of the light receiving portion 120 is indicated by a solid line. In addition, an index indicating the measurement region currently set is indicated by a dotted line.

The measurement start button 425 is a button for the user to give a command to start imaging the measurement subject S using the pattern light in Step S7 described above, for example, in order to obtain the three-dimensional shape data of the measurement subject S. When the user operates the measurement start button 425 after setting the measurement region, an image of the set measurement region is captured, and the three-dimensional shape data of the measurement subject S is generated. The upper surface removal button 429 is a button for the user to give a command to remove the three-dimensional shape data of the upper surface 141s of the stage 140 from the measurement result. Note that a magnification switching button (not illustrated) is also displayed in the measurement basic screen 401 of FIG. 22. Thus, the user can observe the surface state of the measurement subject S based on the live image displayed at a desired magnification by operating the magnification switching button.

Figure 23:
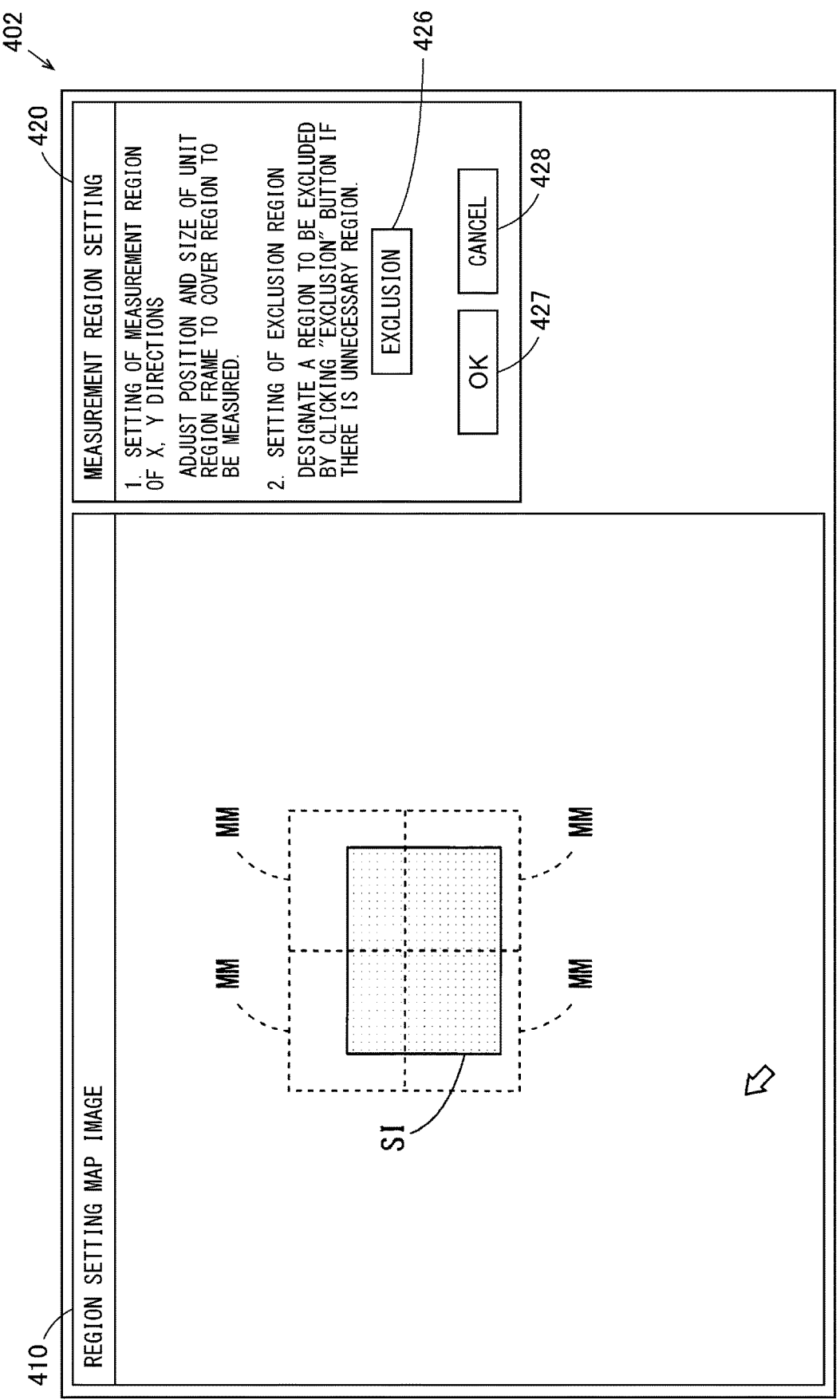
FIG. 23 is a diagram illustrating an example of a region setting screen displayed in the display portion when a region setting button of FIG. 22 is operated.

(2) Region Setting Screen for Performing Shape Measurement of Measurement Subject S without Rotation FIG. 23 is a diagram illustrating an example of a region setting screen displayed in the display portion 400 by operating the region setting button 421 of FIG. 22. As illustrated in FIG. 23, similarly to the measurement basic screen 401, the region setting screen 402 includes the main display region 410 and the sub display region 420.

When the region setting button 421 of FIG. 22 is operated, for example, an image of the entire measurement subject S placed on the stage 140 is automatically captured by the light receiving portion 120. At this time, when the entire measurement subject S does not fall within the imaging region of the light receiving portion 120, the upper surface 141s of the stage 140 is relatively moved in the X, Y directions with respect to the light receiving portion 120, and imaging is repeated a plurality of times. Based on the image of the measurement subject S obtained by the imaging, a region (hereinafter, referred to as an existence region) where the measurement subject S exists is detected in a plane (for example, a horizontal plane) on the stage 140 orthogonal to the Z direction. Then, the detected existence region is provisionally set as a temporal measurement region.

In the region setting screen 402 of FIG. 23, the region setting map image is displayed in the main display region 410. Here, the measurement region is set such that one or a plurality of unit regions are arranged on the stage 140 with at least a partial region of the measurement space 101 whose image can be captured at a time by the light receiving portion 120 as a unit region. Therefore, in the region setting map image, as indicated by a dotted line in FIG. 23, the index indicating the unit region constituting the measurement region is displayed as a unit region frame MM together with the subject image SI. In the example of FIG. 23, four unit region frames MM are illustrated so as to cover the entire subject image SI.

In addition, in the region setting screen 402 of FIG. 23, a message to adjust the position and size of the measurement region on the region setting map image is displayed in the sub display region 420. Further, an exclusion button 426, an OK button 427, and a cancel button 428 are displayed. The user can adjust the position and size of each unit region frame MM on the region setting map image by operating the pointer on the region setting screen 402. The user can also add the unit region frame MM. In this way, the user can easily expand or contract the measurement region in the X direction and the Y direction on the region setting map image.

The exclusion button 426 is a button for the user to designate, as an exclusion region, a region determined as unnecessary for the shape measurement in the region setting map image. After operating the exclusion button 426, the user can exclude the portion of the unit region frame MM from the measurement region by designating any unit region frame MM among the plurality of unit region frames MM on the region setting map image.

The OK button 427 is a button for the user to give a command that indicates the setting of the measurement region using the region setting map image is completed. When the user operates the OK button 427, information of the measurement region set at the time of operating the OK button 427 is stored in the work memory 230 or the storage device 240 of FIG. 1 as normal setting information. In the display portion 400, the measurement basic screen 401 of FIG. 22, which has been displayed immediately before, is displayed again instead of the region setting screen 402 of FIG. 23.

The cancel button 428 is a button for allowing the user to display the measurement basic screen 401 of FIG. 22 in the display portion 400 while resetting the information of the measurement region set on the region setting screen 402 currently displayed.

(3) Measurement Basic Screen Displayed at Time of Connection of Rotation Unit 190

Figure 24:
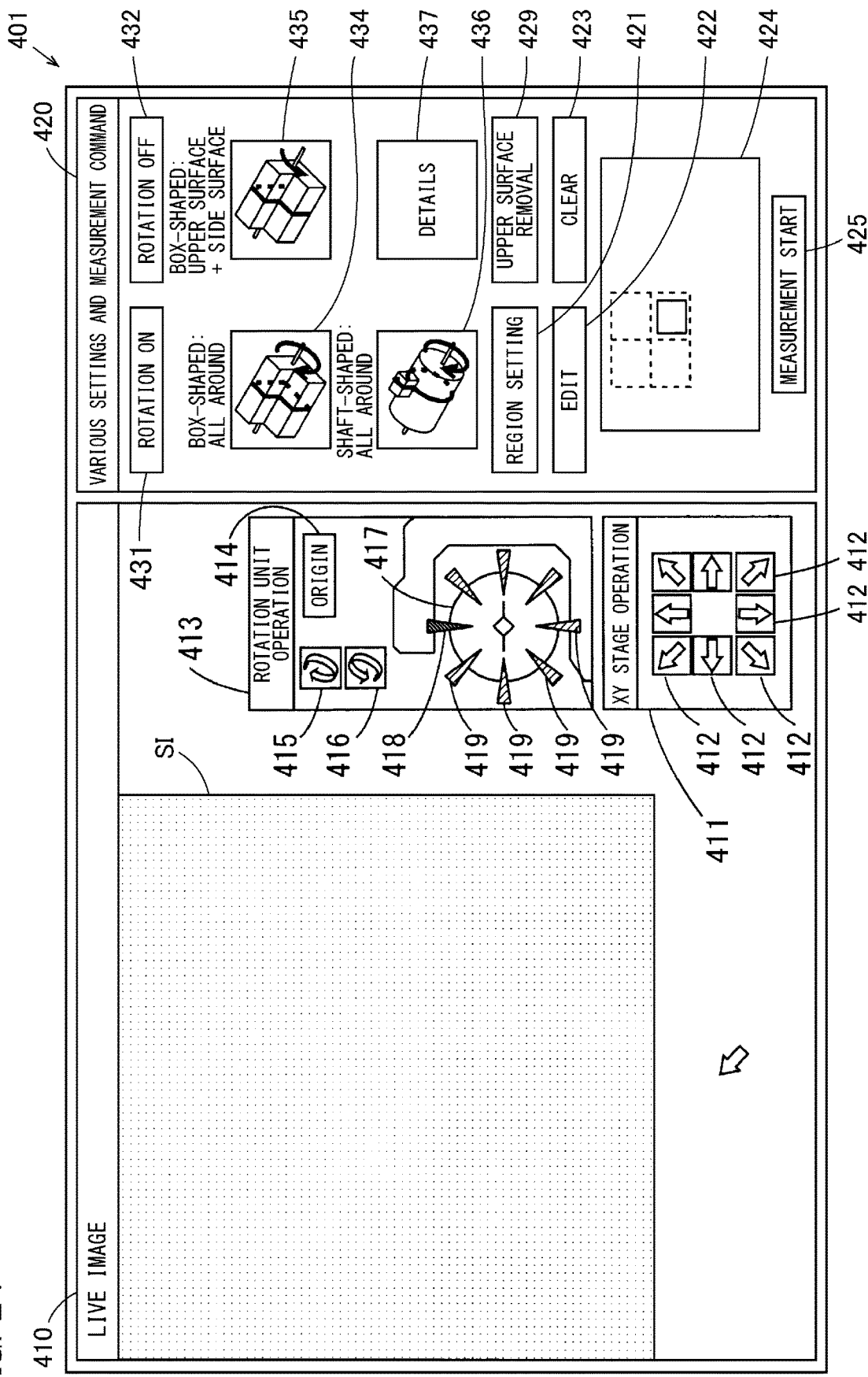
FIG. 24 is a diagram illustrating an example of the measurement basic screen displayed in the display portion in a state where the rotation unit is attached to the stage.

In a state where the measurement basic screen 401 of FIG. 22 is displayed in the display portion 400, the user attaches the rotation unit 190 to the stage 140 by the operation of Step S3 described above. In this case, the measurement basic screen 401 changes from the display mode of FIG. 22. FIG. 24 is a diagram illustrating an example of the measurement basic screen 401 displayed in the display portion 400 in a state where the rotation unit 190 is attached to the stage 140.

As illustrated in FIG. 24, when the rotation unit 190 is connected to the stage 140, a rotation operation window 413 is further superimposed and displayed in the live image in the main display region 410 in addition to the horizontal movement operation window 411 in FIG. 22.

In the rotation operation window 413, an origin button 414, a forward rotation button 415, and a reverse rotation button 416 are displayed. The origin button 414 is a button for returning the angular position of the holding portion 191 of the rotation unit 190 to the reference angular position in the rotation direction about the rotation axis RA.

The forward rotation button 415 is a button for rotating the holding portion 191 of the rotation unit 190 in one direction about the rotation axis RA, and the reverse rotation button 416 is a button for rotating the holding portion 191 of the rotation unit 190 in the reverse direction about the rotation axis RA. As a result, the user operates the pointer on the measurement basic screen 401 using the operation portion 250 of FIG. 1 in a state where the measurement subject S is held at the distal end of the holding portion 191, and clicks, for example, one of the forward rotation button 415 and the reverse rotation button 416. Accordingly, the measurement subject S can be rotated in a desired direction about the rotation axis RA on the stage 140.

Note that a holding portion mark 417, a reference posture mark 418, and a plurality of measurement angular position marks 419 are further displayed in the rotation operation window 413. The holding portion mark 417 schematically represents the outer shape of the holding portion 191 as viewed in the X direction, and has a circular shape. The reference posture mark 418 indicates an angular position (hereinafter, referred to as a reference posture position) facing a specific surface of the measurement subject S held by the holding portion 191, and the reference posture position is set by the CPU 210 or the user according to a predetermined method. For example, the reference posture position may be an angular position of the measurement subject S when the image of the measurement subject S is captured in the largest area by the light receiving portion 120 when the measurement subject S rotates about the rotation axis RA.

In the shape measurement of the measurement subject S accompanied by rotation, a plurality of angular positions whose image should be captured by the light receiving portion 120 are set as the measurement angular positions in order to perform the shape measurement of a plurality of portions of the measurement subject S about the rotation axis RA. The measurement angular position mark 419 indicates the measurement angular position currently set, and is disposed on a circle of the holding portion mark 417. In the example of FIG. 24, the plurality of measurement angular position marks 419 are arranged on the circle of the holding portion mark 417 at angular intervals of 45° with respect to the center of the holding portion mark 417.

When the rotation unit 190 is connected to the stage 140, a plurality of other buttons are displayed in the sub display region 420 in addition to the various buttons (421 to 425, 429) and the visual field check image 424 illustrated in FIG. 22. Specifically, the sub display region 420 further displays a rotation on button 431, a rotation off button 432, an entire box circumference button 434, a partial box button 435, a shaft button 436, and a rotation detail button 437.

The rotation on button 431 is operated by the user to perform shape measurement of the measurement subject S accompanied by rotation, that is, shape measurement using the rotation function of the rotation unit 190. When the user operates the rotation on button 431, the operations of the entire box circumference button 434, the partial box button 435, the shaft button 436, and the rotation detail button 437 to be described later become effective, and various settings for performing planar direction synthesis and rotational direction synthesis become possible. At this time, the operation of the region setting button 421 becomes invalid. The control mode of the CPU 210 at this time is an example of a second control mode of the present invention.

The rotation off button 432 is operated by the user to perform shape measurement of the measurement subject S without rotation, that is, shape measurement without using the rotation function of the rotation unit 190. When the user operates the rotation off button 432, the operations of the entire box circumference button 434, the partial box button 435, the shaft button 436, and the rotation detail button 437 to be described later become invalid, and various settings for performing the rotation direction synthesis become impossible. At this time, the operation of the region setting button 421 becomes valid. Thus, various settings for performing planar direction synthesis are possible. The control mode of the CPU 210 at this time is an example of a first control mode of the present invention.

As described above, the operation portion 250 functions as an input portion that receives the selection of the shape measurement of the measurement subject S accompanied by rotation and the shape measurement of the measurement subject S without rotation, that is, the selection of the rotation on button 431 and the rotation off button 432 by the user.

The entire box circumference button 434 is a button operated when the user selects the first box-shaped region setting mode as the mode of the CPU 210 for setting the measurement region in the operation of Step S31 described above. The partial box button 435 is a button operated when the user selects the second box-shaped region setting mode as the mode of the CPU 210 for setting the measurement region. The shaft button 436 is a button operated when the user selects the shaft-shaped region setting mode as the mode of the CPU 210 for setting the measurement region. The rotation detail button 437 is a button operated when the user desires to set the measurement region in detail regardless of a mode determined in advance in the CPU 210.

In the visual field check image 424 of FIG. 24, the index indicating the measurement region set at the current angular position of the measurement subject S is superimposed and displayed on a plan view of the upper surface 141*s* of the stage 140 together with the rectangular index indicating the current imaging region of the light receiving portion 120.

In a state where the rotation on button 431 is operated, any one of the entire box circumference button 434, the partial box button 435, the shaft button 436, and the rotation detail button 437 is operated. As a result, a region setting screen corresponding to the operated button is displayed in the display portion 400. Hereinafter, a region setting screen displayed in the display portion 400 when each button (434, 435, 436, 437) for setting the measurement region is operated will be described.

(4) Region Setting Screen for Performing Shape Measurement of Measurement Subject S Accompanied by Rotation In this embodiment, it is assumed that the plurality of measurement angular positions are stored in the storage device 240 as default information for each setting mode of the measurement region. When the partial box button 435 of FIG. 24 is operated, that is, when the user selects the second box-shaped region setting mode as the setting mode of the measurement region, a plurality of measurement angular positions corresponding to the mode is read from the storage device 240 and set. The plurality of measurement angular positions may be set by designation by the user.

In this example, 0° (reference angular position), 45°, 90°, 135°, and 180° are set as the plurality of measurement angular positions. In this case, the existence region of the measurement subject S at each measurement angular position is detected, and a region composed of one or a plurality of unit regions is provisionally set as a temporal measurement region at the measurement angular position so as to cover the detected existence region.

FIGS. 25A to 25J are diagrams for explaining the operation of the shape measuring apparatus 500 executed in response to the operation of the partial box button 435 of FIG. 24. FIGS. 25A to 25E illustrate external views (end surface views) of the measurement subject S when the measurement subject S is at angular positions of 0°, 45°, 90°, 135°, and 180° as viewed in the X direction. In FIGS. 25A to 25E, a portion of the surface of the measurement subject S to be subjected to the shape measurement is indicated by a thick solid line.

For example, as illustrated in FIG. 25A, first, the measurement subject S is positioned at a measurement angular position of 0°. Then, as in the example of FIG. 23, an image of the entire measurement subject S is automatically captured by the light receiving portion 120. FIG. 25F illustrates an example of the image of the measurement subject S captured in the state of FIG. 25A. The existence region is detected based on the captured image of the measurement subject S. Then, a region including the detected existence region and composed of one or a plurality of unit regions is provisionally set as a temporal measurement region corresponding to the measurement angular position of 0°.

Next, as illustrated in FIG. 25B, the measurement subject S is rotated about the rotation axis RA and positioned at a measurement angular position of 45°. Then, an image of the entire measurement subject S is automatically captured by the light receiving portion 120. FIG. 25G illustrates an example of the image of the measurement subject S captured in the state of FIG. 25B. The existence region is detected based on the captured image of the measurement subject S. Then, a region including the detected existence region and composed of one or a plurality of unit regions is provisionally set as a temporal measurement region corresponding to the measurement angular position of 45°.

Thereafter, the rotation, positioning, and imaging of the measurement subject S are repeated, and the existence region is detected. FIGS. 25H, 25I, and 25J illustrate images of the measurement subject S captured at measurement angular positions of 90°, 135°, and 180°, respectively. A region including the existence region detected at each measurement angular position and composed of one or a plurality of unit regions is provisionally set as a temporal measurement region corresponding to the measurement angular position. A plurality of temporary measurement regions respectively corresponding to the plurality of measurement angular positions set in this manner are displayed in the display portion 400.

Figure 26:
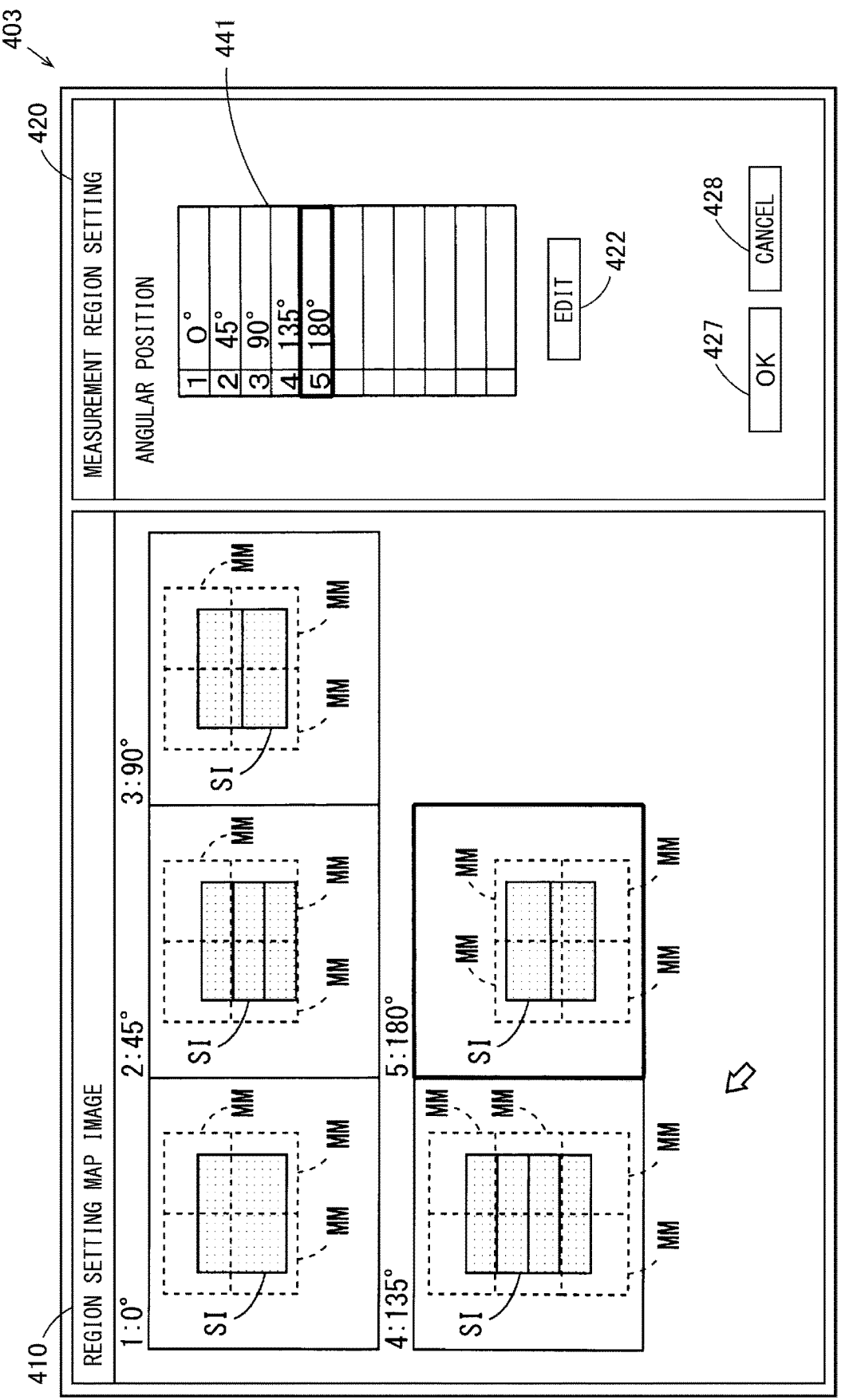
FIG. 26 is a diagram illustrating an example of the region setting screen displayed in the display portion when the partial box button of FIG. 24 is operated.

FIG. 26 is a diagram illustrating an example of the region setting screen displayed in the display portion 400 by operating the partial box button 435 of FIG. 24. In a region setting screen 403 of FIG. 26, the region setting map image corresponding to each of the plurality of measurement angular positions (0°, 45°, 90°, 135° and 180°) is displayed in the main display region 410.

In addition, in the region setting screen 403 of FIG. 26, an angular position list 441 is displayed in the sub display region 420 together with the edit button 422, the OK button 427, and the cancel button 428. The angular position list 441 indicates a plurality of measurement angular positions currently set. The user selects a desired measurement angular position from the plurality of measurement angular positions displayed in the angular position list 441 and operates the edit button 422. As a result, the user can easily expand or contract the measurement region in the X direction and the Y direction on the region setting map image corresponding to the selected measurement angular position, similarly to the example of FIG. 23.

When the measurement subject S having a box shape is rotated, there is a high possibility that the range of the existence region in the Y direction greatly changes at a plurality of measurement angular positions. Therefore, the editing function of the measurement region as described above is very effective for setting the measurement region for the measurement subject S having a box shape.

When the OK button 427 is operated in the region setting screen 403 of FIG. 26, it is assumed that the setting of the measurement region is completed, and the measurement basic screen 401 of FIG. 24 is displayed again in the display portion 400. On the other hand, when the cancel button 428 is operated, the information about the measurement region set on the region setting screen 403 is reset, and the measurement basic screen 401 of FIG. 24 is displayed again in the display portion 400.

When the entire box circumference button 434 of FIG. 24 is operated, that is, when the user selects the first box-shaped region setting mode as the setting mode of the measurement region, a plurality of measurement angular positions corresponding to the mode is read from the storage device 240 and set. The plurality of measurement angular positions may be set by designation by the user.

In this example, 0° (reference angular position), 45°, 90°, 135°, 180°, 225°, 270°, and 315° are set as the plurality of measurement angular positions. In this case, similarly to the case where the partial box button 435 of FIG. 24 is operated, the existence region of the measurement subject S at each measurement angular position is detected, and a region includes the detected existence region and composed of one or a plurality of unit regions is provisionally set as a temporal measurement region at the measurement angular position. A plurality of temporary measurement regions respectively corresponding to the plurality of set measurement angular positions are displayed in the display portion 400.

Figure 27:
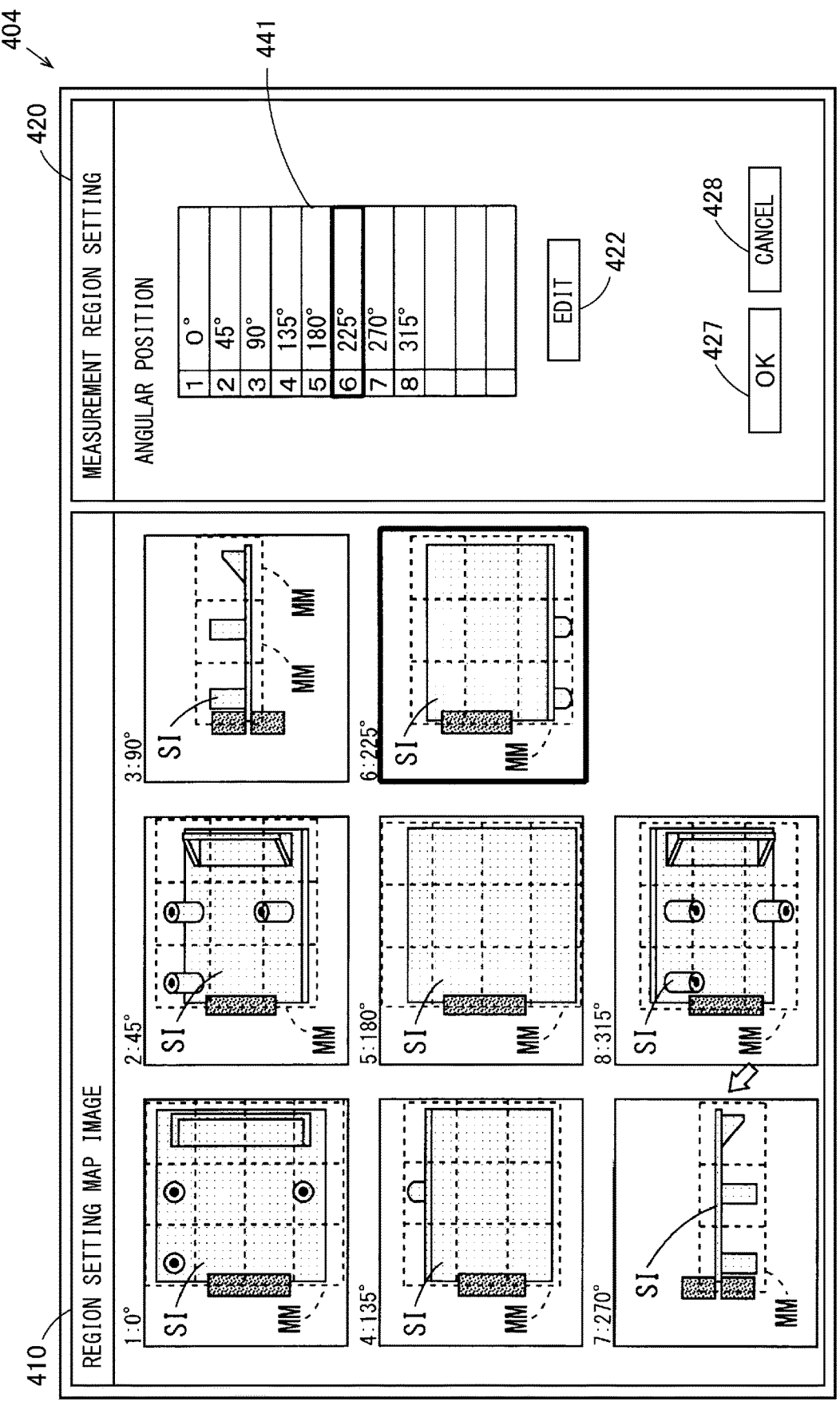
FIG. 27 is a diagram illustrating an example of the region setting screen displayed in the display portion by operating a box entire circumference button of FIG. 24.

FIG. 27 is a diagram illustrating an example of the region setting screen displayed in the display portion 400 by operating the entire box circumference button 434 of FIG. 24. In a region setting screen 404 of FIG. 27, the region setting map image corresponding to each of the plurality of measurement angular positions (0°, 45°, 90°, 135°, 180°, 225°, 270° and 315°) is displayed in the main display region 410.

Further, in the region setting screen 404 of FIG. 27, similarly to the region setting screen 403 of FIG. 26, the edit button 422, the OK button 427, the cancel button 428, and the angular position list 441 are displayed in the sub display region 420. Thus, the user can correct the setting of the measurement region, issue a setting completion command, and issue a setting reset command by operating the various buttons (422, 427, 428) and the angular position list 441. When the OK button 427 or the cancel button 428 is operated, the measurement basic screen 401 of FIG. 24 is displayed again in the display portion 400.

When the shaft button 436 of FIG. 24 is operated, that is, when the user selects the shaft-shaped region setting mode as the setting mode of the measurement region, a plurality of measurement angular positions corresponding to the mode is read from the storage device 240 and set. The plurality of measurement angular positions may be set by designation by the user.

In this example, 0° (reference angular position), 45°, 90°, 135°, 180°, 225°, 270°, and 315° are set as the plurality of measurement angular positions. Here, when the measurement subject S having an axial shape extending in one direction is disposed to extend along the rotation axis RA and rotated about the rotation axis RA, the distance between the outer peripheral surface of the measurement subject S and the rotation axis RA is kept substantially constant. Therefore, it is considered that the existence regions corresponding to the plurality of measurement angular positions are substantially common.

Therefore, when the shaft button 436 of FIG. 24 is operated, only the existence region of the measurement subject S when the measurement subject S is located at one measurement angular position among the plurality of measurement angular positions is detected. Then, a region including the detected existence region and composed of one or a plurality of unit regions is provisionally set as a temporal measurement region at all the measurement angular position. A temporary measurement region common to the plurality of measurement angular positions is displayed in the display portion 400.

Figure 28:
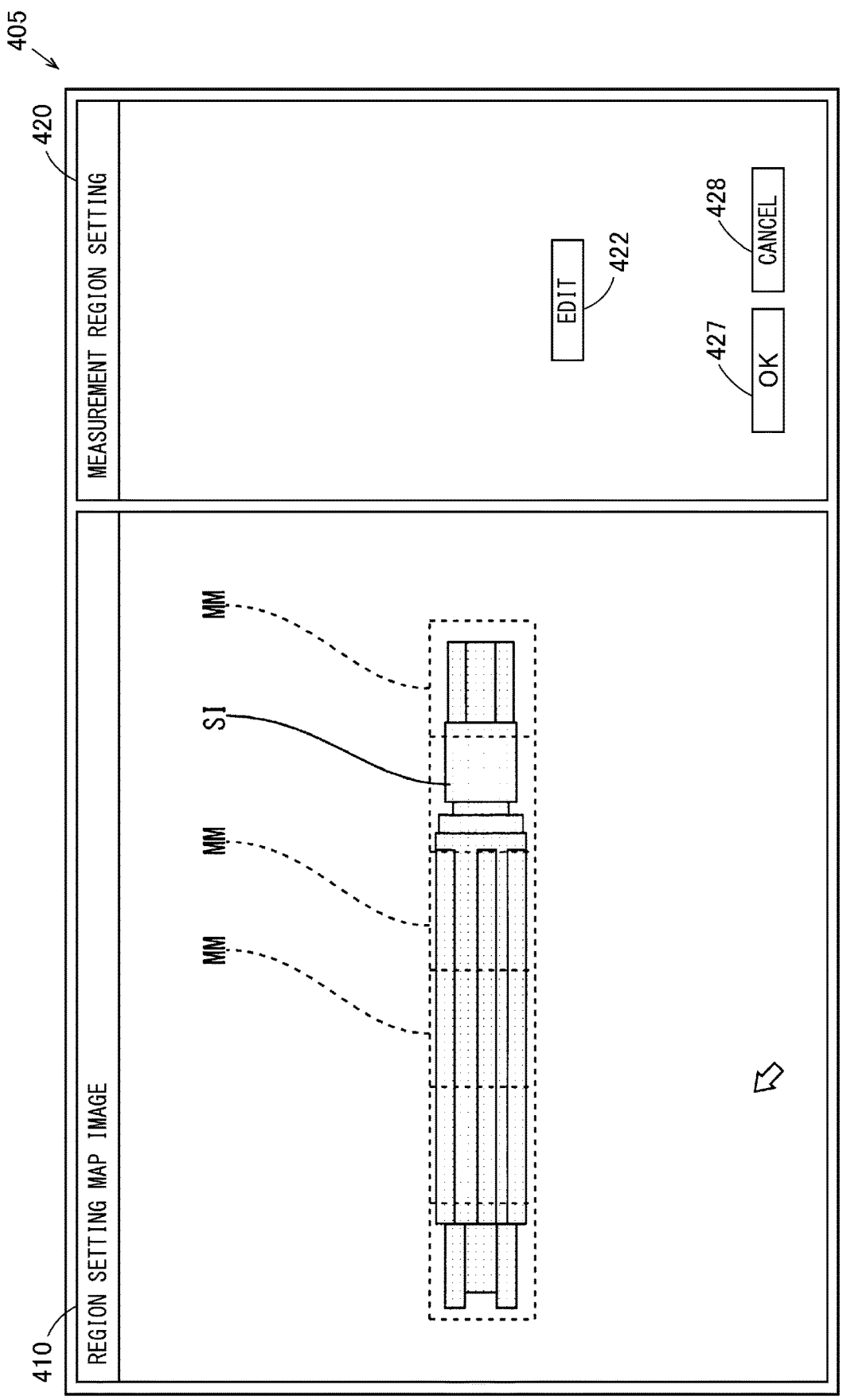
FIG. 28 is a diagram illustrating an example of the region setting screen displayed in the display portion when a shaft button of FIG. 24 is operated.

FIG. 28 is a diagram illustrating an example of the region setting screen displayed in the display portion 400 when the shaft button 436 of FIG. 24 is operated. In a region setting screen 405 of FIG. 28, a region setting map image corresponding to one measurement angular position (for example, 0°) is displayed in the main display region 410. In addition, in the region setting screen 405 of FIG. 28, the edit button 422, the OK button 427, and the cancel button 428 are displayed in the sub display region 420. Thus, the user can correct the setting of the measurement region, issue a setting completion command, and issue a setting reset command by operating the various buttons (422, 427, 428) and the angular position list 441. When the OK button 427 or the cancel button 428 is operated, the measurement basic screen 401 of FIG. 24 is displayed again in the display portion 400.

As described above, when the user selects the shaft-shaped region setting mode, the existence region is not detected for all of the plurality of measurement angular positions. Accordingly, the time required for detecting the existence region is shortened. In this case, since only one region setting map image corresponding to one measurement angular position is displayed in the display portion 400, the user does not need to confirm a plurality of region setting map images. Further, there is no need to adjust the measurement region for each of the plurality of measurement angular positions. As a result, the operation and time required for setting the measurement region can be reduced.

Figure 29:
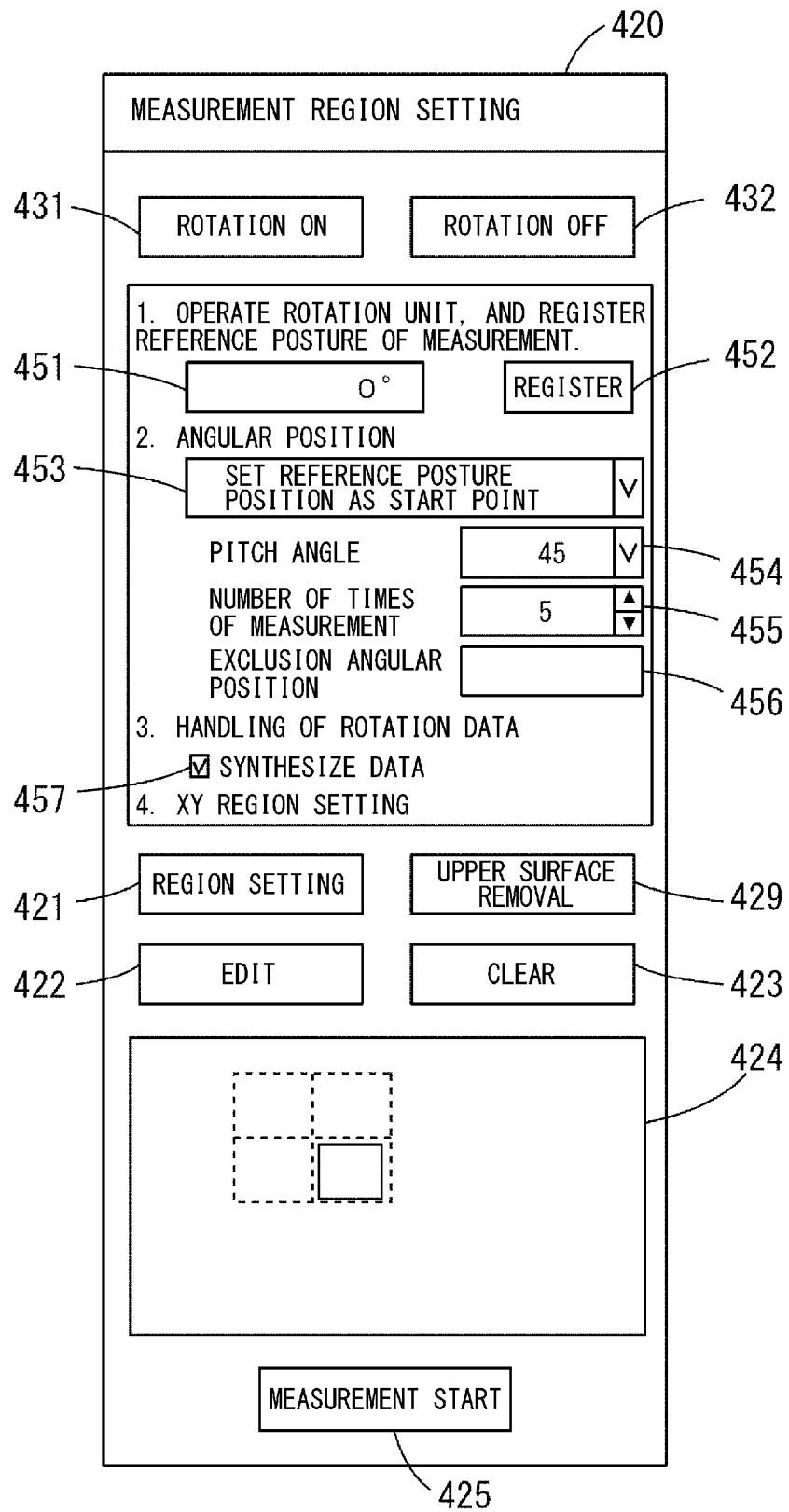
FIG. 29 is a diagram illustrating an example of a sub display region displayed in the display portion when a rotation detail button of FIG. 24 is operated.

When the rotation detail button 437 of FIG. 24 is operated, the display mode of the sub display region 420 changes. FIG. 29 is a diagram illustrating an example of the sub display region 420 displayed in the display portion 400 when the rotation detail button 437 of FIG. 24 is operated. As illustrated in FIG. 29, when the rotation detail button 437 is operated in the measurement basic screen 401 of FIG. 24, a reference posture input frame 451, a reference posture registration button 452, an angle condition setting portion 453, an angle pitch setting portion 454, a measurement number setting portion 455, an excluded angle input frame 456, a synthesis necessity check box 457, and the like are displayed in the sub display region 420.

The reference posture input frame 451 is configured to allow the user to input a desired angular position. The reference posture registration button 452 is operated to register the angular position input to the reference posture input frame 451 by the user as a reference posture position. When the reference posture registration button 452 is operated, the angular position input to the reference posture input frame 451 is stored as the reference posture position in the work memory 230 or the storage device 240.

The angle condition setting portion 453 is configured to be operable by the user to set how to determine the plurality of measurement angular positions. Specifically, the angle condition setting portion 453 is configured by a pull-down button capable of selecting a desired method from a plurality of types of setting methods.

The angle pitch setting portion 454 is configured to be operable by a user to set a plurality of measurement angular positions at what angular interval. Specifically, the angle pitch setting portion 454 is configured by a pull-down button capable of selecting a desired angle from a plurality of types of angles. The measurement number setting portion 455 is configured to be operable by the user to set how many times the three-dimensional shape data is to be generated at the angular interval set by the angle pitch setting portion 454. The excluded angle input frame 456 is configured to allow a user to input a measurement angular position that does not need to generate three-dimensional shape data.

The synthesis necessity check box 457 is configured to be able to select whether to synthesize the plurality of pieces of generated three-dimensional shape data after generating the plurality of pieces of three-dimensional shape data while rotating the measurement subject S at set angular intervals over a plurality of times.

When the user desires to synthesize the plurality of pieces of three-dimensional shape data, the user checks the synthesis necessity check box 457. As a result, the plurality of pieces of three-dimensional shape data generated at the plurality of measurement angular positions at the time of shape measurement of the measurement subject S are synthesized. On the other hand, when the user does not desire to synthesize the plurality of pieces of three-dimensional shape data, the user does not check the synthesis necessity check box 457. As a result, the plurality of pieces of three-dimensional shape data generated at the plurality of measurement angular positions at the time of shape measurement of the measurement subject S are not synthesized. As described above, when the user operates the rotation detail button 437 of FIG. 24, the user can further operate various input frames, buttons, and setting portions illustrated in FIG. 29 to make detailed settings regarding the shape measurement of the measurement subject S.

(5) Correction and Addition of Settings, etc.

Figure 30:
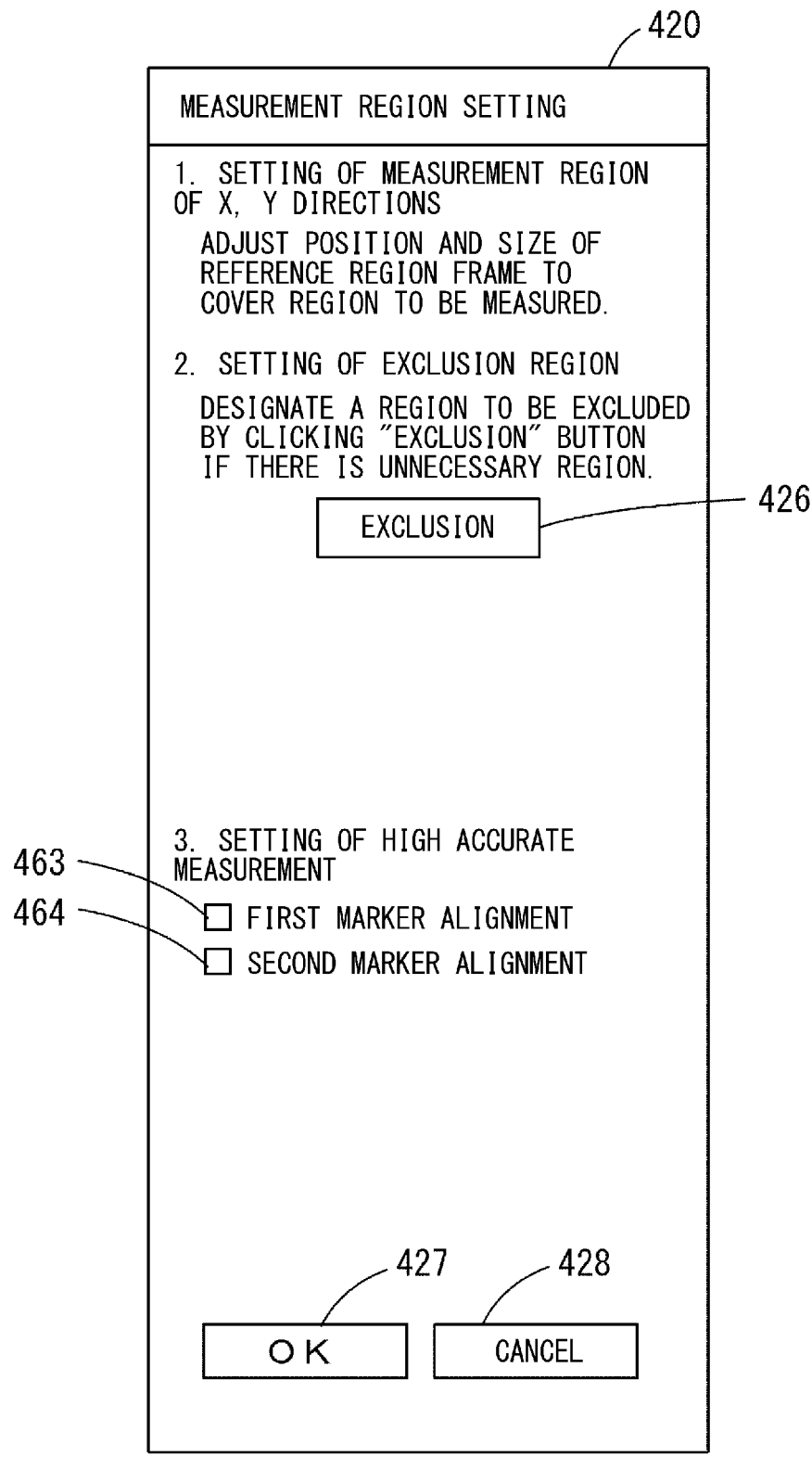
FIG. 30 is a diagram illustrating an example of the sub display region displayed in the display portion when an edit button of FIGS. 26 to 28 is operated.

When the edit button 422 of FIGS. 26 to 28 is operated, the display mode of the sub display region 420 changes. FIG. 30 is a diagram illustrating an example of the sub display region 420 displayed in the display portion 400 by operating the edit button 422 of FIGS. 26 to 28. As illustrated in FIG. 30, when the edit button 422 is operated in the region setting screens 402 to 405 of FIGS. 26 to 28, a message to adjust the position and size of the measurement region on the region setting map image is displayed in the sub display region 420 as in the example of FIG. 23. In addition, the exclusion button 426, the OK button 427, and the cancel button 428 are displayed. Further, a first calibration check box 463 and a second calibration check box 464 are displayed.

The first calibration check box 463 is a check box for setting whether to use a first configuration function using the first marker M1 of FIG. 15A. On the other hand, the second calibration check box 464 is a check box for setting whether to use a second configuration function using the second marker M2 of FIG. 16B.

When the user desires to use the first configuration function using the first marker M1 in the operation in Step S36 described above, the user checks the first calibration check box 463 of FIG. 30. In this case, it is necessary to set the measurement region such that the shape measurement is also performed for the first marker M1. Here, since the first marker M1 is a part of the rotation support shaft 91, the existence region of the first marker M1 on the stage 140 is known. Therefore, when the first calibration check box 463 is checked, a new measurement region for covering the existence region of the first marker M1 is set in addition to the measurement region currently set.

Figure 31:
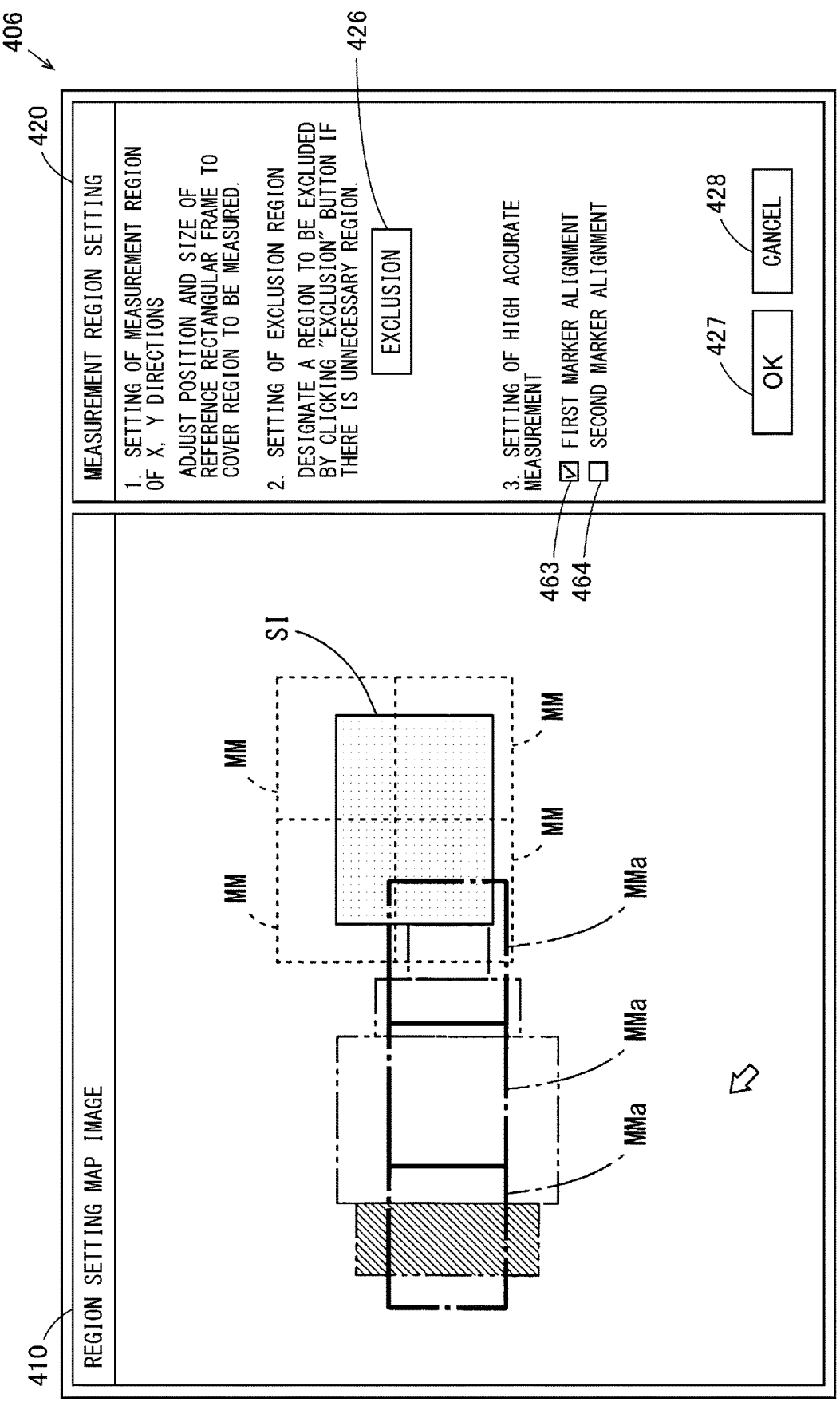
FIG. 31 is a diagram illustrating an example of the region setting screen displayed in the display portion when a first calibration check box of FIG. 30 is checked.

FIG. 31 is a diagram illustrating an example of the region setting screen displayed in the display portion 400 when the first calibration check box 463 of FIG. 30 is checked. In a region setting screen 406 of FIG. 31, a region setting map image corresponding to a specific one measurement angular position (for example, 0°) is displayed in the main display region 410.

In the region setting map image, the measurement region for generating three-dimensional shape data of the measurement subject S is indicated by the plurality of unit region frames MM. Further, in the region setting map image, the measurement region for generating the three-dimensional shape data of the first marker M1 is indicated by a plurality of unit region frames MMa.

In FIG. 31, the images of the holding portion 191 and the first marker M1 are indicated by two-dot chain lines. The image portion of the first marker M1 is hatched such that the position of the first marker M1 can be easily understood.

Here, the unit region frame MMa added corresponding to the first marker M1 is displayed in a mode different from the unit region frame MM (in this example, a thick one-dotted chain line) so as to be distinguishable from the unit region frame MM corresponding to the measurement subject S. As a result, the user can easily grasp that a new measurement region has been set in order to use the first calibration function using the first marker M1.

When the user desires to use the second configuration function using the second marker M2, the user checks the second calibration check box 464 of FIG. 30. In this case, it is necessary to set a measurement region such that the shape measurement is also performed for the second marker M2. Here, the second marker M2 is attached to the measurement subject S by the user in the operation of Step S37 described above. Therefore, the user needs to set a new measurement region to cover the existence region of the second marker M2 according to the position of the second marker M2 attached to the measurement subject S.

Figure 32:
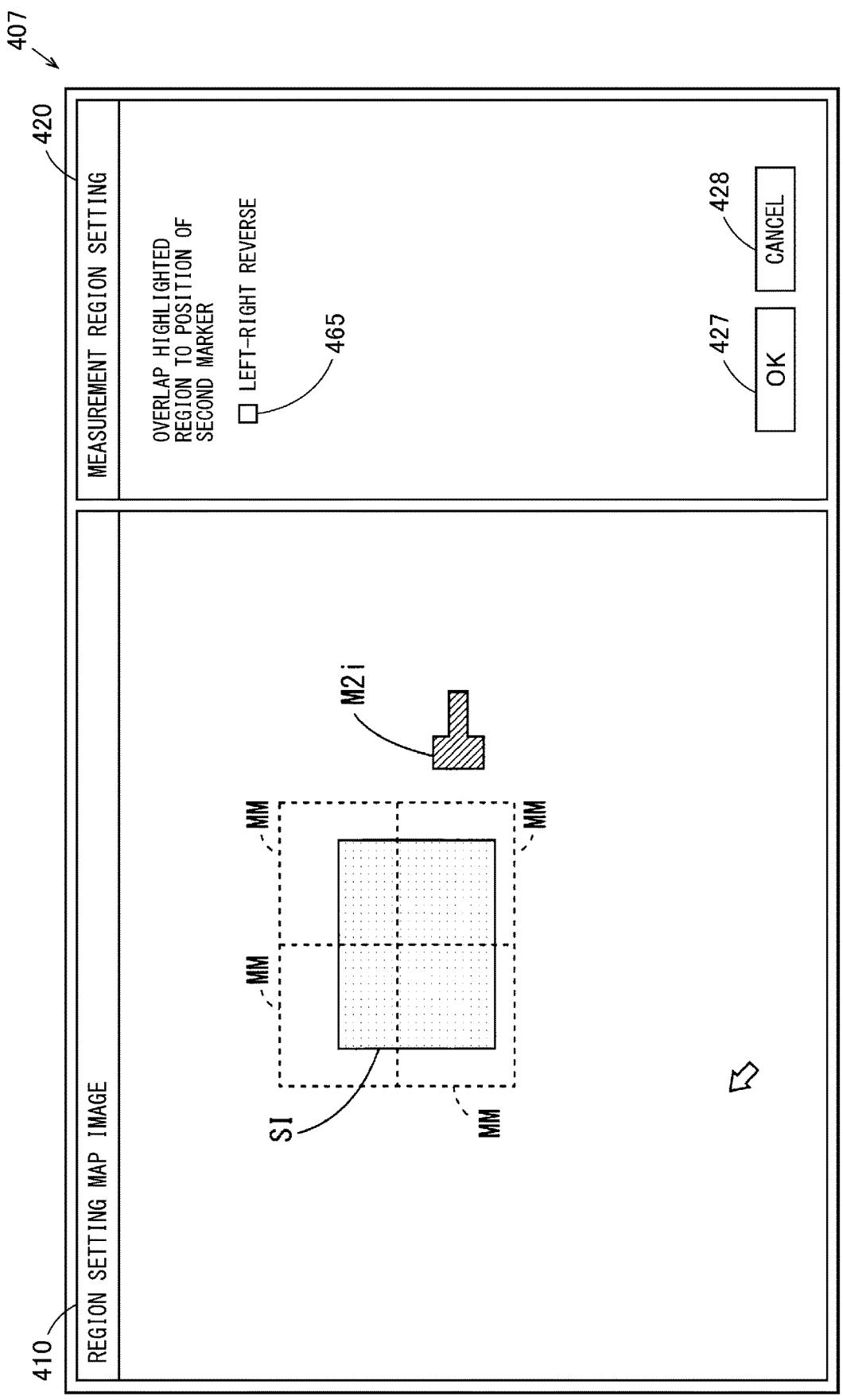
FIG. 32 is a diagram illustrating an example of the region setting screen displayed in the display portion when a second calibration check box of FIG. 30 is checked.

FIG. 32 is a diagram illustrating an example of the region setting screen displayed in the display portion 400 when the second calibration check box 464 of FIG. 30 is checked. In a region setting screen 407 of FIG. 32, similarly to the example of the region setting screen 406 of FIG. 31, the region setting map image corresponding to a specific one measurement angular position (for example, 0°) is displayed in the main display region 410.

Further, in the region setting map image, the measurement region for generating the three-dimensional shape data of the measurement subject S is indicated by a plurality of unit region frames MM, and a marker image M2*i* for designating the position of the second marker M2 is displayed. In this state, the user disposes the marker image M2*i* at a position corresponding to the actual position of the second marker M2 on the region setting map image by dragging the marker image M2*i*, for example.

In the sub display region 420, a marker reverse check box 465, the OK button 427, and the cancel button 428 are displayed. Here, in the shape measuring apparatus 500 according to this embodiment, a basic posture of the second marker M2 to be attached to the measurement subject S when the second calibration function is used is determined in advance. For example, the basic posture of the second marker M2 to be attached to the measurement subject S is a posture in which the axial center of the second marker M2 is parallel or substantially parallel to the rotation axis RA, and the large diameter portion M2a and the small diameter portion M2b are disposed to be separated from the rotation unit 190 in this order. On the other hand, as illustrated in the example of FIG. 17, the second marker M2 can be attached to the rotation unit 190 in a reverse posture in which the basic posture is reversed in the X direction.

Figure 33:
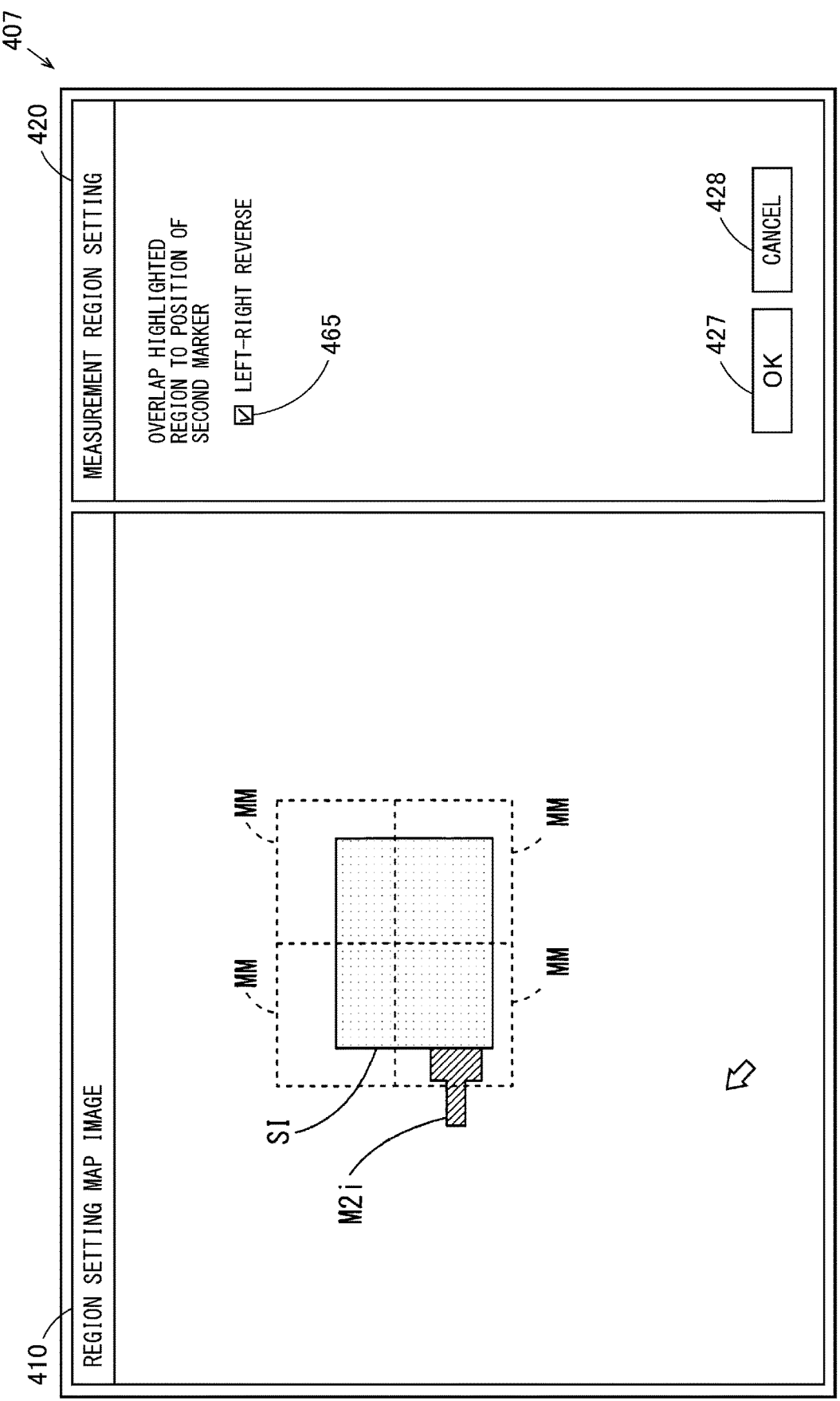
FIG. 33 is a diagram illustrating an example of the region setting screen displayed in the display portion when a marker reverse check box of FIG. 32 is checked.

The marker reverse check box 465 is a check box for setting whether to reverse and dispose the orientation of the second marker M2 in the X direction. FIG. 33 is a diagram illustrating an example of the region setting screen displayed in the display portion 400 when the marker reverse check box 465 of FIG. 32 is checked. As illustrated in FIG. 33, on the region setting screen 407, by checking the marker reverse check box 465, the direction of the marker image M2i is reversed in the left-right direction with respect to the display example of FIG. 32.

After the position and orientation of the marker image M2i are adjusted on the region setting map image as described above, the OK button 427 is operated. Accordingly, a new measurement region is set so as to cover the region corresponding to the marker image M2i.

Figure 34:
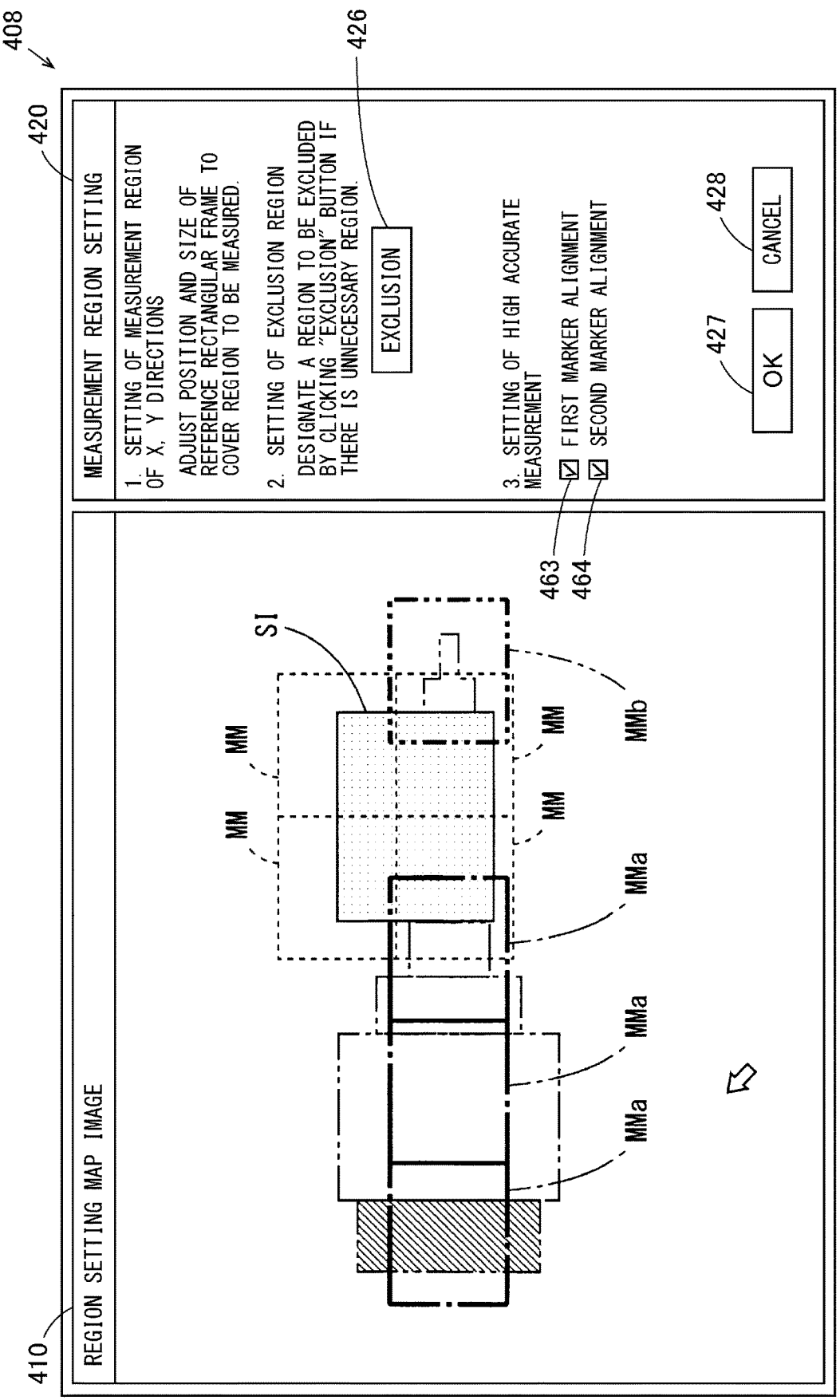
FIG. 34 is a diagram illustrating an example of the region setting screen displayed in the display portion in a state where a new measurement region for the first marker and the second marker is set.

FIG. 34 is a diagram illustrating an example of the region setting screen displayed in the display portion 400 in a state where new measurement regions for the first marker M1 and the second marker M2 are set. In the region setting screen 408 of FIG. 34, the measurement region for generating the three-dimensional shape data of the subject image SI is indicated by a plurality of unit region frames MM in the region setting map image displayed in the main display region 410. Further, a measurement region for generating the three-dimensional shape data of the first marker M1 is indicated by a plurality of unit region frames MMa. Further, a measurement region for generating the three-dimensional shape data of the second marker M2 is indicated by a plurality of unit region frames MMb. As a result, the user can easily grasp that the new measurement regions have been set in order to use the first and second calibration functions using the first marker M1 and the second marker M2.

In the example of FIG. 34, the unit region frame MMa corresponding to the first marker M1, the unit region frame MMb corresponding to the second marker M2, and the unit region frame MM corresponding to the measurement subject S are displayed in mutually distinguishable different modes. As a result, the user can easily grasp the purpose set for each part of the measurement region.

[6] Upper Surface Removal Function

As described above, it is assumed that the upper surface removal button 429 of FIGS. 22 and 29 is operated, that is, the user instructs to remove the three-dimensional shape data of the upper surface 141s of the stage 140 from the measurement result. In this case, in the shape measuring apparatus 500, the three-dimensional shape image of the measurement subject S is displayed in the display portion 400 in a state where the three-dimensional shape data corresponding to the upper surface 141s is removed from all the three-dimensional shape data obtained by imaging the measurement subject S (upper surface removal function). A specific example will be described.

Figure 35:
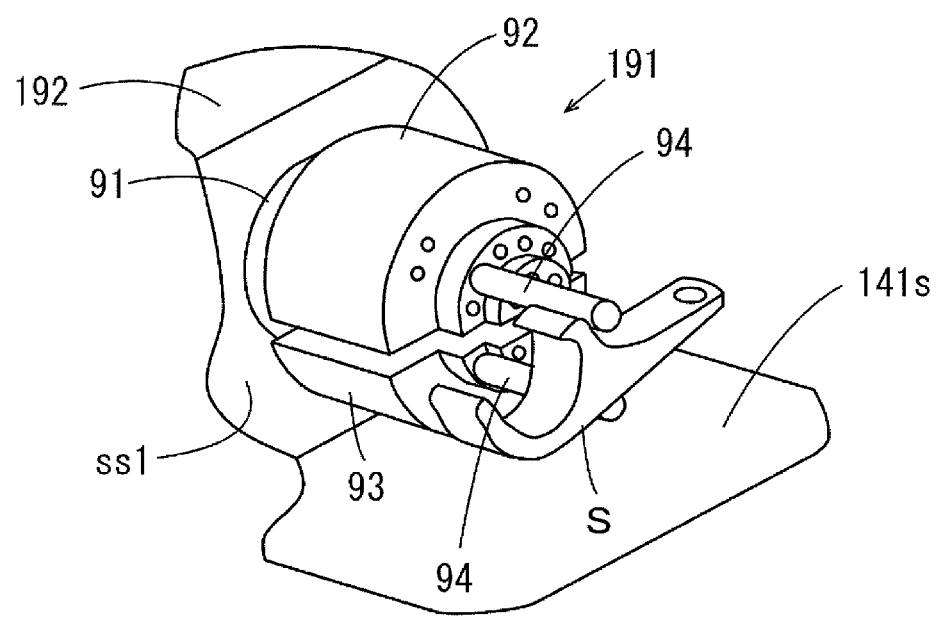
FIG. 35 is an external perspective view illustrating an example of shape measurement of a measurement subject using a rotation unit.

FIG. 35 is an external perspective view illustrating an example of shape measurement of the measurement subject S using the rotation unit 190. As illustrated in FIG. 35, in this example, the shape of the measurement subject S held by the holding portion 191 using by the two rod-shaped members 94 is measured while being rotated. In this case, when the upper surface 141s of the stage 140 is located in the measurement space 101, the three-dimensional shape data indicating the shape of the upper surface 141s is generated together with three-dimensional shape data indicating the shape of the measurement subject S.

Figure 36:
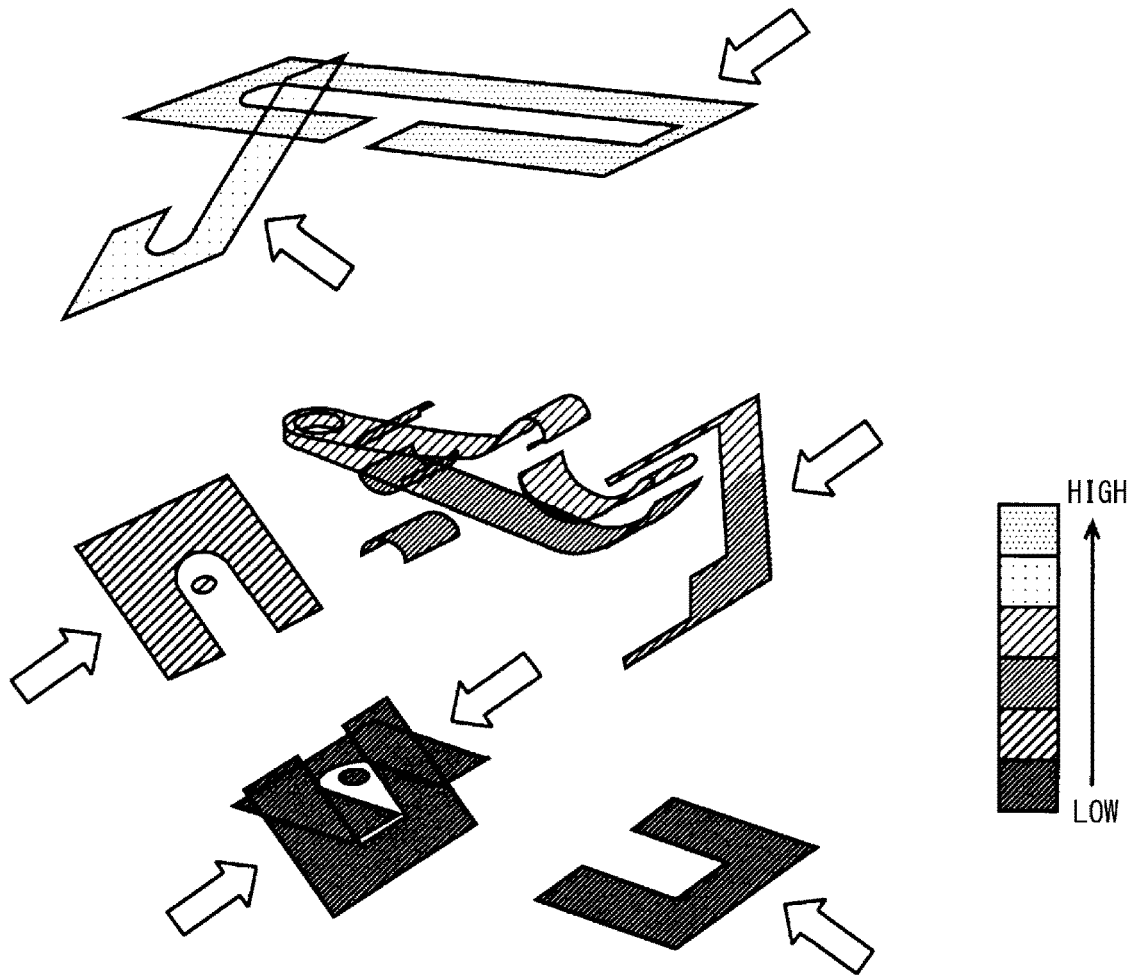
FIG. 36 is a diagram illustrating an example of a three-dimensional shape image based on all pieces of three-dimensional shape data obtained by the shape measurement of FIG. 35.

FIG. 36 is a diagram illustrating an example of the three-dimensional shape image based on all pieces of three-dimensional shape data obtained by the shape measurement of FIG. 35. In the three-dimensional shape image of FIG. 36 and FIG. 37 described later, the position (height) in the Z direction is represented by hatching and a dot pattern. In the three-dimensional shape image of FIG. 36, a portion indicated by a white arrow is a portion representing the upper surface 141s of the stage 140. As described above, when the three-dimensional shape image of the stage 140 is displayed in addition to the measurement subject S, it is difficult for the user to grasp the shape of the measurement subject S.

As illustrated in FIG. 36, the three-dimensional shape data corresponding to the upper surface 141s of the stage 140 indicates a planar shape having a certain degree of continuous spread. These pieces of three-dimensional shape data can be identified based on whether a data group of a plane having a continuous spread is extracted, and a normal direction with respect to the extracted plane is upward at each measurement angular position and the position in the Z direction is at a position of the design upper surface 141s.

Figure 37:
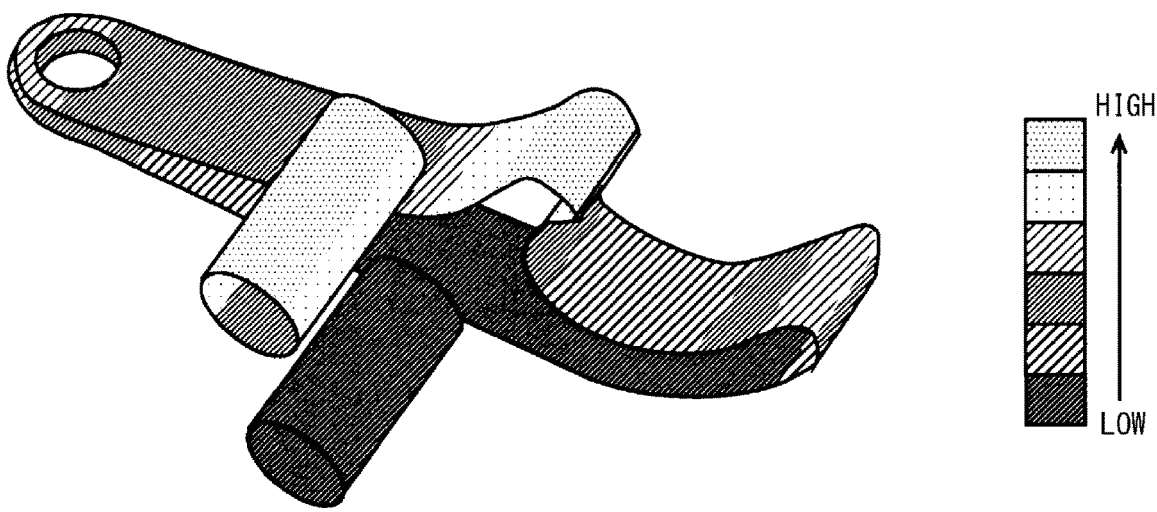
FIG. 37 is a view obtained by removing the three-dimensional shape image corresponding to the upper surface of the stage from the three-dimensional shape image of FIG. 36.

FIG. 37 is a view in which the three-dimensional shape image corresponding to the upper surface 141s of the stage 140 is removed from the three-dimensional shape image of FIG. 36. According to the three-dimensional shape image of FIG. 37, the user can easily and accurately grasp the three-dimensional shape of the measurement subject S. In the three-dimensional shape images of FIGS. 36 and 37, the display ranges in the Z direction are different from each other.

[7] Functional Configuration of CPU 210 in PC 200

Figure 38:
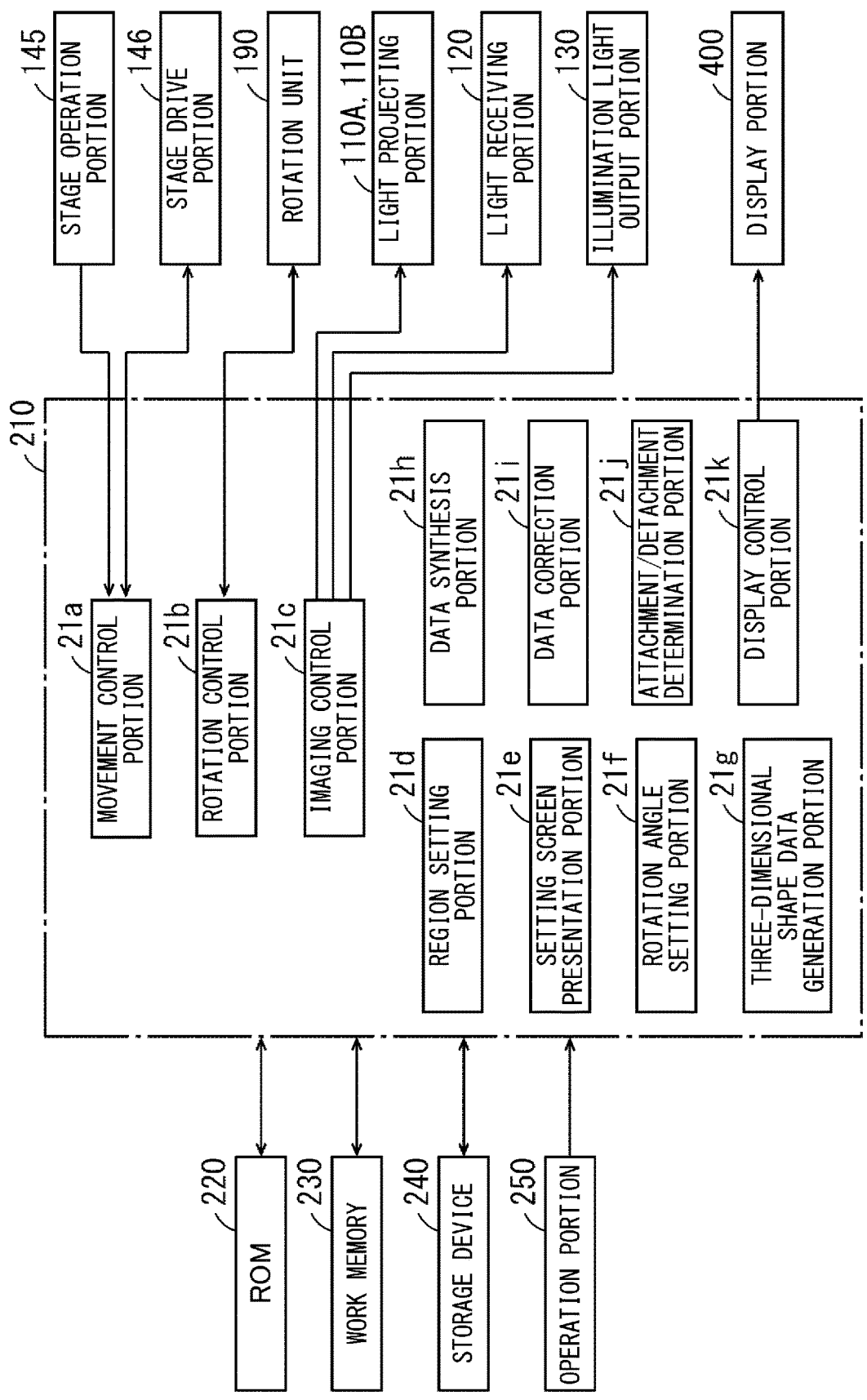
FIG. 38 is a block diagram illustrating a functional configuration of a CPU of FIG. 1.

FIG. 38 is a block diagram illustrating a functional configuration of the CPU 210 of FIG. 1. As illustrated in FIG. 38, the CPU 210 includes a movement control portion 21a, a rotation control portion 21b, an imaging control portion 21c, a region setting portion 21d, a setting screen presentation portion 21e, a rotation angle setting portion 21f, a three-dimensional shape data generation portion 21g, a data synthesis portion 21h, a data correction portion 21i, an attachment/detachment determination portion 21j, and a display control portion 21k. These components are implemented by the CPU 210 executing the shape measurement program stored in the storage device 240. Note that some or all of the plurality of components included in the CPU 210 may be realized by hardware such as an electronic circuit.

The movement control portion 21a controls the stage drive portion 146 such that the position of the upper surface 141s of the stage 140 moves relative to the light receiving portion 120. In other words, the movement control portion 21a adjusts the relative position of the measurement space 101 with respect to the measurement subject S by moving the upper surface 141s of the stage 140 with the measurement subject S disposed on the stage 140. The rotation control portion 21b controls the rotation unit 190 such that the measurement subject S sequentially rotates to a plurality of predetermined measurement angular positions at the time of shape measurement of the measurement subject S accompanied by rotation.

In order to detect the existence region of the measurement subject S, the imaging control portion 21c controls the illumination light output portion 130 and the light receiving portion 120 such that an image of the measurement subject S disposed on the stage 140 is captured at a low magnification. In addition, the imaging control portion 21c controls the light projecting portions 110A and 110B and the light receiving portion 120 such that an image of the measurement region set by the region setting portion 21d described later is captured in a state where the measurement subject S is at each measurement angular position.

The region setting portion 21d detects the existence region of the measurement subject S in a state where the measurement subject S is placed on the stage 140 or in a state where the measurement subject S held by the rotation unit 190 is at each measurement angular position. In addition, the region setting portion 21d sets the measurement region based on the detection result of the existence region. Further, the region setting portion 21d corrects the set measurement region based on the operation of the operation portion 250 by the user.

The setting screen presentation portion 21e displays the region setting map image in the display portion 400 when the region setting portion 21d sets the measurement region. In addition, the setting screen presentation portion 21e superimposes and displays the unit region frames MM, MMa, and MMb on the image of the measurement subject S in the region setting map image such that the set measurement region can be identified.

The rotation angle setting portion 21f sets a plurality of measurement angular positions when the shape measurement of the measurement subject S accompanied by rotation is performed. Here, the plurality of measurement angular positions respectively corresponding to the first box-shaped region setting mode, the second box-shaped region setting mode, and the shaft-shaped region setting mode are stored in the storage device 240 as default information, for example, as described above.

In this case, the rotation angle setting portion 21f reads a plurality of measurement angular positions stored in the storage device 240 according to the selected region setting mode to set a plurality of measurement angular positions at the time of shape measurement of the measurement subject S accompanied by rotation. The rotation angle setting portion 21f may set the designated angular position as the measurement angular position when the user receives designation of a specific angular position by operating the angle pitch setting portion 454 or the like of FIG. 29 using the operation portion 250, for example.

The three-dimensional shape data generation portion 21g generates three-dimensional shape data indicating the shape of the measurement subject S based on a plurality of pieces of image data generated by irradiating the measurement region with the pattern light and imaging the measurement region. In addition, the three-dimensional shape data generation portion 21g generates three-dimensional shape data indicating the shape of the first marker M1 based on a plurality of pieces of image data generated by imaging the first marker M1 located in the measurement region. Further, the three-dimensional shape data generation portion 21g generates three-dimensional shape data indicating the shape of the second marker M2 based on a plurality of pieces of image data generated by imaging the second marker M2 located in the measurement region.

The data synthesis portion 21h performs the above-described planar direction synthesis when the three-dimensional shape data of the plurality of portions arranged in the X, Y directions on the surface of the measurement subject S is individually generated. In addition, when the three-dimensional shape data of the plurality of portions arranged about the rotation axis RA in the surface of the measurement subject S is individually generated, the data synthesis portion 21h performs the above-described rotation direction synthesis in response to the designation of the synthesis by the user. Further, the data synthesis portion 21h synthesizes the three-dimensional shape data generated by the planar direction synthesis and the three-dimensional shape data generated by the rotational direction synthesis. In addition, the data synthesis portion 21h can also perform the above-described height direction synthesis, for example, in a case where a plurality of pieces of three-dimensional shape data are individually generated in a common measurement region by performing imaging at a plurality of positions in the Z direction with respect to the surface of the measurement subject S.

When the shape measurement of the measurement subject S accompanied by rotation is performed, the data correction portion 21i performs the three-dimensional shape data correction processing according to any one of the first to third calibration functions according to the necessity of using the first marker M1 and the second marker M2. Specifically, in the correction processing according to the first calibration function, the data correction portion 21i corrects the plurality of pieces of three-dimensional shape data of the measurement subject S respectively corresponding to the plurality of measurement angular positions based on the three-dimensional shape data of the first marker M1 and the dimensions thereof.

In the correction processing according to the second calibration function, the data correction portion 21i corrects the plurality of pieces of three-dimensional shape data of the measurement subject S respectively corresponding to the plurality of measurement angular positions based on the three-dimensional shape data of the first marker M1 and the second marker M2 and the dimensions thereof. When the three-dimensional shape data of the first marker M1 does not exist in the correction processing according to the second calibration function, the data correction portion 21i corrects the plurality of pieces of three-dimensional shape data of the measurement subject S respectively corresponding to the plurality of measurement angular positions based on the three-dimensional shape data of the second marker M2 and the dimensions thereof.

Further, in the correction processing according to the third calibration function, the data correction portion 21i corrects the plurality of pieces of three-dimensional shape data of the measurement subject S respectively corresponding to the plurality of measurement angular positions based on the overlapping relationship of the three-dimensional shape data of the measurement subject S at the plurality of measurement angular positions.

The attachment/detachment determination portion 21j determines whether the rotation unit 190 is attached to the stage 140. Specifically, when the connector 194 of the rotation unit 190 and the connector 141c of the stage 140 are connected, the attachment/detachment determination portion 21j determines that the rotation unit 190 is attached to the stage 140. When the connector 194 of the rotation unit 190 and the connector 141c of the stage 140 are not connected, the attachment/detachment determination portion 21j determines that the rotation unit 190 is not attached to the stage 140. whether the connector 194 of the rotation unit 190 and the connector 141c of the stage 140 are connected can be easily determined based on whether the electrical signal can be exchanged between the attachment/detachment determination portion 21j and the rotation unit 190.

The display control portion 21k displays the live image of the measurement subject S and the three-dimensional shape image of the measurement subject S in the display portion 400, and displays various setting screens such as the measurement basic screen 401 and the region setting screens 402 to 408 in the display portion 400.

In particular, when the rotation unit 190 is attached to the stage 140, the display control portion 21k causes the display portion 400 to display the horizontal movement operation window 411 and the rotation operation window 413. Further, in this case, the display control portion 21k causes the display portion 400 to display an image for performing various settings regarding the shape measurement of the measurement subject S accompanied by rotation.

When the rotation unit 190 is not attached to the stage 140, the display control portion 21k causes the display portion 400 to display the horizontal movement operation window 411, but does not cause the display portion 400 to display the rotation operation window 413. Further, in this case, the display control portion 21k causes the display portion 400 to display an image for performing various settings regarding the shape measurement of the measurement subject S without rotation.

[8] Shape Measurement Processing

Figure 39:
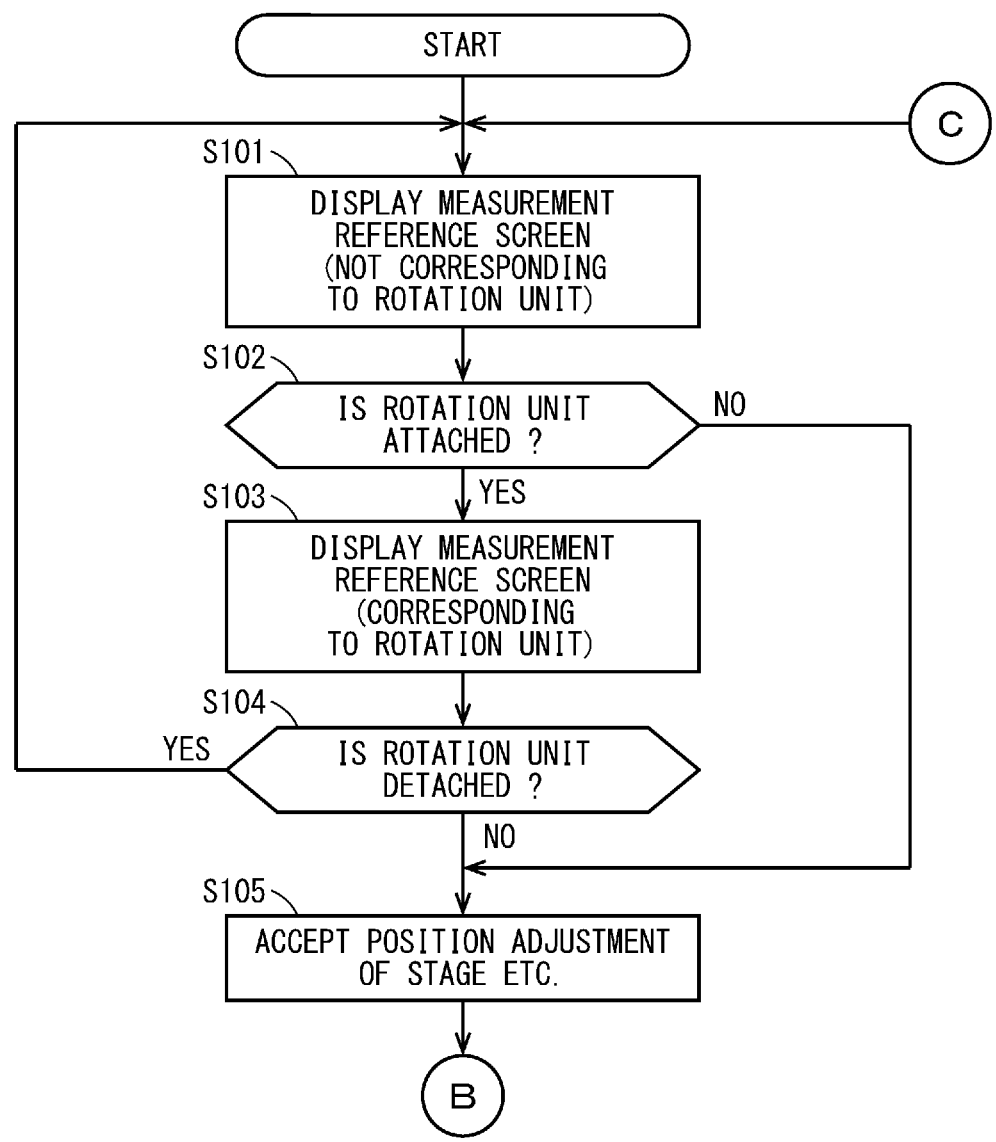
FIG. 39 is a flowchart illustrating an example of shape measurement processing executed by the CPU.
Figure 40:
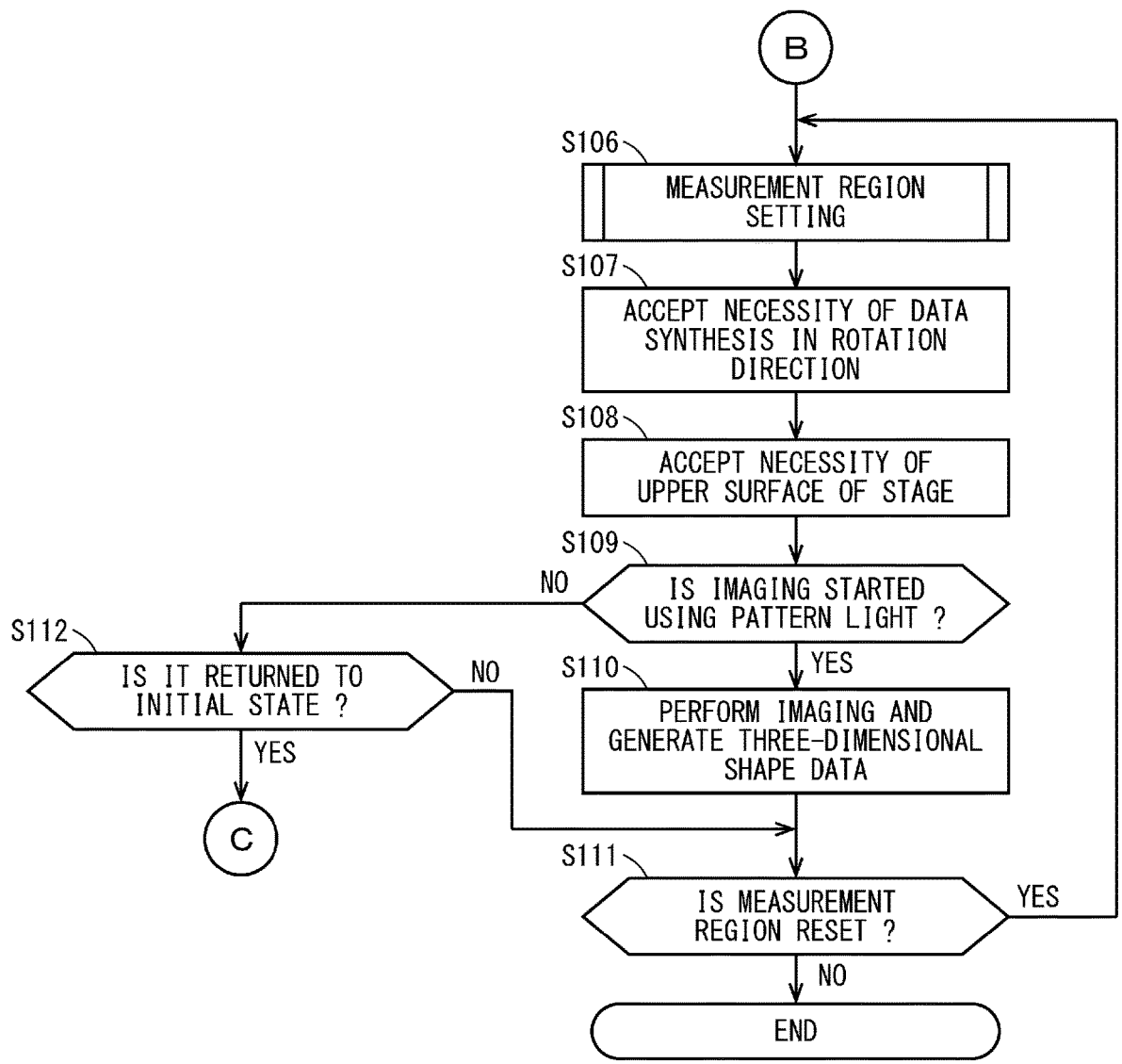
FIG. 40 is a flowchart illustrating an example of shape measurement processing executed by the CPU.

FIGS. 39 and 40 are flowcharts illustrating an example of shape measurement processing executed by the CPU 210. The shape measurement processing of FIGS. 39 and 40 is repeatedly performed at a predetermined cycle by the CPU 210 of the PC 200 executing the shape measurement program stored in the storage device 240 in a state where the power source of the shape measuring apparatus 500 is turned on. In the initial state, the illumination light is emitted from the illumination light output portion 130 toward the stage 140, and the light receiving portion 120 captures an image of the upper surface 141s of the stage 140.

First, as illustrated in the example of FIG. 22, the display control portion 21k causes the display portion 400 to display the measurement basic screen 401 including the live image, the measurement start button 425, and the like in a state where the rotation unit 190 cannot be operated (Step S101). Therefore, the measurement basic screen 401 displayed in Step S101 includes the horizontal movement operation window 411 (FIG. 22) for operating the stage 140, but does not include the rotation operation window 413 (FIG. 24) for operating the rotation unit 190.

Next, the attachment/detachment determination portion 21j determines whether the rotation unit 190 is attached to the stage 140 (Step S102). In a case where the rotation unit 190 is not attached to the stage 140, the attachment/detachment determination portion 21j advances the process to Step S105 described later. On the other hand, when the rotation unit 190 is attached to the stage 140, as illustrated in the example of FIG. 24, the display control portion 21k causes the display portion 400 to display the measurement basic screen 401 in a state where the rotation unit 190 can be operated (Step S103). Note that, at the time of determination in Step S102, the display control portion 21k may cause the display portion 400 to display a message, an index, or the like indicating whether the rotation unit 190 is attached to the stage 140 according to the determination result.

Next, the attachment/detachment determination portion 21j determines whether the rotation unit 190 is detached in a state where the measurement basic screen 401 (FIG. 24) on which the rotation unit 190 can be operated is displayed in the display portion 400 (Step S104). When the rotation unit 190 is detached, the attachment/detachment determination portion 21j returns the process to Step S101. On the other hand, when the rotation unit 190 is not detached, the movement control portion 21a and the rotation control portion 21b receive a command to adjust the position of the stage 140 and the like (Step S105). The adjustment of the position of the stage 140 and the like is commanded, for example, by the user operating the horizontal movement operation window 411 (FIGS. 22 and 24) or the rotation operation window 413 (FIG. 24) using the operation portion 250. At this time, the movement control portion 21a moves the upper surface 141s of the stage 140 in the X direction, the Y direction, and the Z direction in response to the command to adjust the position of the stage 140. In addition, the rotation control portion 21b rotates the holding portion 191 of the rotation unit 190 in response to a rotation command of the rotation unit 190 from the user. As a result, for example, the position of the focal point of the light receiving portion 120 is adjusted.

Thereafter, measurement region setting processing is performed based on the operation of the operation portion 250 by the user (Step S106). By the measurement region setting processing, in the shape measurement of the measurement subject S accompanied by rotation, a plurality of measurement angular positions are set, and one or a plurality of measurement regions are set for each measurement angular position. In the shape measurement of the measurement subject S without rotation, one or a plurality of measurement regions are set. Details of the measurement region setting processing executed by the CPU 210 will be described later.

Next, when the measurement region for shape measurement of the measurement subject S accompanied by rotation is set, the data synthesis portion 21h receives a command as to whether to synthesize a plurality of pieces of three-dimensional shape data acquired at a plurality of measurement angular positions (Step S107). This reception is performed, for example, on the basis of whether the synthesis necessity check box 457 of FIG. 29 is checked by the user. At the time of shape measurement of the measurement subject S without rotation, the process of Step S107 is skipped. Note that, for example, the measurement basic screen 401 of FIG. 22 or 24 may be provided with a synthesis necessity input portion for designating whether to perform planar direction synthesis and whether to perform rotational direction synthesis. In this case, the data synthesis portion 21h may receive the input of the synthesis necessity input portion in Step S107.

Next, the data correction portion 21i receives a command as to whether the three-dimensional shape data indicating the upper surface 141s of the stage 140 is required from the three-dimensional shape data generated by the shape measurement of the measurement subject S (Step S108). This reception is performed based on, for example, whether the upper surface removal button 429 of FIG. 22 or 24 is operated by the user.

Next, the imaging control portion 21c determines whether a command to start imaging the measurement subject S using the pattern light has been received (Step S109). This reception is performed, for example, on the basis of whether the measurement start button 425 of FIG. 22 or 24 is operated by the user. In a case where the imaging start command is not received, the imaging control portion 21c determines whether there is a command to return to the initial state (Step S112). This determination is made based on, for example, whether the region clear button 423 of FIG. 22 or 24 is operated by the user. In a case where there is a command to return to the initial state, the imaging control portion 21c returns the process to Step S101. In a case where there is no command to return to the initial state, the imaging control portion 21c advances the process to Step S111 described later.

On the other hand, when an imaging start command is received, imaging using pattern light is performed on the set measurement region, and three-dimensional shape data is generated on the basis of a plurality of pieces of image data obtained by imaging (Step S110).

Specifically, when a plurality of measurement angular positions are set, the rotation control portion 21b controls the rotation unit 190 such that the measurement subject S sequentially rotates to the plurality of measurement angular positions set about the rotation axis RA. In addition, the movement control portion 21a controls the stage drive portion 146 such that an image of the set measurement region is captured for the measurement subject S placed on the stage 140 or the measurement subject S held by the rotation unit 190. Further, the imaging control portion 21c controls the light projecting portions 110A and 110B and the light receiving portion 120 such that an image of the set measurement region is captured. Further, the three-dimensional shape data generation portion 21g generates three-dimensional shape data of the measurement region on the basis of a plurality of pieces of image data obtained by imaging. At this time, the display control portion 21k causes the display portion 400 to display the three-dimensional shape image based on the generated three-dimensional shape data.

When given a command to synthesize the plurality of pieces of three-dimensional shape data in Step S107, the data synthesis portion 21h synthesizes the plurality of pieces of three-dimensional shape data corresponding to the plurality of measurement angular positions (rotation direction synthesis). On the other hand, when not given a command to synthesize the plurality of pieces of three-dimensional shape data in Step S107, the data synthesis portion 21h does not synthesize the plurality of pieces of three-dimensional shape data corresponding to the plurality of measurement angular positions.

In addition, the data correction portion 21i corrects each of the plurality of pieces of three-dimensional shape data before synthesis according to the calibration function enabled in the process of Steps S236 and S237 of the measurement region setting processing described later. Further, when given a command in Step S108 that indicates the three-dimensional shape data indicating the upper surface 141s is unnecessary, the data correction portion 21i removes the three-dimensional shape data indicating the upper surface 141s of the stage 140 from all the generated three-dimensional shape data.

Next, the region setting portion 21d determines whether there is a command to reset the measurement region by the user operating the operation portion 250 (Step S111). Therefore, when there is a resetting command, the region setting portion 21d returns the process to Step S106. On the other hand, when there is no resetting command, the region setting portion 21d ends a series of shape measurement processing. At this time, the three-dimensional shape data generation portion 21g stores the generated three-dimensional shape data in the storage device 240 together with various types of setting information (for example, a plurality of measurement angular positions, a plurality of measurement regions, and the like).

Figure 41:
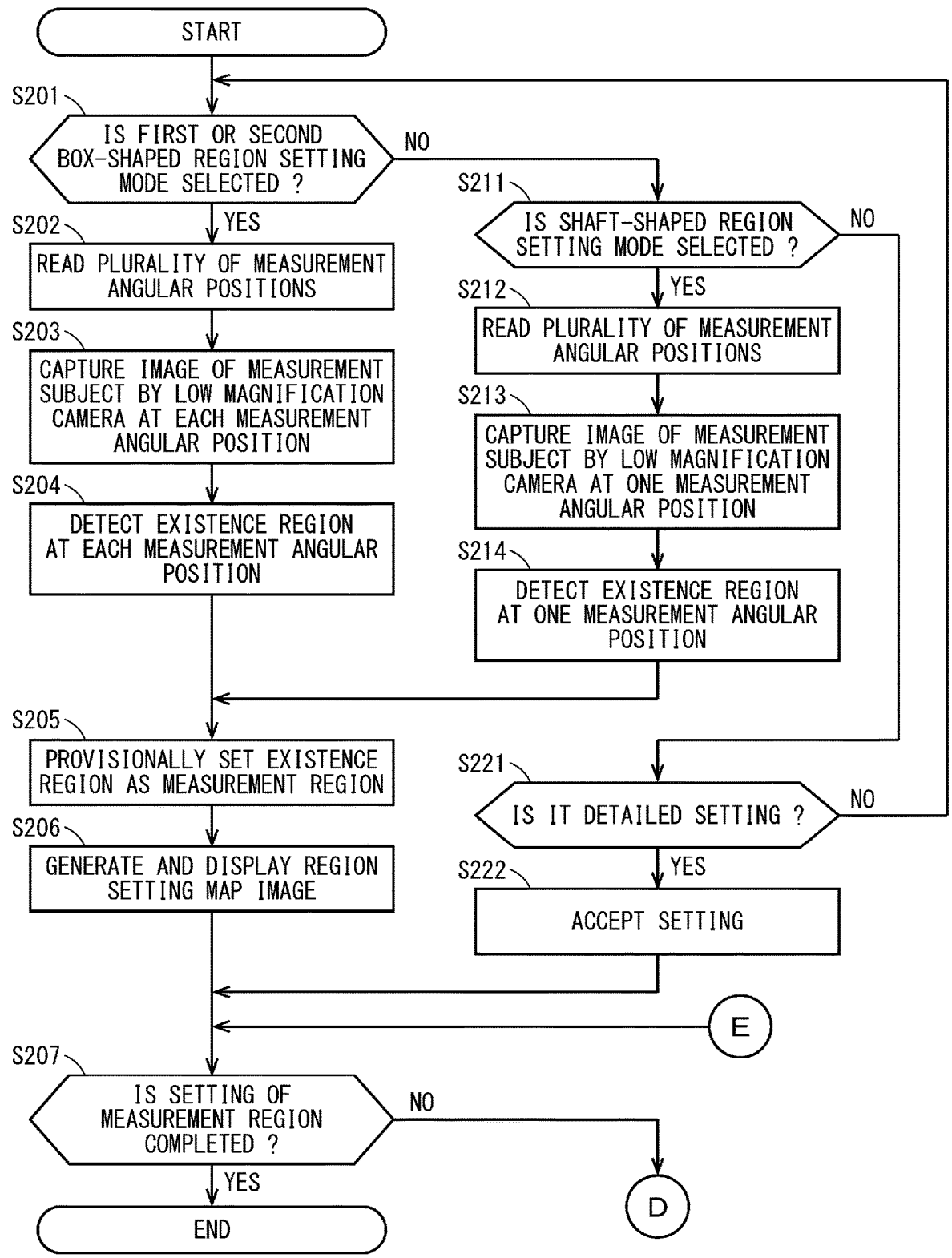
FIG. 41 is a flowchart illustrating an example of measurement region setting processing executed by the CPU.
Figure 42:
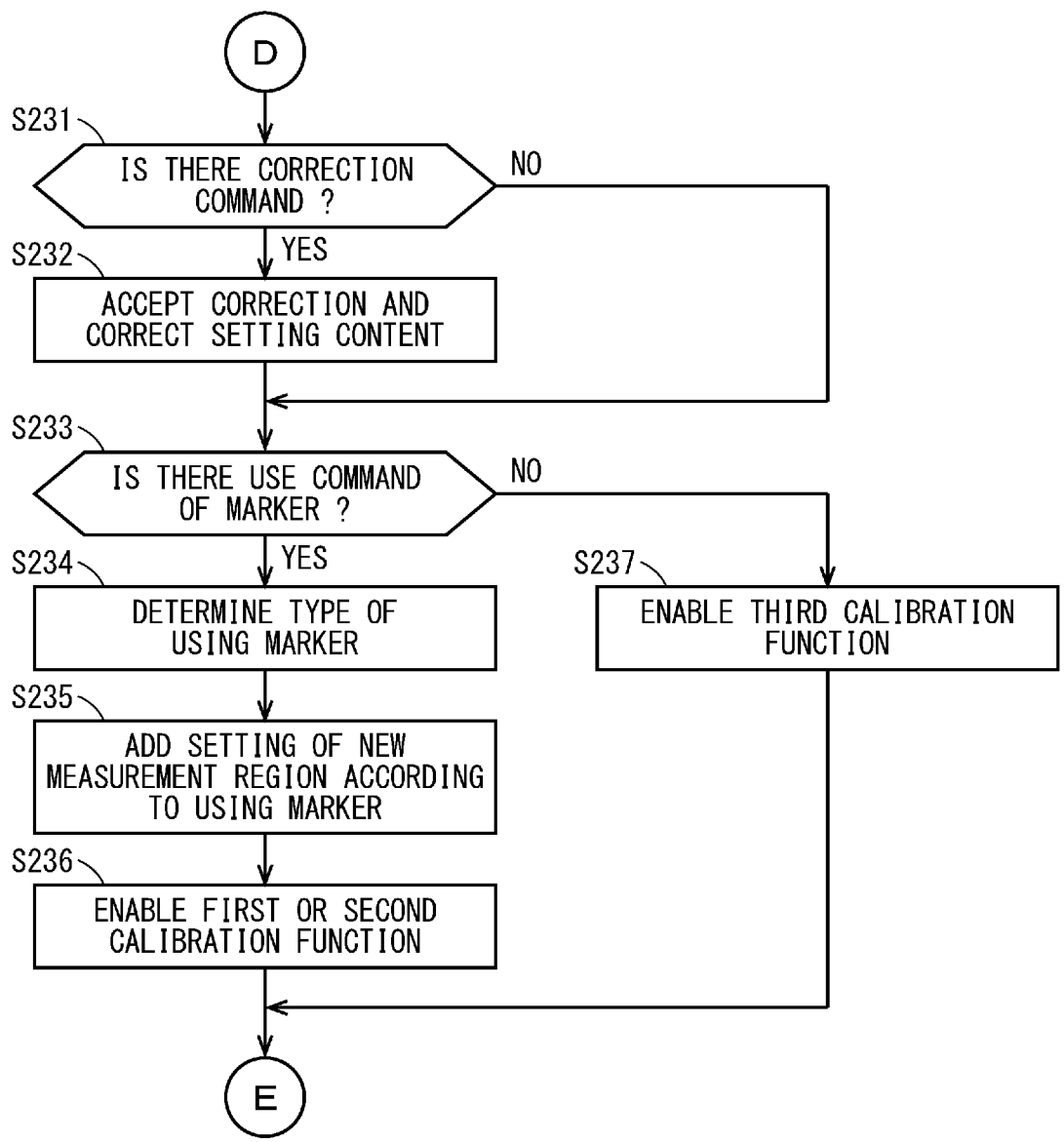
FIG. 42 is a flowchart illustrating an example of measurement region setting processing executed by the CPU.

Details of the measurement region setting processing included in the shape measurement processing will be described. Note that the measurement region setting processing described below corresponds to the shape measurement of the measurement subject S accompanied by rotation by the rotation unit 190. FIGS. 41 and 42 are flowcharts illustrating an example of the measurement region setting processing executed by the CPU 210.

As illustrated in FIG. 41, first, the region setting portion 21d determines whether the first or second box-shaped region setting mode is selected as a mode for setting the measurement region (Step S201). This determination is made based on, for example, whether the entire box circumference button 434 or the partial box button 435 of FIG. 24 is operated by the user in the operation of Step S31 described above.

When the first or second box-shaped region setting mode is selected, the rotation angle setting portion 21f reads a plurality of measurement angular positions corresponding to the selected box-shaped region setting mode from the storage device 240 (Step S202). The plurality of measurement angular positions are defined at intervals of integral multiples of a predetermined angle (for example, 30°, 45° or 90°). In other words, the plurality of measurement angular positions are defined with a predetermined angular pitch. The reading process corresponds to a process of setting a plurality of measurement angular positions. Note that the rotation angle setting portion 21f may set a plurality of measurement angular positions on the basis of information specified by the user operating the angle condition setting portion 453, the angle pitch setting portion 454, and the like of FIG. 29.

Next, an image of the entire measurement subject S is captured by the low magnification camera at each measurement angular position (Step S203). At this time, the rotation control portion 21b controls the rotation unit 190 such that the measurement subject S sequentially rotates to a plurality of set measurement angular positions. In addition, the imaging control portion 21c controls the illumination light output portion 130 and the light receiving portion 120 such that an image of the measurement subject S is captured by the low magnification camera in a state where the measurement subject S is at each measurement angular position. Further, when an image of the entire measurement subject S is not captured at one time, the movement control portion 21a moves the upper surface 141s of the stage 140 in the X, Y directions such that a portion of the measurement subject S whose image is not captured sequentially moves into the imaging region of the light receiving portion 120.

Thereafter, the region setting portion 21d detects the existence region corresponding to each measurement angular position based on the image data obtained by the imaging in Step S203 (Step S204). Here, the imaging of the measurement subject S in Step S203 is performed to detect the existence region of the measurement subject S in subsequent Step S204. Therefore, basically, an image of the entire measurement subject S needs to be captured.

As described above, in Step S203, an image of the measurement subject S is captured by the low magnification camera. An imaging region of the camera 121A, which is a low magnification camera, is larger than the imaging region of the camera 121B, which is a high magnification camera. Therefore, when an image of the entire measurement subject S is captured by the low magnification camera, the number of times of imaging can be reduced as compared with the case where an image of the entire measurement subject S is captured by the high magnification camera. Therefore, the time required to detect the existence region can be shortened.

After the process of Step S204, the region setting portion 21d provisionally sets a region including the detected existence region of each measurement angular position as the measurement region of the measurement angular position (Step S205). Therefore, the setting screen presentation portion 21e generates a region setting map image on the basis of the plurality of image data obtained in Step S204 and the measurement region of each set measurement angular position, and displays the region setting map image on the display portion 400 (Step S206). At this time, the setting screen presentation portion 21e superimposes and displays one or a plurality of unit region frames MM on the image of the measurement subject S in the region setting map image such that the set measurement region can be identified.

Next, the region setting portion 21d determines whether setting of the measurement region has been completed (Step S207). This determination is made based on, for example, whether the measurement start button 425 of FIG. 24 is operated by the user. When the setting of the measurement region is completed, the measurement region setting processing ends. On the other hand, when the setting of the measurement region is not completed, the region setting portion 21d determines whether there is a command to correct the measurement region (Step S231). This determination is made, for example, on the region setting screen 403 to 405 of FIGS. 26 to 28 based on whether a command to change, add, or delete the measurement region has been given by the user.

In a case where there is no command to correct the measurement region in Step S231, the region setting portion 21d advances the process to Step S233 described later. On the other hand, when there is a command to correct the measurement region in Step S231, the region setting portion 21d receives the correction and corrects the set measurement region according to the received content (Step S232).

Next, the data correction portion 21i determines whether there is a command to use either the first marker M1 or the second marker M2 for calibration of the three-dimensional shape data (Step S233). When there is a command to use the marker, the data correction portion 21i determines the type of marker to be used (Step S234). The determination in Steps S233 and S234 by the data correction portion 21i is performed, for example, on the basis of which one of the first calibration check box 463 and the second calibration check box 464 of FIG. 30 is checked by the user.

Next, the data correction portion 21i adds a new measurement region setting according to the marker to be used (Step S235), and enables the calibration function according to the marker to be used (Step S236). Thereafter, the data correction portion 21i returns the process to Step S207. In Step S236, when the marker to be used is the first marker M1, the first calibration function is enabled. On the other hand, when the marker to be used is the second marker M2, the second calibration function is enabled. In a case where there is no command to use the marker in Step S233, the data correction portion 21i enables the third calibration function (Step S237), and returns the process to Step S207.

When the first or second box-shaped region setting mode is not selected in Step S201 described above, the region setting portion 21d determines whether the shaft-shaped region setting mode is selected as a mode for setting the measurement region (Step S211). This determination is made based on, for example, whether the shaft button 436 of FIG. 24 is operated by the user.

When the shaft-shaped region setting mode is selected, the rotation angle setting portion 21f reads a plurality of measurement angular positions corresponding to the shaft-shaped region setting mode from the storage device 240 (Step S212). This reading process corresponds to a process of setting a plurality of measurement angular positions similarly to the process of Step S202. Note that the rotation angle setting portion 21f may set a plurality of measurement angular positions on the basis of a condition designated by the user operating the angle condition setting portion 453, the angle pitch setting portion 454, and the like of FIG. 29.

Next, the entire image of the measurement subject S is captured by the low magnification camera at one of the plurality of measurement angular positions (Step S213). At this time, the rotation control portion 21b controls the rotation unit 190 such that the measurement subject S is held at one measurement angular position among the plurality of set measurement angular positions. In addition, the imaging control portion 21c controls the illumination light output portion 130 and the light receiving portion 120 such that an image of the measurement subject S is captured by the low magnification camera in a state where the measurement subject S is at one measurement angular position. When an image of the entire measurement subject S is not captured at one time, the movement control portion 21a moves the upper surface 141s of the stage 140 in the X, Y directions such that a portion of the measurement subject S whose image is not captured sequentially moves into the imaging region of the light receiving portion 120.

Thereafter, the region setting portion 21d detects the existence region corresponding to one measurement angular position on the basis of the image data obtained by the imaging in Step S213 (Step S214), and advances the process to Step S205. In Step S213, an image of the measurement subject S is captured by the low magnification camera similarly to the process in Step S203. Accordingly, the time required for detecting the existence region can be shortened.

When the shaft-shaped region setting mode is not selected in Step S211 described above, the region setting portion 21d determines whether a command to perform detailed setting of the measurement region has been received (Step S221). This determination is made based on, for example, whether the rotation detail button 437 of FIG. 24 is operated by the user.

When receiving a command to perform detailed setting of the measurement region, the region setting portion 21d receives the setting of the measurement region (Step S222). Here, for example, a condition designated by the user operating the angle condition setting portion 453, the angle pitch setting portion 454, and the like of FIG. 29 is received. Thereafter, the region setting portion 21d advances the process to Step S207.

In the measurement region setting processing corresponding to the shape measurement of the measurement subject S without rotation, the processes similar to Steps S205 to S207, S231, and S232 are performed after the existence region of the measurement subject S is detected.

[9] Effects (1) In the shape measuring apparatus 500 according to this embodiment, the measurement subject S is irradiated with pattern light in a state where the measurement subject S is placed on the upper surface 141s of the stage 140. Alternatively, in a state where the measurement subject S is held by the rotation unit 190, the measurement subject S rotated about the rotation axis RA intersecting the optical axis ROA of the light receiving portion 120 is irradiated with the pattern light. An image of the measurement subject S irradiated with the pattern light is captured by the light receiving portion 120. Three-dimensional shape data of the measurement subject S is generated based on a plurality of pieces of image data obtained by imaging.

In this case, the user can place the measurement subject S on the upper surface of the stage or rotate the measurement subject S by the rotation unit such that the pattern light is incident on the shape of a desired portion in the measurement subject S. As a result, the shape can be measured over a wide range on the surface of the measurement subject S.

(2) In the shape measuring apparatus 500 according to this embodiment, at the time of setting the measurement region for performing the shape measurement of the measurement subject S respectively accompanied by rotation, the existence region of the measurement subject S corresponding to each of the plurality of set measurement angular positions is detected.

Further, the measurement region whose image should be captured by the light receiving portion 120 for each measurement angular position is set on the basis of the detection result of the existence region at the measurement angular position. In this case, the user does not need to perform a complicated setting operation according to the shape of the measurement subject S for each measurement angular position. Thereafter, an image of the set measurement region is captured in a state where the measurement subject S is at each measurement angular position, and a plurality of pieces of three-dimensional shape data are generated. As a result, it is possible to measure the shape over a wide range on the surface of the measurement subject S without requiring a complicated setting operation.

(3) In the shape measuring apparatus 500 according to this embodiment, it is set to use the first configuration function using, for example, the first marker M1 in order to perform the shape measurement of the measurement subject S accompanied by rotation. In this case, images of the first marker M1 and the measurement subject S are captured. The three-dimensional shape data of the first marker M1 and the three-dimensional shape data of the measurement subject S are generated based on the image data obtained by the imaging. On the basis of the three-dimensional shape data of the first marker M1 and the dimensions of the first marker M1, correction processing of the three-dimensional shape data according to the first calibration function is performed.

In this case, since the three-dimensional shape data of the first marker M1 is generated in a state where the measurement subject S is held by the holding portion 191, when the holding portion 191 holds the measurement subject S and the rotation state of the holding portion 191 changes, the rotation state of the first marker M1 also changes similarly to the holding portion 191. Therefore, the three-dimensional shape data of the first marker M1 is more suitable for correcting the three-dimensional shape data of the measurement subject S as compared with a case where the measurement subject S is generated in a state where the measurement subject S is not held by the holding portion 191. As a result, the shape can be measured with high accuracy over a wide range on the surface of the measurement subject S.

The first marker M1 constitutes a part of the holding portion 191. Therefore, in order to calibrate the shape measuring apparatus 500, it is not necessary to attach a calibration tool to the holding portion 191 and replace the calibration tool attached to the holding portion 191 with the measurement subject S. Therefore, the time required for the calibration operation of the shape measuring apparatus 500 is shortened.

(4) In addition, in the shape measuring apparatus 500, it is set to use the second configuration function using the second marker M2 in order to perform the shape measurement of the measurement subject S accompanied by rotation. In this case, images of the second marker M2 and the measurement subject S are captured, and the three-dimensional shape data of the second marker M2 and the three-dimensional shape data of the measurement subject S obtained by the imaging are generated. On the basis of the three-dimensional shape data of the second marker M2 and the dimensions of the second marker M2, correction processing of the three-dimensional shape data according to the second calibration function is performed. According to the second calibration function, the measurement accuracy of the measurement subject S is improved by using the three-dimensional shape data of the first marker M1 and the second marker M2.

Further, in the shape measuring apparatus 500, it is set to use a third configuration function that does not use the first marker M1 and the second marker M2 in order to perform the shape measurement of the measurement subject S accompanied by rotation. In this case, based on the three-dimensional shape data of the measurement subject S, correction processing of the three-dimensional shape data according to the third calibration function is performed. According to the third calibration function, since it is not necessary to image the first marker M1 and the second marker M2, the time required for measuring the measurement subject S can be shortened.

(5) The user can select one of the first to third calibration functions, for example, by checking or not checking one of the first calibration check box 463 and the second calibration check box 464 of FIG. 31. Therefore, since a desired calibration function can be easily selected according to the application of the shape measurement, the convenience of the shape measurement of the measurement subject S is improved.

[10] Other Embodiments (1) In the shape measurement processing according to the above embodiment, the region setting portion 21d may set the measurement range of the measurement subject S in the Z direction at the time of the measurement region setting of the measurement subject S. Further, in a case where the set imaging range in the Z direction exceeds the range of the measurement space 101 in the Z direction (the range of the depth of field of the light receiving portion 120), the height direction synthesis may be performed.

Figure 43:
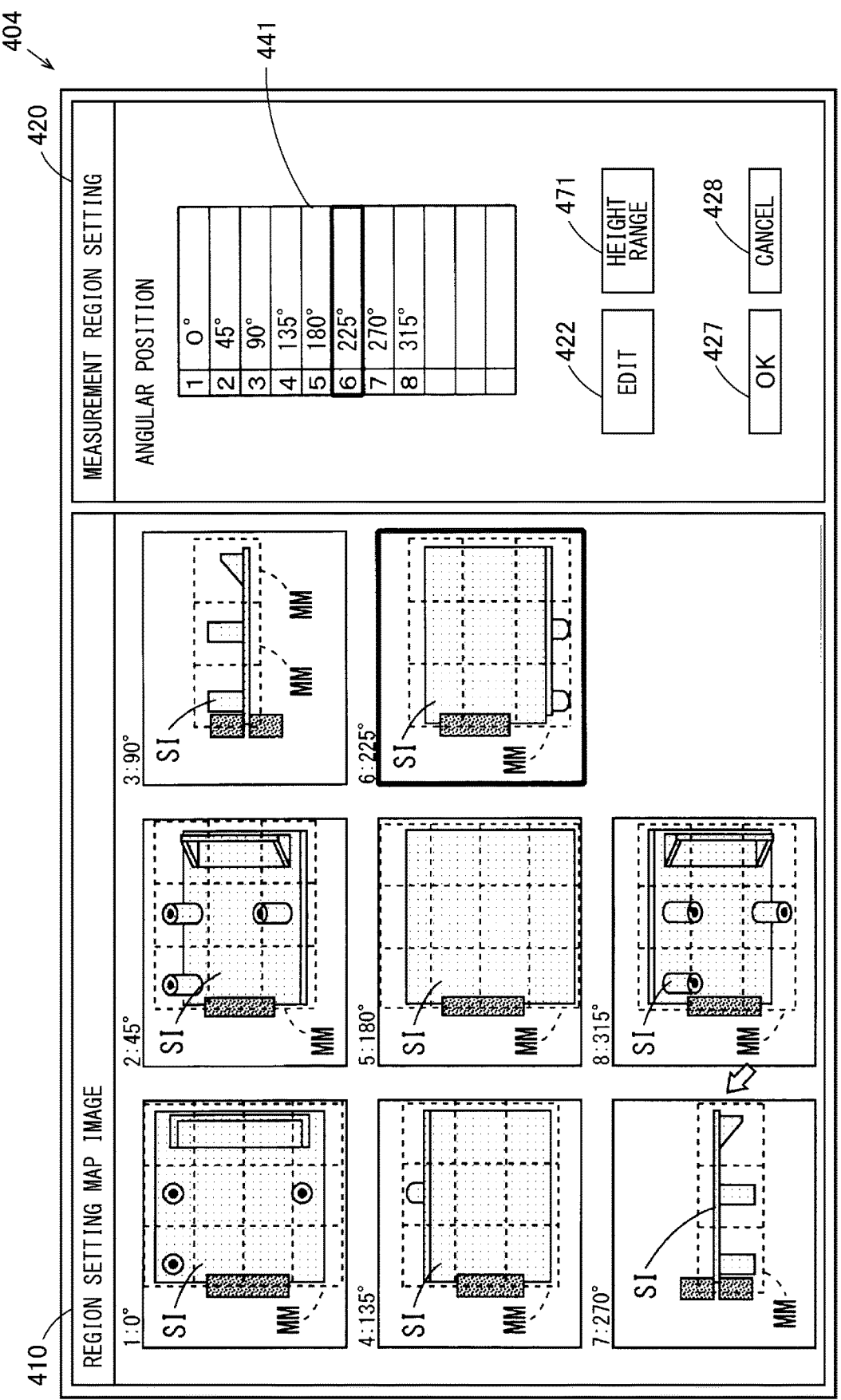
FIG. 43 is a diagram illustrating an example of a region setting screen capable of accepting necessity of setting a measurement range of a measurement subject in the Z direction.

In this case, the region setting screen is displayed in the display portion 400 so as to be able to receive the necessity of setting the measurement range of the measurement subject S in the Z direction, for example. FIG. 43 is a diagram illustrating an example of the region setting screen that can accept the necessity of setting the measurement range of the measurement subject S in the Z direction. In the region setting screen 404 of FIG. 43, a height range button 471 is displayed in the sub display region 420 in a state where the region setting map image is displayed in the main display region 410.

Figure 44:
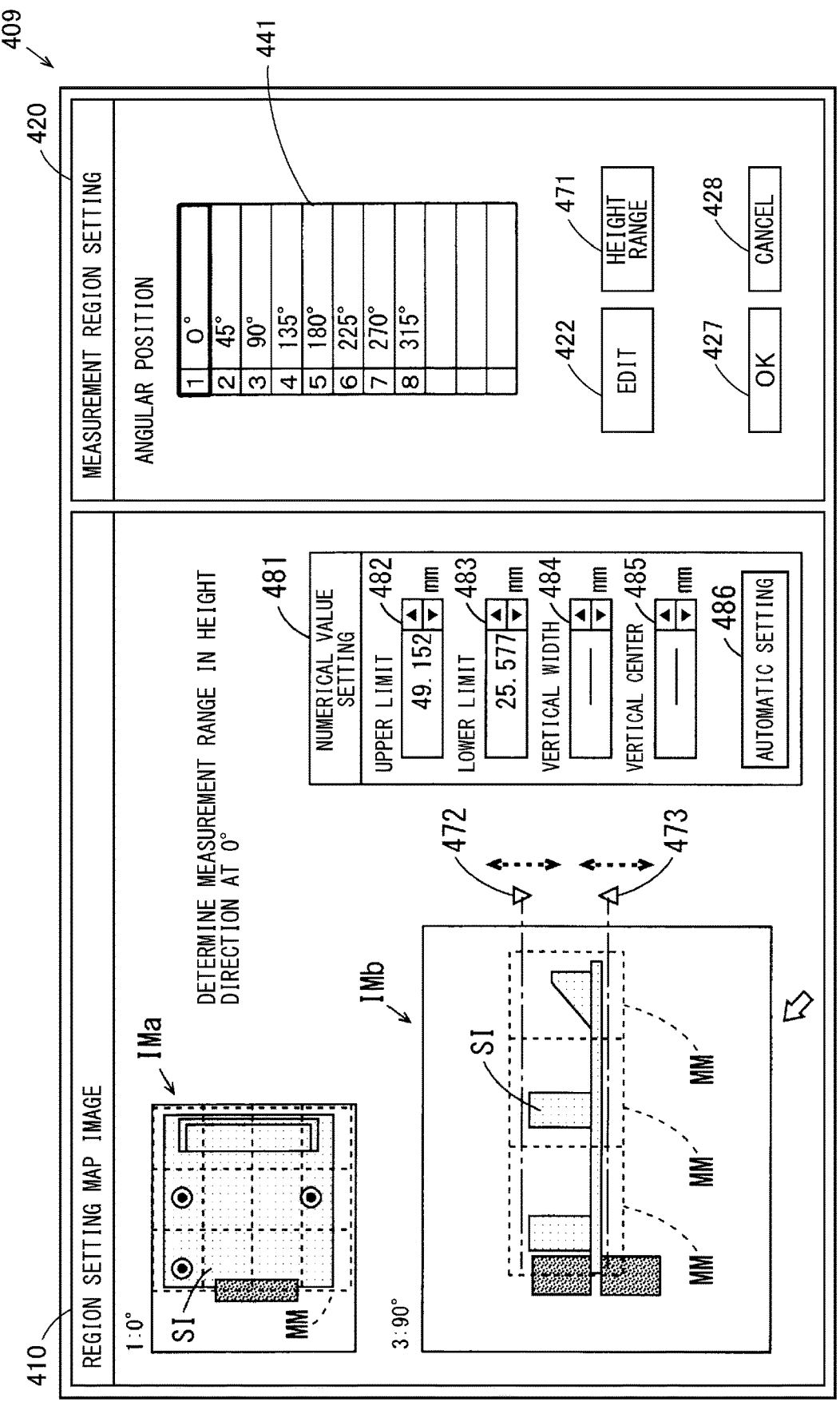
FIG. 44 is a diagram illustrating an example of a region setting screen for setting the measurement range of a measurement subject in the Z direction.

The user operates the height range button 471 when the user desires to set the measurement range in the Z direction. As a result, the region setting screen for setting the measurement range of the measurement subject S in the Z direction is displayed in the display portion 400. FIG. 44 is a diagram illustrating an example of the region setting screen for setting the measurement range of the measurement subject S in the Z direction.

In the region setting screen 409 of FIG. 44, various images and operation windows for setting the measurement range of the measurement angular position (0° in this example) designated by operating the angular position list 441 of the sub display region 420 are displayed.

Specifically, a region setting map image IMa at the measurement angular position designated by the angular position list 441 and a region setting map image IMb at the measurement angular position shifted by 90° with respect to the designated measurement angular position are displayed in the main display region 410. On the region setting map image IMb, an upper limit mark 472 and a lower limit mark 473 indicating the upper limit position and the lower limit position of the measurement range in the Z direction, respectively, are overlapped and displayed so as to be slidable in the vertical direction. As a result, the user can set the measurement range in the Z direction at the designated measurement angular position by sliding the upper limit mark 472 and the lower limit mark 473 in the vertical direction while visually recognizing the image of the measurement subject S displayed in the region setting map image IMb.

Further, a range setting window 481 for further specifying a measurement range in the Z direction with a numerical value or giving a command to perform automatic setting is displayed in the main display region 410. The range setting window 481 displays an upper limit input portion 482 and a lower limit input portion 483 for the user to input numerical values of the upper limit position and the lower limit position of the measurement range in the Z direction, respectively. The range setting window 481 also displays a width input portion 484 and a center input portion 485 for the user to input numerical values of the size of the measurement range in the Z direction (the width in the vertical direction) and the center position of the measurement range. Further, in the range setting window 481, an automatic setting button 486 for giving a command to automatically set the measurement range in the Z direction for each of all the measurement angular positions is displayed.

As a result, the user can set the measurement range by inputting numerical values to the upper limit input portion 482 and the lower limit input portion 483 instead of operating the upper limit mark 472 and the lower limit mark 473. Alternatively, the user can set the measurement range by inputting numerical values to the width input portion 484 and the center input portion 485. Alternatively, the user can set the measurement range in the Z direction for all the measurement angular positions by operating the automatic setting button 486.

When the automatic setting button 486 is operated, the region setting portion 21d may set the measurement range for each measurement angular position as follows. For example, when setting the measurement range in the Z direction for one measurement angular position, the region setting portion 21d reads the region setting map image of the measurement angular position shifted by 90° with respect to one measurement angular position. In addition, the region setting portion 21d detects a range in the Z direction in which the measurement subject S exists from the read region setting map image, and sets the detected range as a range in the Z direction of one measurement angular position.

Alternatively, the region setting portion 21d can also set the measurement range for each measurement angular position as follows. For example, the rotation control portion 21b sequentially moves the rotation unit 190 to a plurality of measurement angular positions. Therefore, the imaging control portion 21c causes the light receiving portion 120 to image a plurality of portions of the measurement subject S in a state of being at each measurement angular position, and moves the stage 140 in the Z direction such that the focal plane 120F of the light receiving portion 120 is aligned with each of the plurality of portions of the measurement subject S facing upward. Then, the region setting portion 21d sets the measurement range based on the movement range of the stage 140 in the Z direction.

In this case, when the measurement range exceeds the range of the measurement space 101 (the range of the depth of field of the light receiving portion 120), the imaging control portion 21c may determine a plurality of positions of the upper surface 141s in the Z direction such that a plurality of portions of the measurement subject S are included within the range of the measurement space 101.

Alternatively, the region setting portion 21d can set the measurement range for each measurement angular position as follows. For example, the rotation control portion 21b sequentially moves the rotation unit 190 to a plurality of measurement angular positions. Therefore, the imaging control portion 21c images the measurement subject S using the pattern light in a state where the measurement subject S is at each measurement angular position, and generates the three-dimensional shape data to detect the position of the upper end portion of the measurement subject S in the Z direction. Then, the region setting portion 21d sets the measurement range based on the generated three-dimensional shape data of the measurement subject S. At the time of imaging the measurement subject S for setting the measurement range in the Z direction, it is preferable to reduce the number of times of irradiation of the pattern light by using pattern light having low resolution as so-called rough measurement.

As described above, the measurement range of the measurement subject S in the Z direction is set. As a result, when the measurement range set at an arbitrary measurement angular position exceeds the measurement space 101, the CPU 210 can generate three-dimensional shape data a plurality of times while changing the position of the stage 140 in the Z direction at the measurement angular position. In addition, by performing height direction synthesis using the plurality of pieces of generated three-dimensional shape data, it is possible to measure the shape over a wider range on the surface of the measurement subject.

(2) In the shape measurement processing according to the above embodiment, in order to detect the existence region of the measurement subject S corresponding to each measurement angular position at the time of shape measurement of the measurement subject S accompanied by rotation, an image of the measurement subject S at each measurement angular position is captured using the illumination light, but the present invention is not limited thereto.

In order to detect the existence region of the measurement subject S corresponding to each measurement angular position, the CPU 210 may perform the following processing. For example, in Step S204, the rotation control portion 21b controls the rotation unit 190 such that the measurement subject S is held at some (for example, 0° and 180°) representative angular positions among the plurality of measurement angular positions. In addition, the imaging control portion 21c controls the light projecting portions 110A and 110B and the light receiving portion 120 to generate a plurality of pieces of image data by imaging the measurement subject S while irradiating the measurement subject S with the pattern light in a state where the measurement subject S is at each representative angular position. The three-dimensional shape data generation portion 21g generates three-dimensional shape data corresponding to each representative angular position based on the plurality of pieces of image data generated in a state where the measurement subject S is at each representative angular position.

In this case, when the three-dimensional shape data corresponding to 0° which is one representative angular position and the three-dimensional shape data corresponding to 180° which is another representative angular position are combined, it is possible to grasp almost the entire shape of the measurement subject S. Therefore, the region setting portion 21d detects the existence region of the measurement subject S corresponding to the plurality of measurement angular positions based on the generated three-dimensional shape data. According to the above processing, it is not necessary to image the measurement subject at each of the plurality of angular positions in order to detect the existence region for the plurality of measurement angular positions.

The three-dimensional shape data generated to detect the existence region does not require high measurement accuracy. Therefore, at the time of generating the three-dimensional shape data for detecting the existence region, it is preferable to reduce the number of times of irradiation of the pattern light by using the pattern light having a low resolution as compared with the time of generating the three-dimensional shape data for acquiring the shape of the measurement subject S.

(3) In the shape measurement processing according to the above embodiment, the data synthesis portion 21h receives a command as to whether to synthesize the three-dimensional shape data of the plurality of measurement angular positions in the process of Step S107, but the present invention is not limited thereto.

In Step S107, the data synthesis portion 21h may receive a command to synthesize only a part of the plurality of pieces of three-dimensional shape data of the plurality of measurement angular positions. In this case, for example, in the sub display region 420 of FIG. 29, instead of the synthesis necessity check box 457, an input portion or the like for selecting a measurement angular position to which the three-dimensional shape data is to be synthesized among the plurality of measurement angular positions may be provided.

In a case where it is received a command to synthesize only a plurality of pieces of three-dimensional shape data acquired in a part of the plurality of measurement angular positions, the data synthesis portion 21h may synthesize only a part of the plurality of pieces of three-dimensional shape data according to the received information.

A data synthesis command portion for giving a command as to whether to synthesize in the rotation direction at least some pieces of three-dimensional shape data arranged in the rotation direction may be displayed in the display portion 400. Specifically, a check box or the like for individually designating the three-dimensional shape data to be synthesized may be displayed as the data synthesis command portion in the sub display region 420 of the region setting screens 403 to 405 of FIGS. 26 to 28. As a result, the user can acquire three-dimensional shape data of the shape of the measurement subject S in a desired manner.

(4) In the above embodiment, the rotation angle setting portion 21f reads a plurality of measurement angular positions determined in advance for each mode in the process of Step S212 from the storage device 240 and sets the plurality of measurement angular positions, but the present invention is not limited thereto.

As the process of Step S212, the rotation angle setting portion 21f may set a plurality of measurement angular positions by the following method instead of reading the plurality of predetermined measurement angular positions.

For example, when the shaft-shaped region setting mode is selected in Step S211, the rotation angle setting portion 21f first adjusts the position of the stage 140 in the Z direction such that the focal plane 120F of the light receiving portion 120 coincides with the highest portion of the measurement subject S. Next, the rotation angle setting portion 21f calculates the size (actual dimension) of the measurement subject S in the radial direction with respect to the rotation axis RA based on the position of the stage 140 in the Z direction when the focal plane 120F of the light receiving portion 120 is located in the surface of the measurement subject S and the working distance WD (FIG. 8) of the light receiving portion 120.

In this case, it is possible to grasp the size of the measurement region set on the outer peripheral surface of the measurement subject S based on the calculated size. Accordingly, in a case where the light receiving portion 120 captures the image of the measurement subject S while rotating the measurement subject S about the rotation axis RA, the rotation angle setting portion 21f may set the plurality of measurement angular positions such that the two continuous measurement regions partially overlap each other in the rotation direction.

According to the method for setting the measurement angular position, the measurement region is appropriately set so as to cover the entire surface of the measurement subject S in the rotation direction of the measurement subject S held by the rotation unit 190.

(5) The shape measuring apparatus 500 according to the above embodiment may have a so-called autofocus function. For example, when the light receiving portion 120 captures the image of the measurement subject S, the position of the upper surface 141s in the Z direction may be adjusted such that the focal plane 120F of the light receiving portion 120 is located on at least a part of the measurement subject S. Alternatively, the position of the lens 122 in the light receiving portion 120 may be adjusted.

(6) In the shape measurement processing according to the above embodiment, the user checks the region setting map image to set the measurement region, but the present invention is not limited thereto. In the shape measurement processing, for example, the shape measurement of the measurement subject S may be performed without generating the region setting map image according to the command of the user.

Specifically, in a state where the rotation unit 190 is attached to the stage 140, the user operates the operation portion 250 to command that the shape measurement of the measurement subject S should be performed without confirming the region setting map image. In this case, the CPU 210 performs imaging using pattern light at each of a plurality of predetermined measurement angular positions and generates three-dimensional shape data.

Therefore, the CPU 210 sets one measurement region corresponding to each measurement angular position, generates three-dimensional shape data for the one measurement region, estimates (detects) a region where the measurement subject S exists from the generated three-dimensional shape data, and sets a new measurement region as necessary. At this time, the new measurement region is set so as to partially overlap one measurement region. Thereafter, the CPU 210 generates three-dimensional shape data, estimates (detects) a region where the measurement subject S exists, and further sets a new measurement region for the new measurement region.

In this manner, the CPU 210 alternately repeats the generation of the three-dimensional shape data, the estimation of the region where the measurement subject S exists, and the setting of the measurement region for each measurement angular position, whereby the shape measurement may be performed over the entire circumference of the measurement subject S.

(7) In the shape measuring apparatus 500 according to the above embodiment, the information regarding the measurement angular position and the measurement region set at the time of shape measurement of the measurement subject S may be stored in the storage device 240 as the setting information together with the three-dimensional shape data of the measurement subject S. In this case, for example, the measurement angular position and the measurement region may be set on the basis of the read setting information by reading the setting information stored in the storage device 240 according to the measurement subject S.

As described above, since the shape measuring apparatus 500 has the function of storing and reading the setting information, the user does not need to repeat the setting operation of the measurement angular position and the measurement region when sequentially measuring the shape of a large number of measurement subjects S having the same shape.

(8) In the process of Step S203 of the shape measurement processing according to the above embodiment, the imaging of the measurement subject S by the low magnification camera is performed at the plurality of measurement angular positions. At this time, based on the image data of the measurement subject S captured at each measurement angular position, it may be determined whether the measurement subject S interferes with the stage 140 when the measurement subject S is located at another measurement angular position. Further, for the other measurement angular position where it is determined that the measurement subject S and the stage 140 interfere with each other, imaging of the measurement subject S may be skipped, and a message, an index, or the like indicating that the measurement subject S and the stage 140 interfere with each other may be displayed in the display portion 400.

Figure 45A:
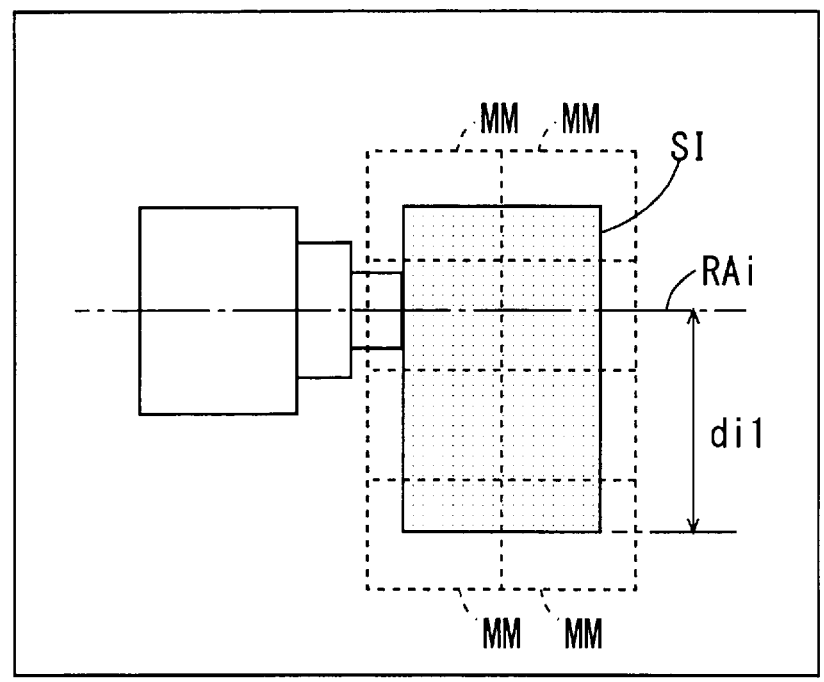
FIGS. 45A and 45B are diagrams for explaining an interference determination function between a measurement subject and a stage.
Figure 45B:
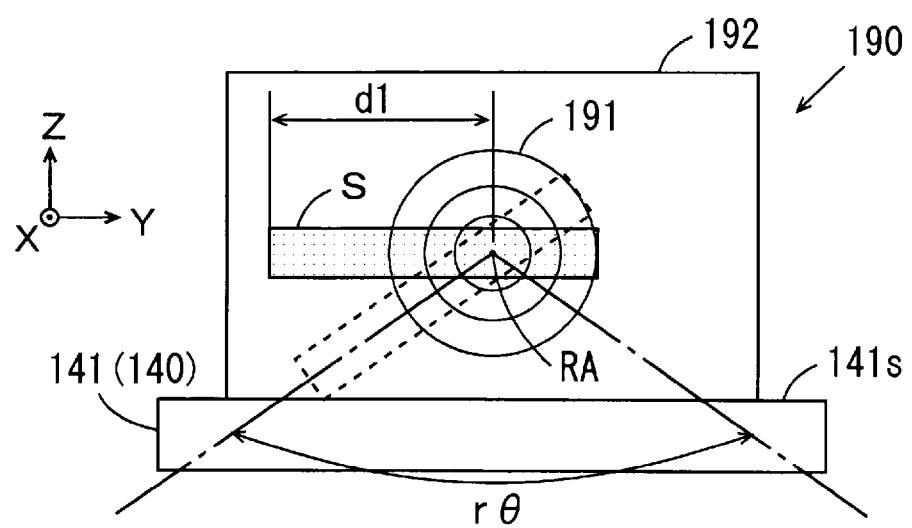

FIGS. 45A and 45B are diagrams for explaining an interference determination function between the measurement subject S and the stage 140. For example, it is assumed that the region setting map image of FIG. 45A is generated by imaging the measurement subject S at one measurement angular position. In this case, as indicated by a one-dotted chain line RAi in FIG. 45A, the position of the rotation axis RA on the region setting map image is known. Therefore, on the region setting map image, by obtaining a distance di1 between the one end portion of the subject image SI and the one-dotted chain line RAi in the direction orthogonal to the rotation axis RA, it is possible to obtain at what radius the one end portion of the measurement subject S rotates.

FIG. 45B illustrates a side view of the rotation unit 190 corresponding to the region setting map image of FIG. 45A as viewed in the X direction. As described above, if the radius at which one end portion of the measurement subject S rotates can be obtained, an angular range rθ in which one end of the measurement subject S interferes with the stage 140 can be obtained based on the obtained radius d1 and the actual dimensions of the rotation unit 190 and the stage 140 as illustrated in FIG. 45B.

(9) In the shape measuring apparatus 500 according to the above embodiment, the rotation unit 190 has a configuration in which the holding portion 191 is provided so as to protrude from the side surface ss1 of the casing of the rotation drive portion 192, but the present invention is not limited thereto.

Figure 46A:
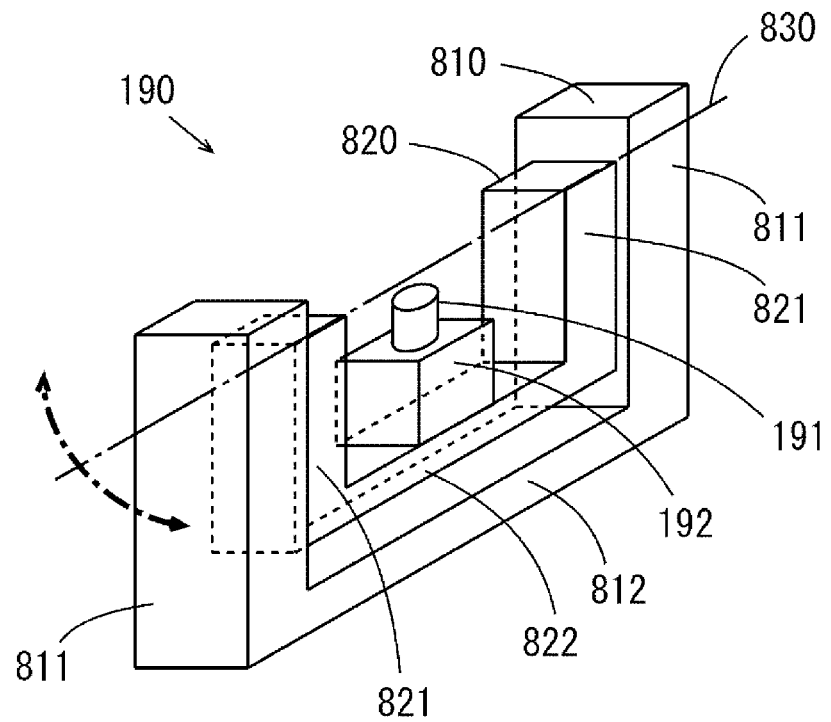
FIGS. 46A and 46B are diagrams illustrating a configuration example of a rotation unit according to another embodiment.
Figure 46B:
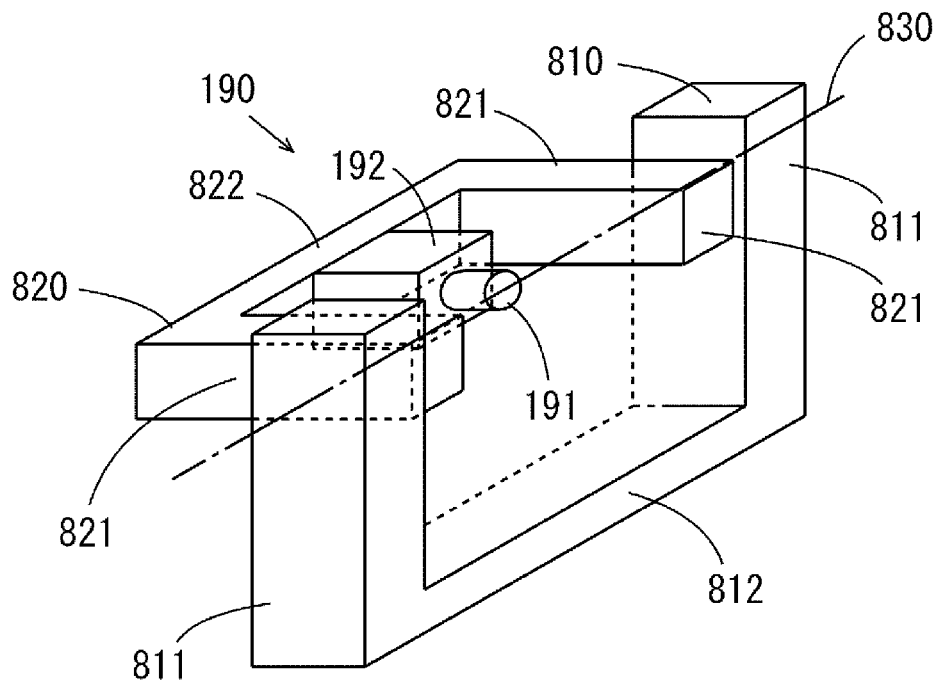

FIGS. 46A and 46B are diagrams illustrating a configuration example of the rotation unit 190 according to another exemplary embodiment. As illustrated in FIG. 46A, the rotation unit 190 of this example includes a fixed holding member 810 and a rotation holding member 820 in addition to the holding portion 191 and the rotation drive portion 192. The fixed holding member 810 includes two support columns 811 and a connection portion 812. The connection portion 812 is provided so as to extend in the horizontal direction. The two support columns 811 are provided so as to extend upward from both end portions of the connection portion 812. The connection portion 812 is configured to connect the lower end portions of the two support columns 811 and be installable on the upper surface 141s of the stage 140.

The rotation holding member 820 is provided between the two support columns 811 of the fixed holding member 810. The rotation holding member 820 includes two support columns 821 and a connection portion 822. One end of each of the support columns 821 is supported rotatably about a predetermined rotation axis 830 with respect to the one support column 811 of the fixed holding member 810. One end of each of the other support columns 821 is supported rotatably about a predetermined rotation axis 830 with respect to the other support column 811 of the fixed holding member 810. The other ends of the two support columns 821 are connected by the connection portion 822. The rotation drive portion 192 is attached to the connection portion 822.

According to the above configuration, as illustrated in FIG. 46B, the rotation holding member 820 can be rotated with respect to the fixed holding member 810 in a state where the fixed holding member 810 is fixed on the stage 140. As a result, the degree of freedom of the adjustable posture of the measurement subject S held by the holding portion 191 can be improved.

(10) In the measurement portion 100 according to the above embodiment, in order to adjust the positional relationship between the upper surface 141s of the stage 140 and the light receiving portion 120, the stage drive portion 146 moves the upper surface 141s of the stage 140 with respect to the light receiving portion 120. The present invention is not limited thereto.

For example, the measurement portion 100 may be configured to movably support the optical system support 992 with respect to the upper surface 141s of the stage 140 in order to adjust the positional relationship between the upper surface 141s of the stage 140 and the light receiving portion 120. Further, a drive portion that moves the optical system support 992 may be included.

(11) In the shape measuring apparatus 500 according to the above embodiment, the first marker M1 and the second marker M2 used in the first and second calibration functions each have a cylindrical outer peripheral surface, but the present invention is not limited thereto.

As the first marker M1 and the second marker M2, a shaft member having a regular polygonal cross section may be used. In this case, the number of vertices of the regular polygon representing the cross section of the shaft member is preferably larger than four.

(12) The shape measuring apparatus 500 according to the above embodiment has the first, second, and third calibration functions, but the present invention is not limited thereto. The shape measuring apparatus 500 may not have at least some of the first, second, and third calibration functions.

(13) In the shape measurement processing according to the above embodiment, when the shape measurement of the measurement subject S accompanied by rotation is performed by the rotation unit 190, a plurality of measurement angular positions are set by the measurement region setting processing, but the present invention is not limited thereto.

When the shape measurement of the measurement subject S accompanied by rotation is performed by the rotation unit 190, for example, one measurement angular position designated by the user may be settable in the measurement region setting processing.

In this case, for example, the user designates one measurement angular position and gives a shape measurement command corresponding to the one measurement angular position to the CPU 210 by operating the operation portion 250. Therefore, the CPU 210 controls each component of the shape measuring apparatus 500 such that three-dimensional shape data corresponding to one designated angular position is generated in response to a shape measurement command corresponding to one measurement angular position. As a result, the user can acquire three-dimensional shape data of the shape of the measurement subject S in a desired manner.

[11] Correspondence Relationship Between Each Component of Claims and Each Element of Embodiment Hereinafter, an example of correspondence between each component of the claims and each element of the embodiment will be described. In the above embodiment, the upper surface 141s of the stage 140 is an example of an upper surface, the stage 140 is an example of a stage, the light projecting portions 110A and 110B are examples of a projector, the light receiving portion 120 and the CPU 210 are examples of a camera, and the double-side telecentric optical system TT is an example of a telecentric optical system.

In addition, the holding portion 191 is an example of a holding portion, the rotation axis RA is an example of a rotation axis, the rotation drive portion 192 is an example of a rotation drive portion, the rotation unit 190 is an example of a rotation unit, the operation portion 250 is an example of an input portion, the CPU 210 is an example of a processor, the shape measuring apparatus 500 is an example of a three-dimensional shape measuring apparatus, and the XY stage 141 and the stage drive portion 146 are examples of a first drive portion and a drive portion.

The Z stage 142 and the stage drive portion 146 are examples of a second drive portion, the movable stroke range RM of FIG. 9 is an example of a first movable range, and the movable stroke range RM of FIG. 10 is an example of a second movable range.

In addition, the control mode of the CPU 210 when any one of the first and second box-shaped region setting modes and the shaft-shaped region setting mode is selected is an example of a rotation synthesis mode, the control mode of the CPU 210 when there is a shape measurement command corresponding to one measurement angular position is an example of a single angle measurement mode as described in other embodiments, the control mode of the CPU 210 when the entire box circumference button 434 is operated is an example of a full circumference synthesis mode, and the control mode of the CPU 210 when the partial box button 435 is operated is an example of a partial synthesis mode.

In addition, the light projecting portion 110A is an example of a first or second light projecting apparatus, the light projecting portion 110B is an example of a second or first light projecting apparatus, the connector 141c of the XY stage 141 is an example of a power supply portion, the power source portion pp is an example of a power source portion, the connector 194 is an example of a connector, the cable 193 is an example of a cable, the holding pieces 92 and 93 are examples of a rotation pedestal, the plurality of rod-shaped members 94 are examples of first and second rod-shaped members, the display portion 400 is an example of a display apparatus, the measurement basic screen 401 of FIG. 24 is an example of a first user interface, and the measurement basic screen 401 of FIG. 22 is an example of a second user interface.

Various other elements having the configuration or function described in the claims can be used as each component of the claims.

What is claimed is:

1. A three-dimensional shape measuring apparatus comprising:
 a stage having an upper surface for a measurement subject to be placed thereon;
 a projector configured to irradiate the measurement subject with pattern light having a periodic pattern a plurality of times from a position obliquely above while shifting a phase of the pattern light;
 a camera that has an optical axis orthogonal to the upper surface of the stage, receives, through a telecentric optical system, pattern light reflected from the measurement subject when the measurement subject is irradiated with the pattern light a plurality of times from the projector, and captures an image of the measurement subject a plurality of times to generate a plurality of pieces of image data;
 a rotation unit configured to include a chuck that holds the measurement subject and a rotation motor that rotates the chuck about a rotation axis intersecting the optical axis of the camera, the rotation unit being attached to an end portion of the stage; and
 a processor that receives selection by a user from a first control mode in which measurement of the measurement subject is performed in a state where the measurement subject is placed on the upper surface of the stage and a second control mode in which measurement of the measurement subject is performed in a state where the measurement subject is held by the chuck, and when the first control mode is selected by the user, controls the projector and the camera to generate the plurality of pieces of image data in a state where the measurement subject is placed on the upper surface of the stage, and generates three-dimensional shape data based on the plurality of pieces of image data generated by the camera, and when the second control mode is selected by the user, controls the projector, the camera, and the rotation unit to rotate the measurement subject about the rotation axis and generate the plurality of pieces of image data in a state where the measurement subject is held by the chuck, and generates three-dimensional shape data based on the plurality of pieces of image data generated by the camera.

2. The three-dimensional shape measuring apparatus according to claim 1, further comprising:

a stage motor configured to move the stage relative to the camera in a plane direction orthogonal to the optical axis of the camera, wherein the processor is configured to be able to execute:

first synthesis processing of controlling the stage motor such that the measurement subject and the camera are disposed at a plurality of positions different from each other in the plane direction in a state where the measurement subject is placed on the stage or in a state where the measurement subject is held by the chuck, controlling the projector and the camera so as to generate a plurality of pieces of first three-dimensional shape data respectively corresponding to the plurality of positions, and synthesizing the plurality of pieces of generated first three-dimensional shape data;

second synthesis processing of controlling the rotation unit such that the measurement subject rotates about the rotation axis in a state where the measurement subject is held by the chuck, controlling the projector and the camera such that a plurality of pieces of second three-dimensional shape data respectively corresponding to a plurality of rotation angles different from each other about the rotation axis are generated, and synthesizing the plurality of pieces of generated second three-dimensional shape data; and third synthesis processing of controlling the stage motor, the rotation unit, the projector, and the camera so as to generate the plurality of pieces of first three-dimensional shape data and the plurality of pieces of second three-dimensional shape data, and synthesizing the plurality of pieces of generated first three-dimensional shape data and the plurality of pieces of generated second three-dimensional shape data.

3. The three-dimensional shape measuring apparatus according to claim 2, wherein the stage motor is further configured to move the stage relative to the camera in a direction of the optical axis of the camera, and the processor is configured to be able to execute:

fourth synthesis processing of controlling the stage motor such that the measurement subject and a focal point of the camera are disposed at a plurality of positions different from each other in a direction of the optical axis of the camera in a state where the measurement subject is placed on the stage or in a state where the measurement subject is held by the chuck, controlling the projector and the camera to generate a plurality of pieces of third three-dimensional shape data corresponding to the plurality of positions, and synthesizing the plurality of pieces of generated third three-dimensional shape data.

4. The three-dimensional shape measuring apparatus according to claim 3, wherein the processor determines the plurality of positions in the direction of the optical axis such that the focal point of the camera is matched with a plurality of portions whose image is captured by the camera in the measurement subject for each rotation angle in a case where the measurement subject is sequentially rotated at the plurality of different rotation angles in a state where the measurement subject is held by the chuck.

5. The three-dimensional shape measuring apparatus accepting according to claim 2, wherein the processor accepts, as the second control mode, selection by the user from a rotation synthesis mode and a single angle measurement mode and is configured to:

generate a plurality of pieces of second three-dimensional shape data respectively corresponding to the plurality of different rotation angles when the rotation synthesis mode is selected, and synthesize the plurality of pieces of second three-dimensional shape data by the second synthesis processing; and control the projector, the camera, and the rotation unit to generate three-dimensional shape data corresponding to one rotation angle when the single angle measurement mode is selected.

6. The three-dimensional shape measuring apparatus according to claim 2, wherein the processor accepts, as the second control mode, selection by the user from a full circumference synthesis mode and a partial synthesis mode, and accepts designation of an angular range in which the measurement subject is rotated about the rotation axis when the partial synthesis mode is selected and is configured to:

control the projector, the camera, and the rotation unit to generate the plurality of pieces of second three-dimensional shape data over an entire circumference about the rotation axis when the full circumference synthesis mode is selected, and synthesize a plurality of pieces of second three-dimensional shape data generated over the entire circumference about the rotation axis by the second synthesis processing; and control the projector, the camera, and the rotation unit to generate the plurality of pieces of second three-dimensional shape data over the angular range about the rotation axis when the partial synthesis mode is selected, and synthesize the plurality of pieces of second three-dimensional shape data generated over the angular range about the rotation axis by the second synthesis processing.

7. The three-dimensional shape measuring apparatus according to claim 1, further comprising:

a stage motor configured to move the stage relative to the camera in a direction of the optical axis of the camera, wherein the rotation axis is located above the upper surface of the stage, the rotation axis and the optical axis of the camera are orthogonal to each other, and the stage motor is configured to be able to move a focal point of the camera within a first movable range from the upper surface of the stage to the rotation axis in the direction of the optical axis of the camera.

8. The three-dimensional shape measuring apparatus according to claim 3, wherein the rotation axis is parallel to the upper surface of the stage, and when a distance from the upper surface of the stage to the rotation axis in the direction of the optical axis of the camera is defined as a reference distance, the stage motor is configured to be able to move a focal point of the camera within a second movable range up to a position separated upward from the upper surface of the stage by a distance twice the reference distance in the direction of the optical axis of the camera.

9. The three-dimensional shape measuring apparatus according to claim 1, wherein the projector includes first and second light projecting apparatuses arranged in a direction of an X axis and disposed symmetrically with respect to a Z axis orthogonal to the X axis, each of the first and second light projecting apparatuses has an optical axis orthogonal to a Y axis orthogonal to the X axis and inclined at a predetermined angle with respect to the X axis and the Z axis, and emits pattern light along the optical axis of the light projecting apparatus toward the optical axis of the camera, and the rotation unit is attached to the stage so as to be disposed at a position deviated from a space in which an irradiation region of pattern light by the first light projecting apparatus, an irradiation region of pattern light by the second light projecting apparatus, and an imaging region of the camera overlap when the stage is at a predetermined reference position with respect to the camera.

10. The three-dimensional shape measuring apparatus according to claim 1, wherein the rotation unit is configured to be attachable to and detachable from the stage.

11. The three-dimensional shape measuring apparatus according to claim 10, wherein the stage includes a power supply capable of supplying power to the rotation unit, the rotation unit further includes:

a power source configured to operate the rotation motor; and a cable provided to extend from the power source portion and having a connector connectable to the power supply, and the rotation motor operates based on power supplied from the power supply to the power source in a case where the connector is connected to the power supply.

12. The three-dimensional shape measuring apparatus according to claim 10, wherein the chuck is configured to be able to hold the measurement subject in a cantilever manner.

13. The three-dimensional shape measuring apparatus according to claim 10, wherein the chuck includes:

a rotation pedestal configured to be rotated by the rotation motor; and first and second rod-shaped members configured to extend from the rotation pedestal in a direction of the rotation axis.

14. The three-dimensional shape measuring apparatus according to claim 10, wherein the processor is configured to be able to execute:

attachment/detachment determination processing of determining whether the rotation unit is attached to the stage; and attachment/detachment state presentation processing of presenting a determination result by the attachment/detachment determination processing.

15. The three-dimensional shape measuring apparatus according to claim 1, wherein the rotation unit is configured to be attachable to the stage and detachable from the stage, the three-dimensional shape measuring apparatus further comprises:

a stage motor configured to move the stage relative to the camera in a direction orthogonal to the optical axis of the camera, wherein the processor causes a display apparatus to display a first user interface for setting an operation condition regarding a relative movement operation by the stage motor and a rotation operation of the measurement subject by the rotation unit in a case where the rotation unit is attached to the stage, and causes the display apparatus to display a second user interface for setting an operation condition regarding only the relative movement operation out of the relative movement operation and the rotation operation in a case where the rotation unit is not attached to the stage.

* * * * *